United States Patent
Ueda et al.

[11] Patent Number: 6,157,595
[45] Date of Patent: Dec. 5, 2000

[54] MAGNETO-OPTICAL DISK LOADING DEVICE

[75] Inventors: Kazuhiko Ueda, Kitakatsuragi-gun; Toshiyuki Tanaka, Moriguchi, both of Japan

[73] Assignee: Sharp Kabushiki Kaisha, Osaka, Japan

[21] Appl. No.: 09/031,931

[22] Filed: Feb. 27, 1998

[30] Foreign Application Priority Data

Feb. 27, 1997 [JP] Japan .................................. 9-043184
Jan. 30, 1998 [JP] Japan ................................ 10-019932
Jan. 30, 1998 [JP] Japan ................................ 10-019952

[51] Int. Cl.[7] .................................................. G11B 11/00
[52] U.S. Cl. ............................................................. 369/13
[58] Field of Search ................................ 369/13, 14, 110, 369/116, 75.2, 75.1; 360/114, 59; 365/122

[56] References Cited

U.S. PATENT DOCUMENTS

| | | | |
|---|---|---|---|
| Re. 34,710 | 8/1994 | Fujisawa et al. | 369/13 |
| 4,993,009 | 2/1991 | Shiho | 369/13 |
| 5,455,809 | 10/1995 | Naraoka et al. | 369/13 |
| 5,587,973 | 12/1996 | Kanazawa et al. | 369/13 |
| 5,625,607 | 4/1997 | Chaya | 369/13 |
| 5,677,897 | 10/1997 | Anada et al. | 369/13 |
| 5,905,696 | 5/1999 | Kanazawa et al. | 369/13 |

FOREIGN PATENT DOCUMENTS

| | | |
|---|---|---|
| 63-91850 | 4/1988 | Japan . |
| 4-318348 | 11/1992 | Japan . |
| 7-57431 | 3/1995 | Japan . |
| 9-17113 | 1/1997 | Japan . |
| 2618010 | 3/1997 | Japan . |

OTHER PUBLICATIONS

"Ultra–Thin Brushless Motor for Headphone Stereo Cassette Players" Makoto Hasegawa, et al. National Technical Report vol. 37, No. 2 Apr. 1991, pp. 189 to 195.

*Primary Examiner*—Tan Dinh
*Attorney, Agent, or Firm*—Dike, Bronstein, Roberts & Cushman, LLP; David G. Conlin; David A. Tucker

[57] ABSTRACT

In an optical disk device of the present invention, a spindle motor is separated into (1) a first motor unit composed of a bearing member, a bearing support for supporting the bearing member, and a turn table fixed to a rotor magnet and (2) a second motor unit provided with a first stator coil. During a cartridge loading operation, after the first motor unit is moved towards an optical disk, the second motor unit is slidably moved to a space created by the movement of the first motor unit so as to be rotatably driven as a spindle motor, thus realizing a thinner spindle motor.

31 Claims, 60 Drawing Sheets

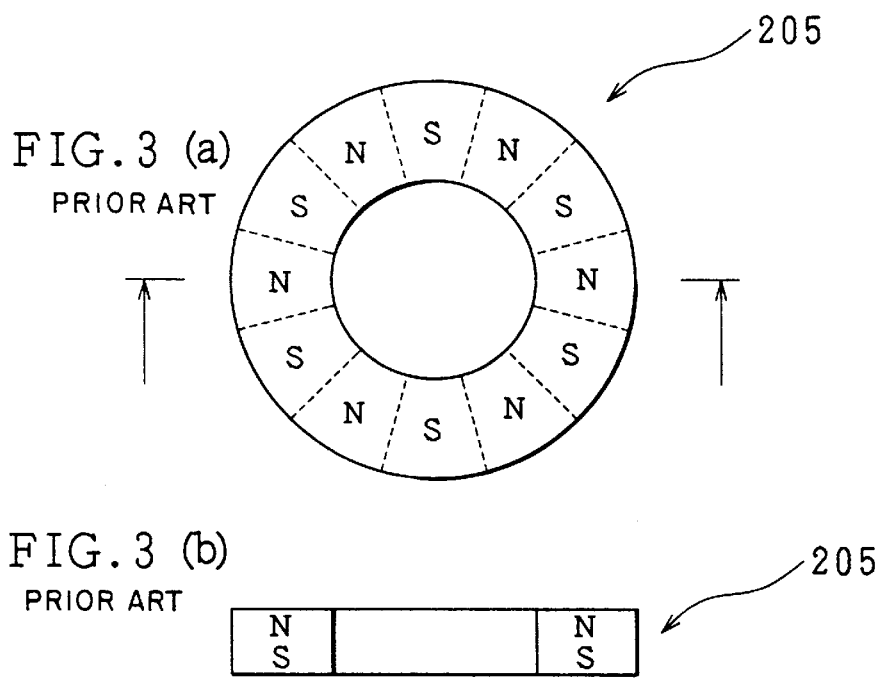
FIG. 3 (a) PRIOR ART
FIG. 3 (b) PRIOR ART
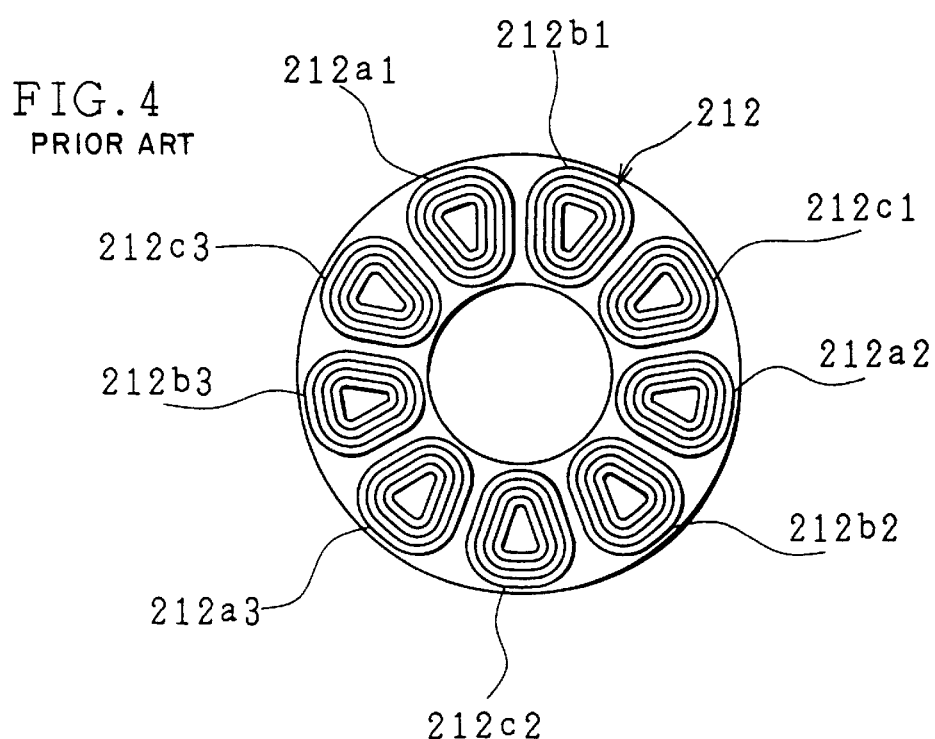
FIG. 4 PRIOR ART

FIG.30(a)
FIG.30(b)
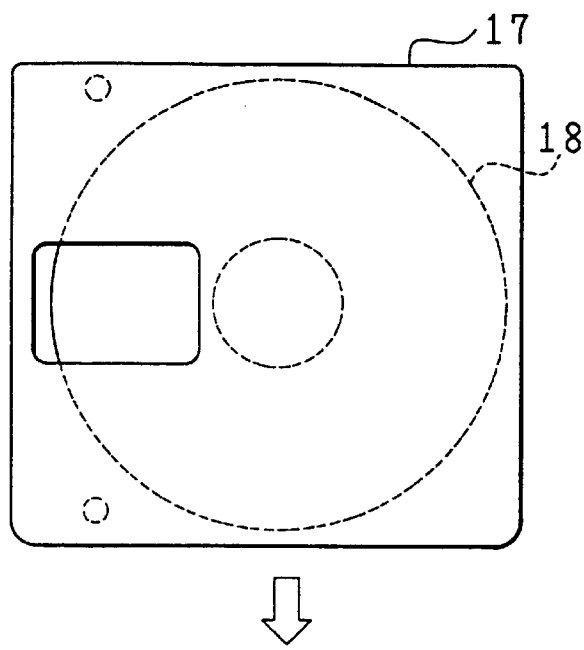
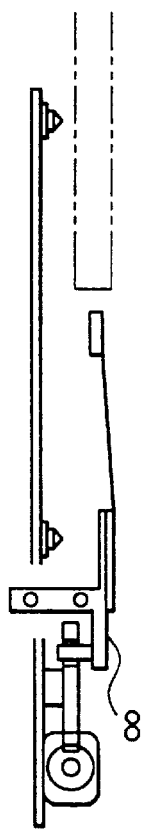
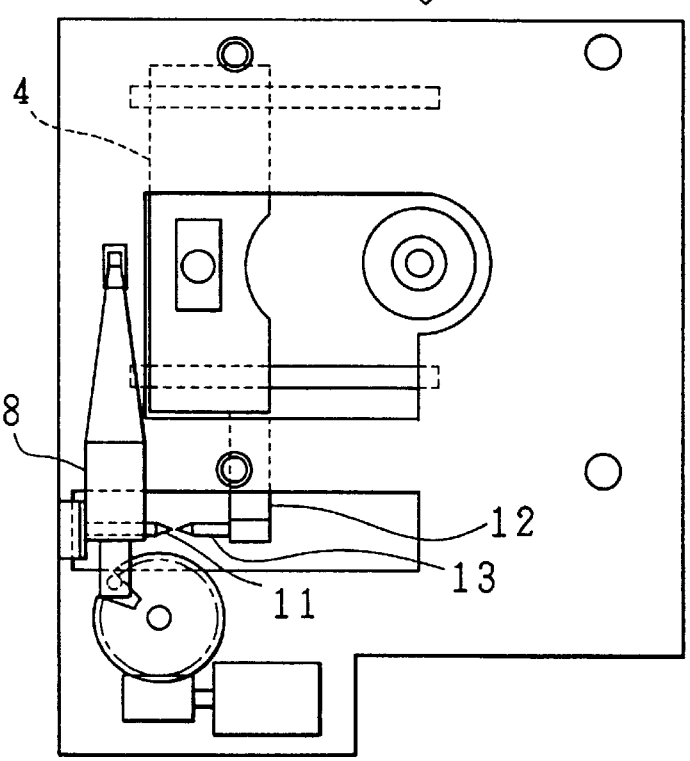
FIG.30(c)
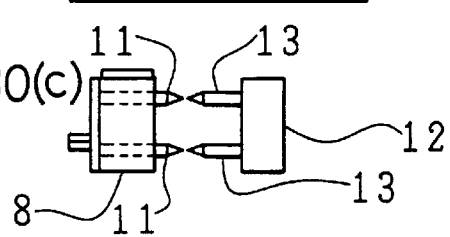

FIG.31(a)
FIG.31(b)
FIG.31(c)
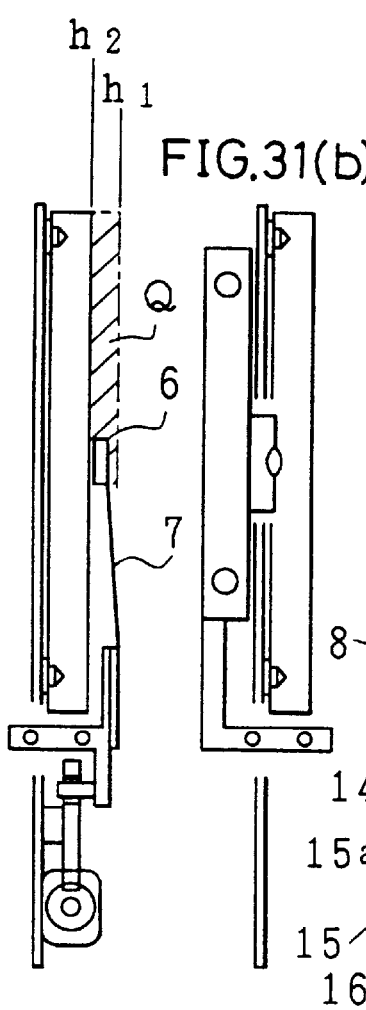
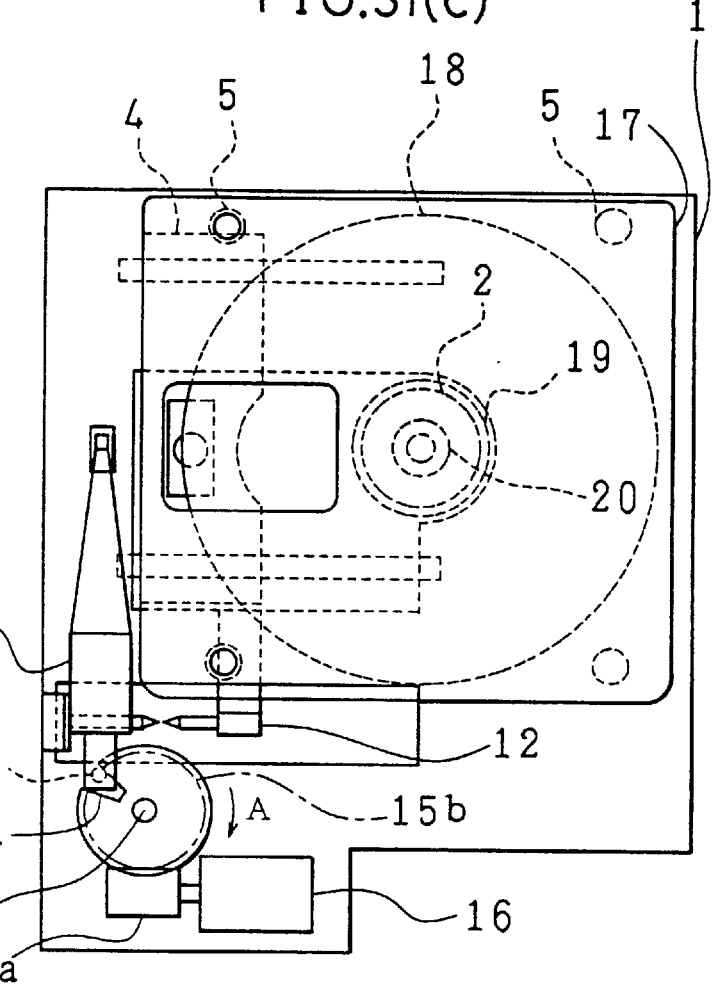
FIG.31(d)
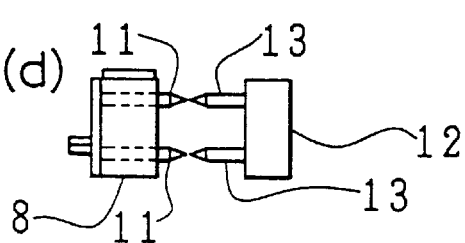

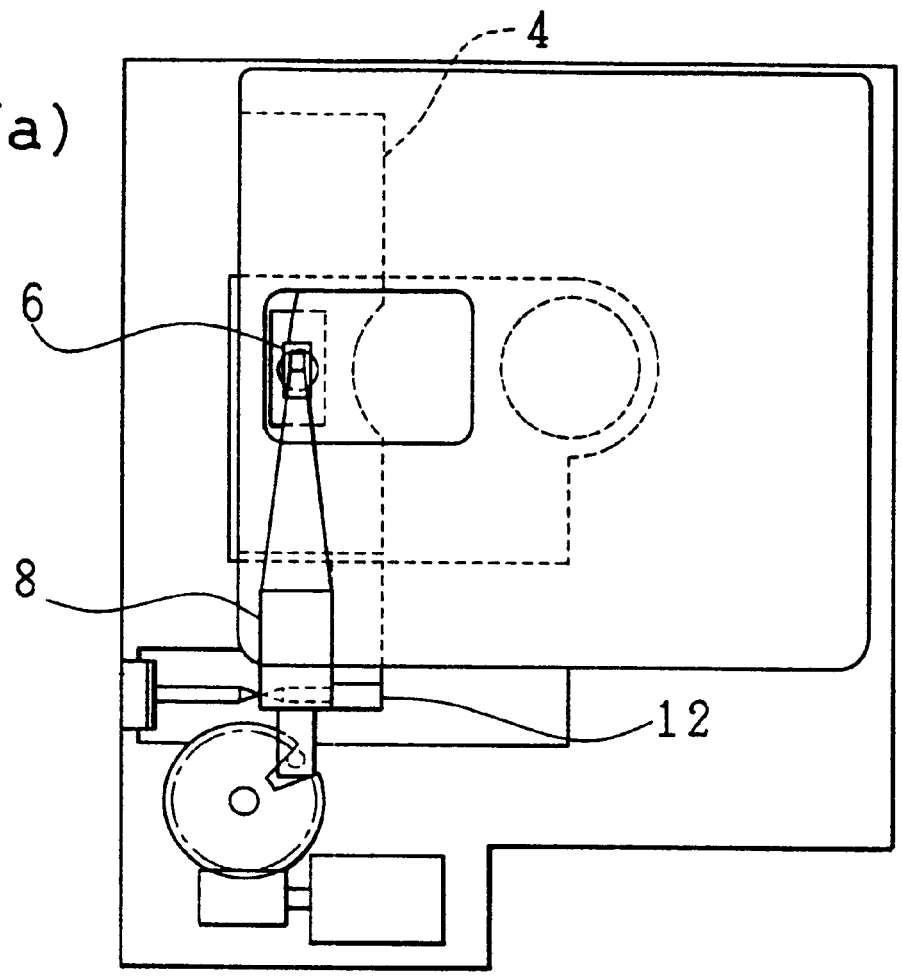
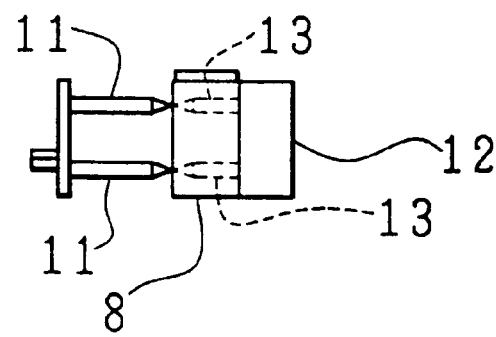

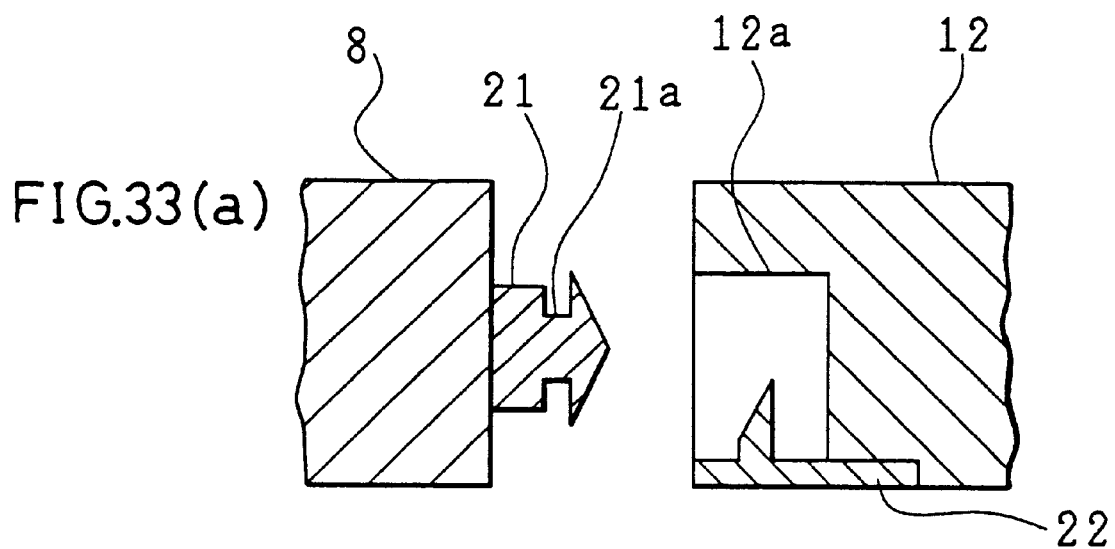
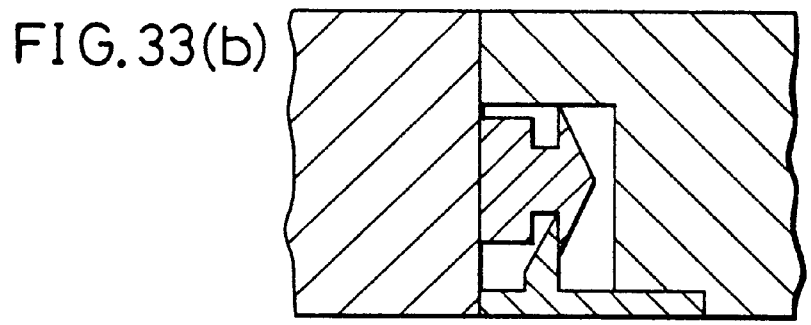
FIG.33(a)
FIG.33(b)

FIG. 38
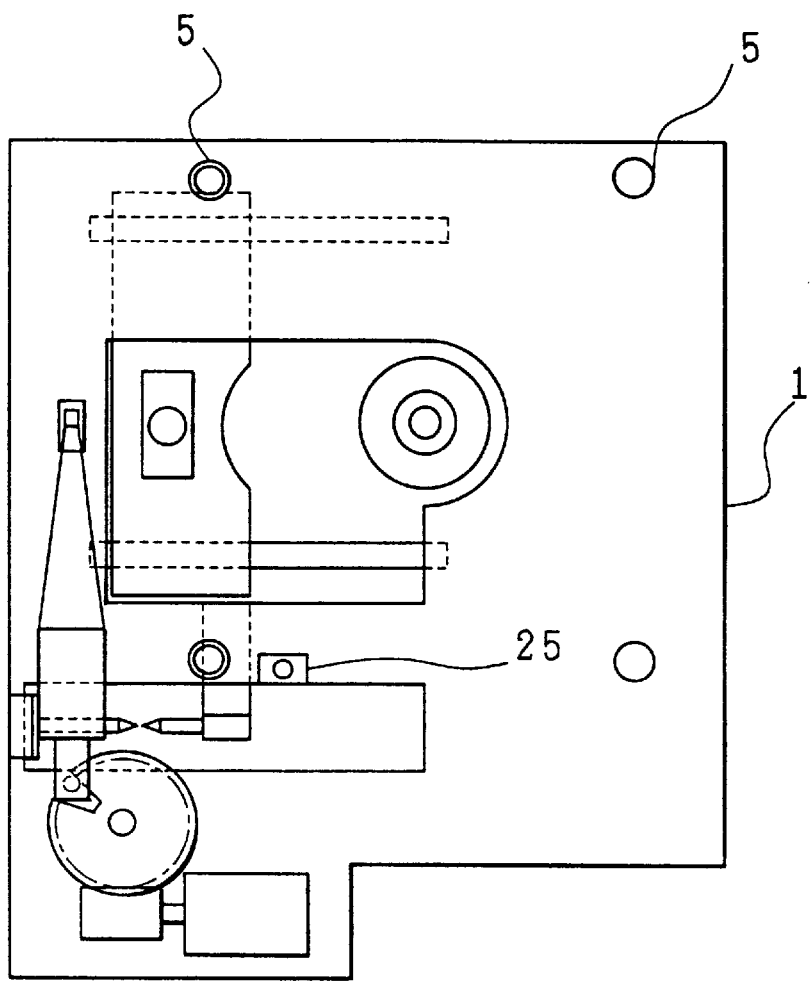
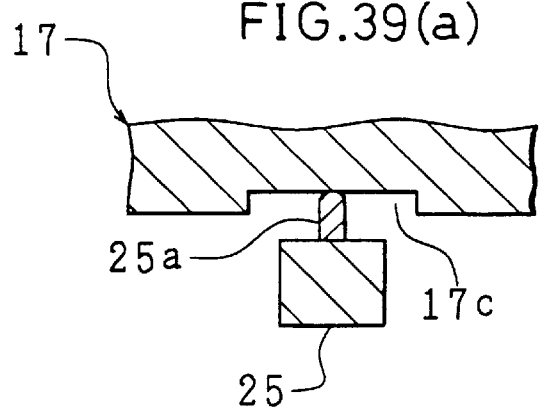
FIG.39(a)
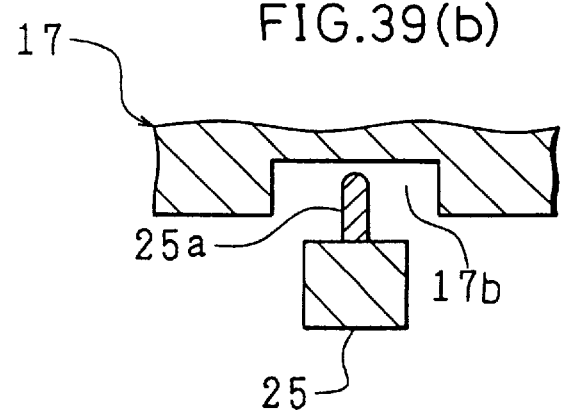
FIG.39(b)

FIG. 42
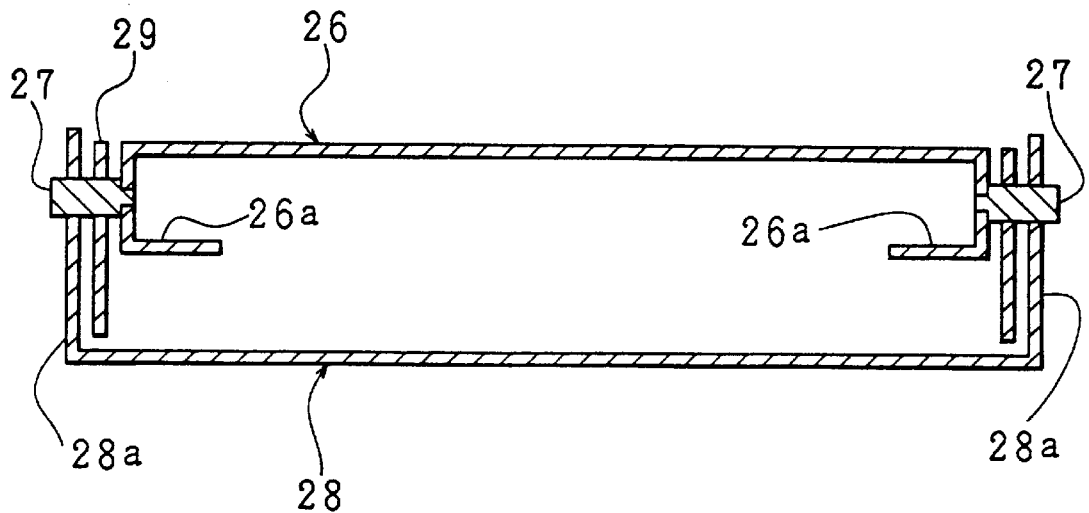
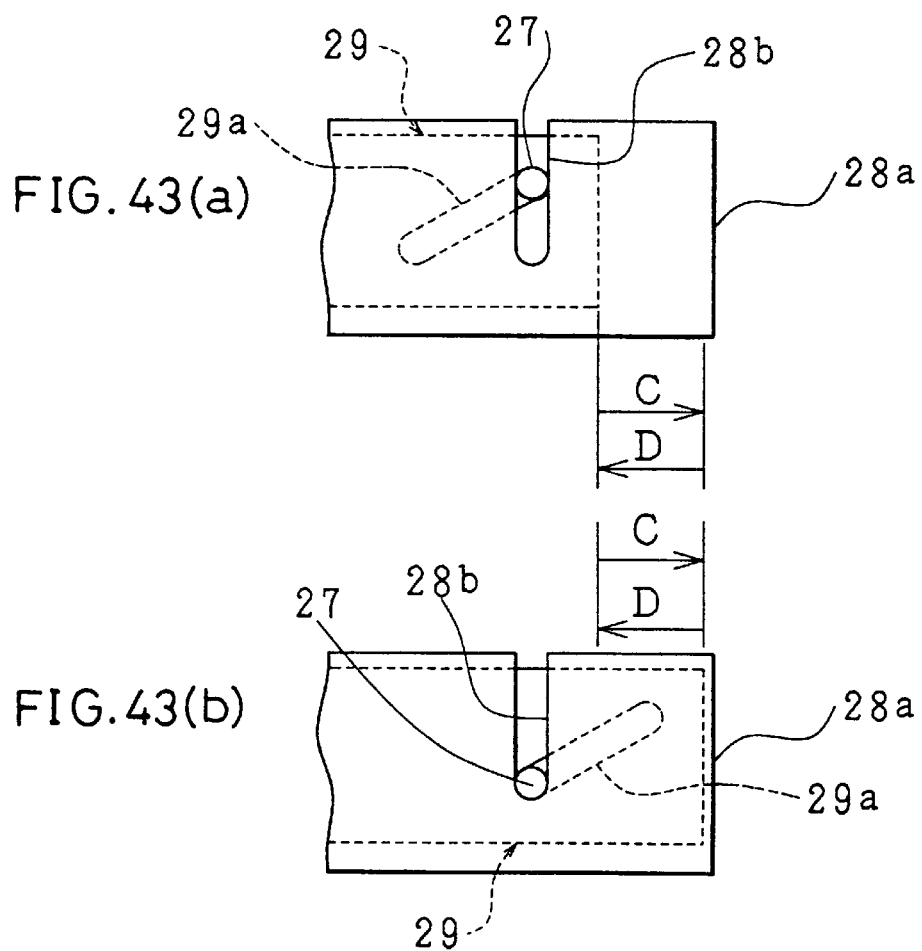
FIG. 43(a)
FIG. 43(b)

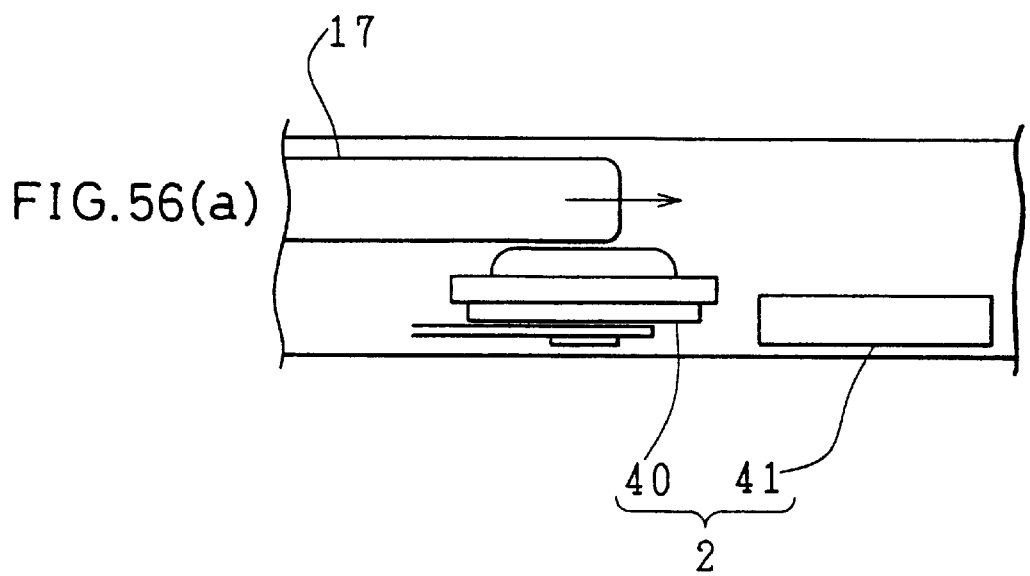
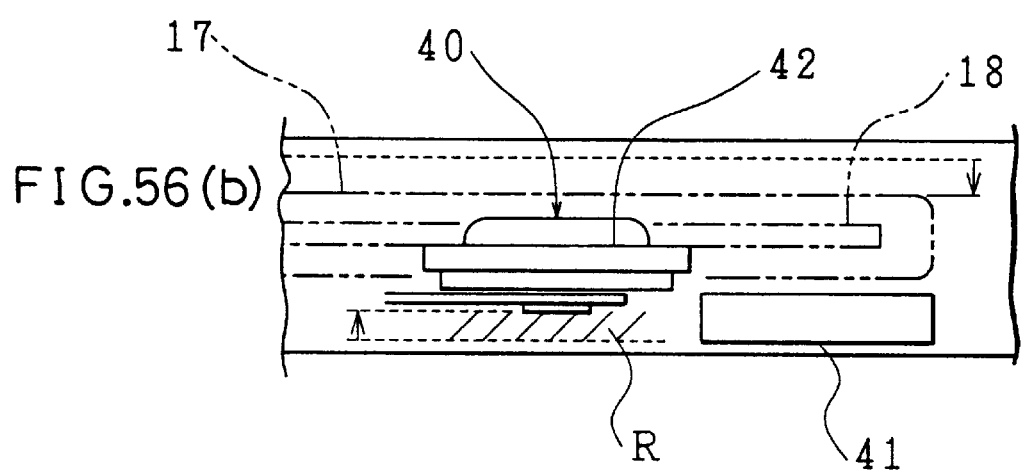
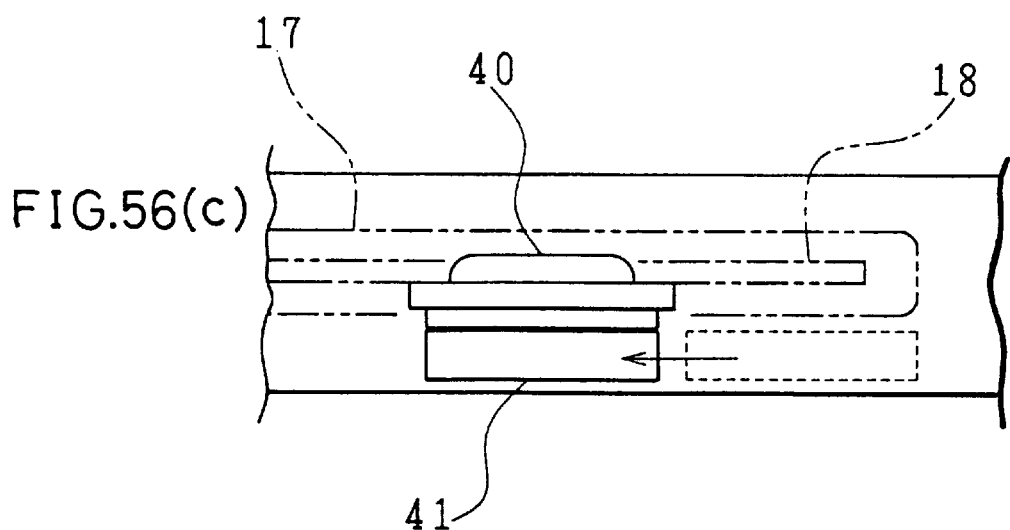

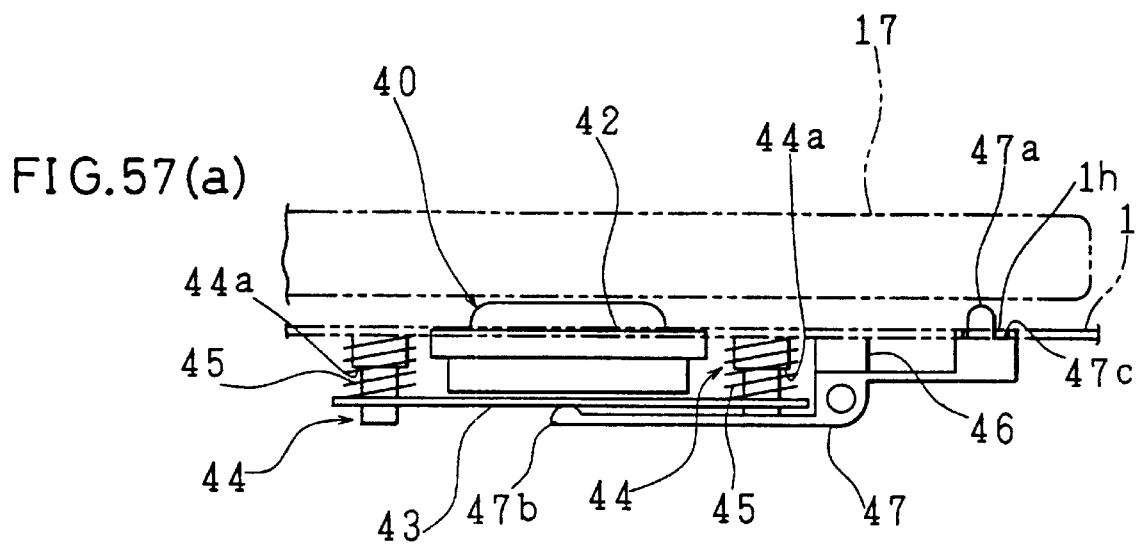
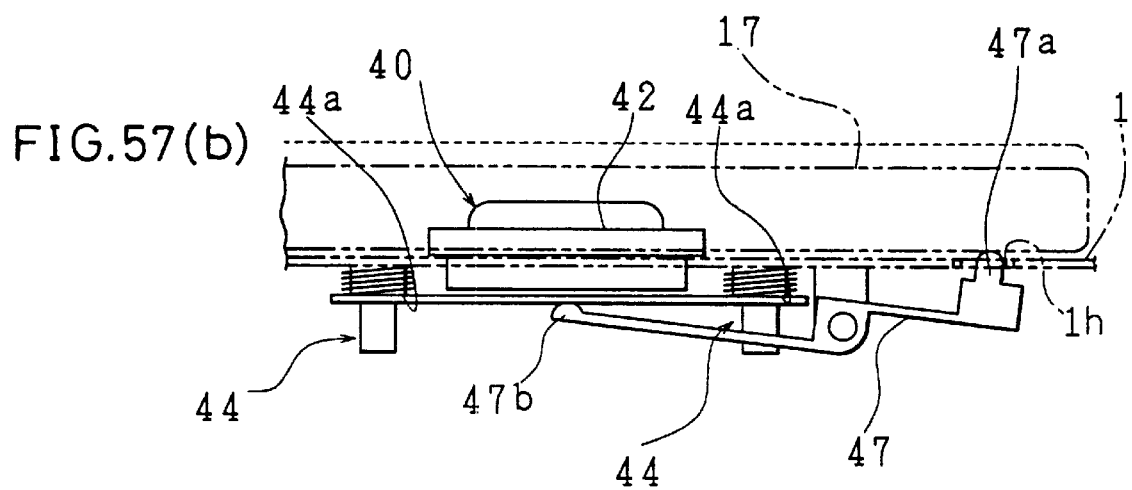

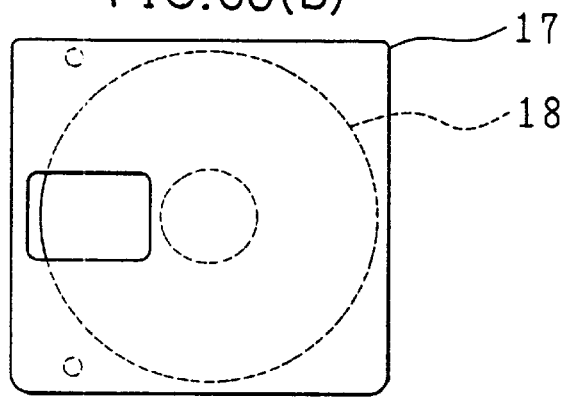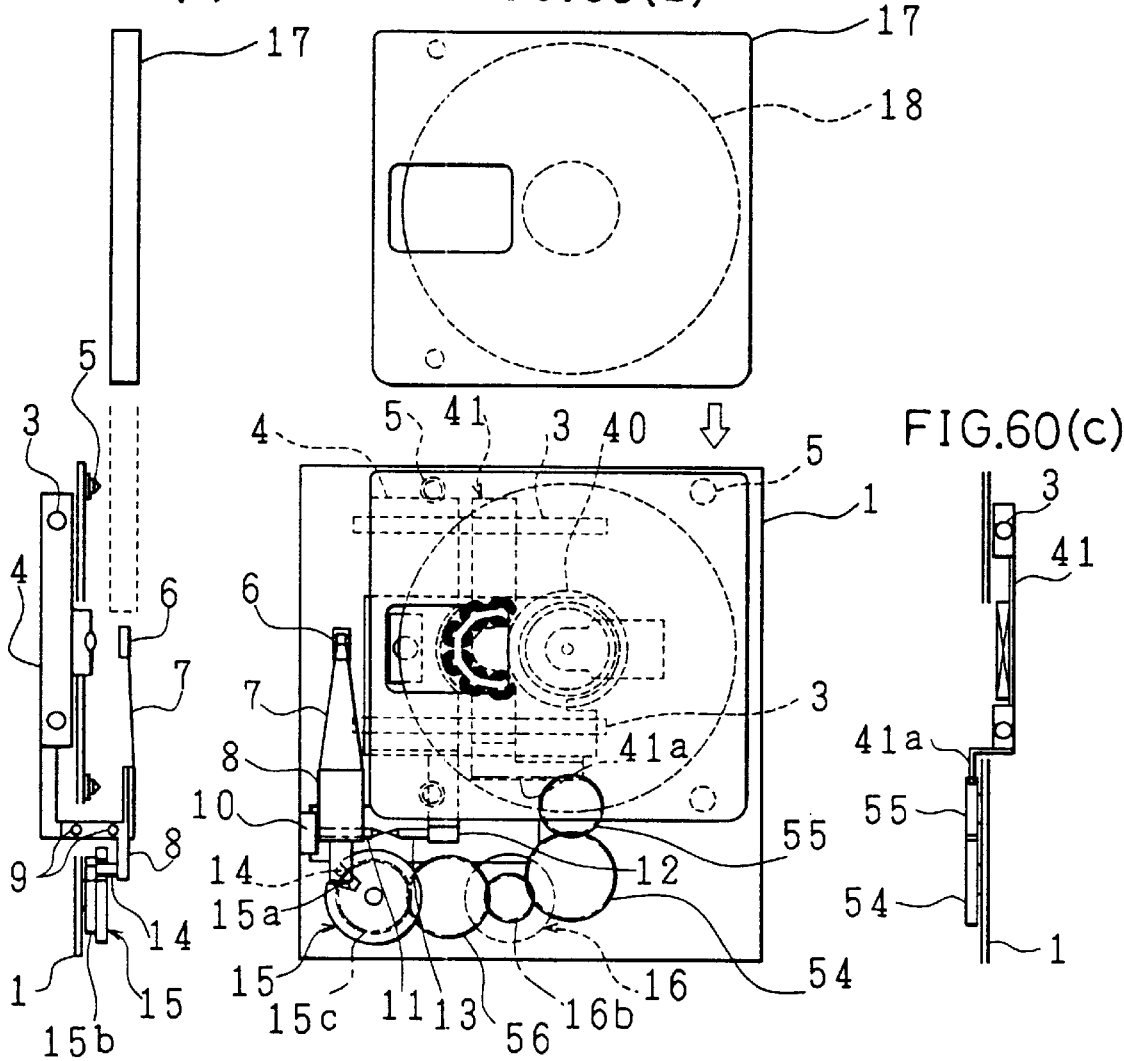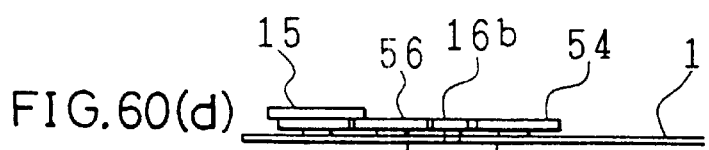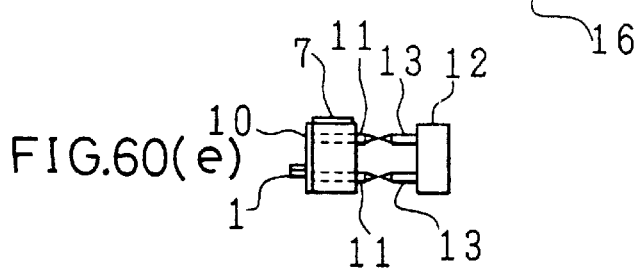
FIG.60(a) FIG.60(b) FIG.60(c) FIG.60(d) FIG.60(e)

FIG. 66
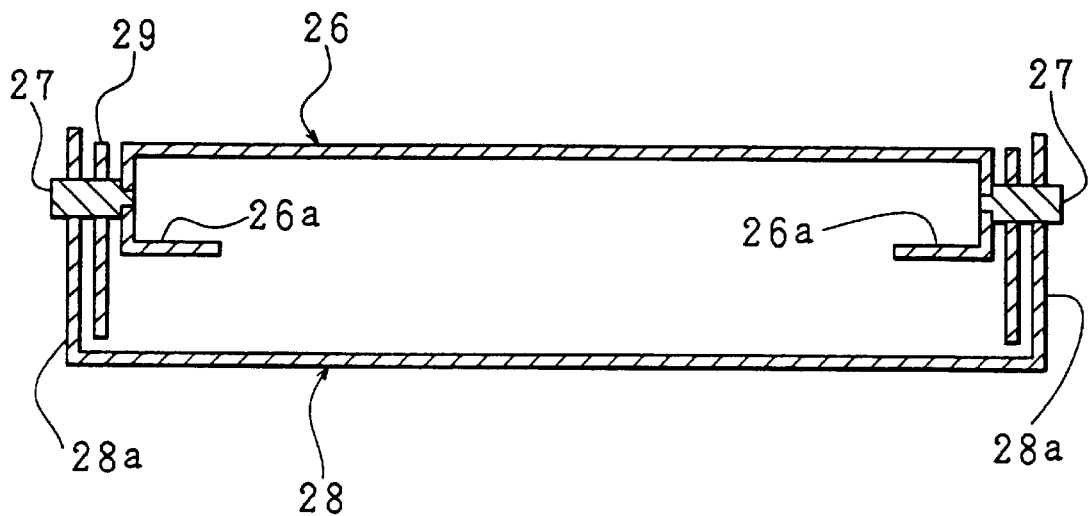
FIG. 67(a)
FIG. 67(b)
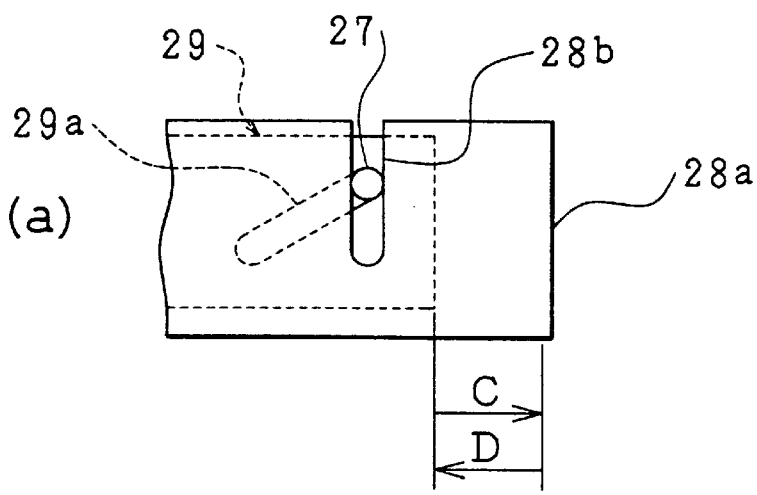
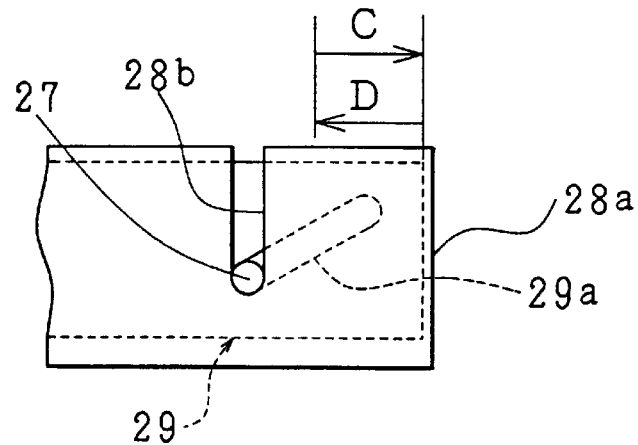

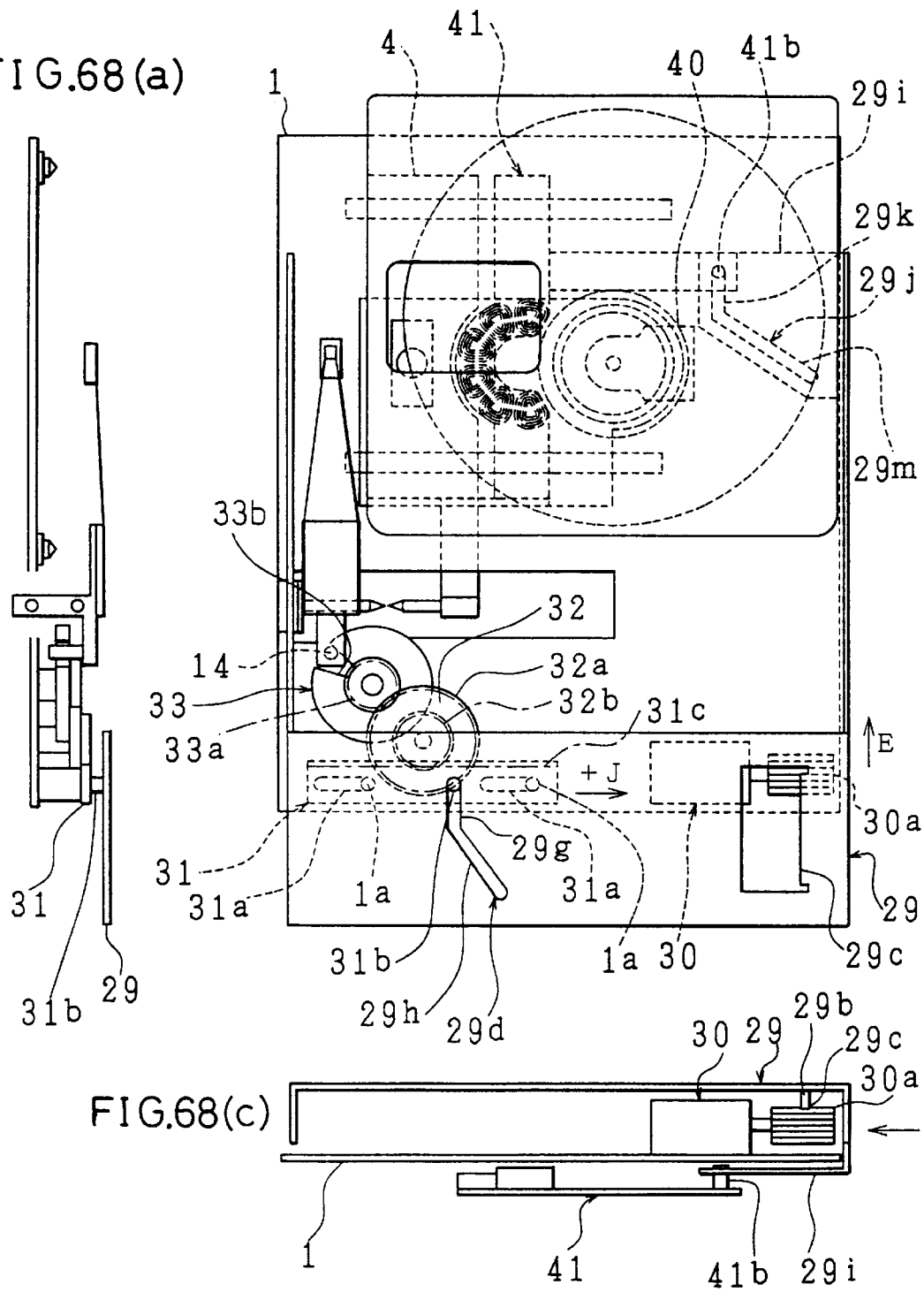

MAGNETO-OPTICAL DISK LOADING DEVICE

FIELD OF THE INVENTION

The present invention relates to an optical disk device provided with a thin spindle motor for rotatably driving an optical disk.

BACKGROUND OF THE INVENTION

An optical disk device capable of reading and writing information from and on a disk such as a CD, a CD-ROM, and a magneto-optical disk has been widely adopted due to fast accessing to desired information. Also, an MD (Mini Disk) having a smaller disk diameter has been spreading rapidly in recent years due to its easy handling, replacing compact disks and cassette tapes.

In personal computers equipped with a magneto-optical disk device as an external information recording/reproducing device, a portable notebook type has been drawing an attention. Also, a portable type MD for allowing the user to enjoy music outside has been a focus of an attention as well. Thus, in both personal computers and MD, portability is of a great importance, and therefore a demand for thinner and smaller optical disk device has been increasing.

Incidentally, main mechanical components of an optical disk device include a loading mechanism for transporting a cartridge holder holding a cartridge encasing a disk to a predetermined position, a spindle motor for mounting an optical disk so as to rotatably drive thereof with a predetermined rotation speed, an optical head for projecting a laser light onto an optical disk so as to record and reproduce information, an optical head transporting mechanism for controlling and transporting the optical head to a predetermined position on the optical disk, and other mechanisms.

In the loading mechanism, a cartridge held in the cartridge holder is laterally moved, and after transporting the cartridge so that a chucking target section of the optical disk is above a chucking section of the spindle motor, the cartridge is lifted downward towards the spindle motor. A main chassis having the spindle motor and the optical head is provided with cartridge position determining pins which place the cartridge in a predetermined position. The optical disk is provided with a center hub made of a magnetic material, and in a vicinity of the chucking section of the spindle motor, a disk chucking magnet is fixed. The optical disk is held on the chucking surface of the spindle motor by the magnetic force of the chucking magnet.

In the optical disk device having the described arrangement, since it is required to move the cartridge in the vertical direction with respect to the spindle motor fixed to the main chassis, it is required to provide a space in the optical disk device for the movement of the cartridge. The cartridge is slightly larger than the optical disk encased therein. For example, in an MD, while a disk diameter is 64 mm, the cartridge has dimensions of 68 mm×72 mm. Also, the cartridge has a thickness of 5 mm, and normally, substantially 3.2 mm of space is required for the vertical movement of the cartridge required for mounting of the disk onto the spindle motor.

The magneto-optical disk and MD are encased in a cartridge for easy handling; however, the vertical movement mechanism of the cartridge can be a problem in realizing a thinner optical disk device.

In order to overcome this problem, for example, Japanese Unexamined Patent publication No. 57431/1995 (Tokukaihei 7-57431) discloses an arrangement wherein instead of moving the cartridge in the vertical direction, the cartridge is laterally inserted with respect to the cartridge holder fixed on the side of the main chassis, and the spindle motor is lifted upward in accordance with the loading operation so as to chuck the disk onto the spindle motor.

The diameter of the spindle motor is set so that the spindle motor does not interfere with a chucking region of the disk which is specified and the optical head positioned for recording and reproducing information on and from the innermost side of the disk. In an MD, the diameter of the disk chucking surface is set to 16 mm. Thus, the space required for the loading operation for chucking of the disk onto the spindle motor is significantly smaller when the spindle motor is moved in the vertical direction, compared with the case of moving the cartridge in the vertical direction.

FIG. 2 shows an arrangement of the spindle motor. The arrangement of FIG. 2 is a cross sectional view of a brushless motor which is generally referred to as an axial gap type or a surface facing type. A motor fixing section has an arrangement wherein a bearing holder 213 is fixed to a motor chassis 215, and bearing 214 is press-fit in the bearing holder 213, and a stator coil 212 is provided around the bearing holder 213 on a motor chassis via a flexible substrate 211. On the other hand, a motor rotating section has an arrangement wherein a rotation shaft 203 is press-fit on the center of a turn table 204 on which the disk is placed, and a rotor magnet 205 is provided around the rotation shaft 203. On the turn table 204, a disk chucking magnet 207 is fixed. Between the rotor magnet 205 and the turn table 204, a thin iron plate made of a magnetic material is sandwitched as a back yoke 206. The motor chassis is made of a magnetic material such as iron, and serves also as a back yoke on the coil side. In order to avoid a direct contact between the turn table 204 and the bearing holder 213 during rotation of the turn table 204 so as to ensure smooth rotation, a sliding section 209 is provided. Also, in order to prevent the rotation shaft 203 from coming off the bearing 214, the end portion of the rotation shaft 203 is engraved, and a washer 208 is attached around the groove. The rotor magnet 205 is divided into a number of regions in the circumferential direction, each of which is magnetized with a north pole and a south pole in a direction of the thickness in an alternating pattern.

FIG. 3(a) and FIG. 3(b) respectively show a magnetization state of the rotor magnet 205. Here, the rotor magnet is magnetized with 12 poles.

FIG. 4 shows an arrangement of the stator coil 212. Here, nine coils are provided around the bearing holder 213, and (1) coils 212a1, 212a2, and 212a3, (2) coils 212b1, 212b2, and 212b3, and (3) coils 212c1, 212c2, and 212c3 are connected in series, respectively.

In a magnetic circuit gap composed of the rotor magnet with back yoke and the back yoke on the stator coil side (motor chassis), the stator coil is provided, and a current is sent to each coil, and by carrying out, for example, a three-phase half wave current control, the rotation of the turn table is controlled.

As mentioned above, one of the effective means for realizing a thinner MD device is to lift the spindle motor, not the cartridge, when chucking the disk onto the spindle motor. However, lifting of the spindle motor in this manner has a limit when an optical disk device with an even thinner thickness is demanded. Assuming that the cartridge is moved only in the lateral direction when loading is carried out, and the lateral movement of the cartridge is barely made above the upper surface of the turn table of the spindle motor having a thickness of hi, in the spindle motor, the thickness h required from the lower surface of the cartridge to the lower surface of the optical disk device is minimized when h=h1. In the case where other components of the MD device, for example, the optical head is made thinner than the spindle motor, the height to the lower surface of the spindle motor determines the height to the lower surface of the optical disk device, namely, the height to the lower surface of the spindle motor becomes one of the factors determining the total thickness of the optical disk device. Therefore, it is required to make the thickness of the spindle motor thinner.

Other mechanical components of the optical disk device include, other than the described mechanical components, magnetic field applying means for applying a supplementary magnetic field to a laser light converged position of the medium.

The magnetic field applying means, for example in the MD device, have a magnetic head section composed of a slider member made of resin having a core section provided with coils. The magnetic head section is attached to the tip of an elastic suspension member so that the magnetic head section is in a sliding state when rotating the disk. The suspension member is fixed to a supporting arm integrally extending from a light pickup. This arrangement allows the suspension member to be moved in the radial direction of the disk integrally with the light pickup.

Also, the magnetic head section, being in the sliding state, can be moved upward from the disk, namely, the magnetic head section can be moved in a direction so that the distance between the core section and the disk surface increases. Further, the magnetic head section can be held above the cartridge.

When the cartridge is inserted into the optical disk device, the loading mechanism laterally moves the cartridge held in the cartridge holder towards the inside. Here, the magnetic head section is held above the cartridge by the magnetic head lifting mechanism so as to avoid contacting the cartridge being inserted.

As described, the cartridge is placed in a predetermined position by the loading mechanism. Also, the magnetic head section held above the cartridge is lifted downward towards the disk surface by the magnetic head lifting mechanism.

In this manner, the magnetic head section is held above the cartridge so as to avoid contacting the cartridge when loading. This further increases the thickness of the optical disk device, presenting a serious problem in realizing a thinner and smaller optical disk device.

As a countermeasure, and as a method for realizing a thinner optical disk device having the magnetic field applying means, a method (referred to as Method 1) of retreating the light pickup integrally fixed to the magnetic head section outside of the moving region of the cartridge is available. In this method, instead of retreating the magnetic head section above the cartridge, the magnetic head section is retreated to a position adjacent to the cartridge when viewed from the top.

However, in Method 1, the following problem is presented. That is, in order to make the optical disk device thinner, the distance between (1) the objective lens for converging the laser light on the medium surface and (2) the medium is required to be small. For this reason, in general, the cartridge is provided with a window for effectively converging laser light on the medium, and the objective lens of the light pickup is designed so that the objective lens moves into the window of the cartridge whose position has been determined. Also, in some cases, an objective lens actuator for controlling the position of the objective lens partially moves into the window of the cartridge.

For this reason, after the position of the cartridge has been determined, when the light pickup in the retreat position is moved above the medium in order to access the recording medium which has been set, the objective lens and the objective lens actuator collide with the wall of the cartridge constituting the window. Thus, as in Method 1, when the light pickup is retreated outside the moving region of the cartridge, the objective lens of the light pickup cannot be moved into the window of the cartridge, and it becomes impossible to narrow the distance between the objective lens and the medium. This presents a problem that the optical disk device cannot be made thinner.

As another method for realizing a thinner optical disk device, a method (referred to as Method 2) disclosed in Japanese Unexamined Patent publication No. 91850/1988 (Tokukaisho 63-91850) is available. In Method 2, as shown in FIG. 78, the magnetic head section 103 and the light pickup 102 are provided separately as non-integrated units. In FIG. 78, members 101, 105 and 106, 107, 108, and S101 to S105 respectively represent the spindle motor, the driving motors, an encoder, a controlling circuit, and switches. When the light pickup 102 is subjected under tracking control in the radial direction of the disk 104 so as to be moved, the magnetic head section 103 is controlled such that the magnetic head section 103 is moved for the same amount the light pickup 102 has moved. Here, prior to loading the cartridge, the magnetic head section 103 is retreated to the retreat position so as to avoid contacting the cartridge, and after loading the cartridge, the retreating of the magnetic head section 103 is released, and the magnetic head section 103 is placed in a position facing the light pickup 102 via the disk 104.

In Method 2, contrary to Method 1, the light pickup is not retreated. Thus, the light pickup does not collide with the wall of the cartridge constituting the window, thus allowing the objective lens of the light pickup to be moved into the window of the cartridge.

However, Method 2 has the following problem. That is, the position of the light beam spot converged by the light pickup on the disk is always changing in accordance with the tracking position control. In order to carry out recording and erasing of information under this condition, it is required that the region (supplementary magnetic field applied region) to be applied with a magnetic field for recording and reproducing by the magnetic head exactly coincides with the position of the light beam spot.

The supplementary magnetic field applied region has a characteristic of depending on an area facing the disk (core area) of a magnetic head core section.

Here, in order to improve the rising characteristic of the applied magnetic field, it is required to reduce the inductance of the coils. Thus, the core area cannot be made larger; consequently, the supplementary magnetic field applied region becomes small. Therefore, it is required to always accurately carry out, with respect to the small supplementary magnetic field applied region, positioning of the light beam spot which is changing constantly. For this reason, when the magnetic head section and the light pickup are provided separately as non-integral units as in Method 2, a problem is presented in that the positioning of the magnetic head section on the light pickup becomes difficult.

SUMMARY OF THE INVENTION

It is an object of the present invention to provide a thinner optical disk device.

It is another object of the present invention to provide a thinner optical disk device without interfering a positioning control of a magnetic head section on a light pickup.

In order to achieve the above-mentioned objects, a first optical disk device in accordance with the present invention is characterized by including a first unit composed of a turn table for mounting an optical disk and a rotor magnet fixed to the turn table, a second unit having a first stator coil, provided side by side with the first unit in a lateral direction, a first moving mechanism for moving the first unit upward when loading the optical disk so as to mount the optical disk on the turn table, and a second moving mechanism for moving the second unit in the lateral direction so that the second unit is adjacent to the first unit thereunder which has been moved upward, the second unit moved to a predetermined position for allowing the rotor magnet and the turn table to be rotatably driven in accordance with the magnetic field from the first stator coil.

With this arrangement, it is possible to realize a thinner spindle motor.

A second optical disk device in accordance with the present invention is characterized by including a light pickup for projecting a light beam onto a disk encased in the cartridge placed in a recording/reproducing position through movement within a moving region of the device so as to detect reflected light off the disk, magnetic field applying means for applying a magnetic field to the disk when recording and erasing information, loading means for carrying out (1) a loading operation for placing the cartridge on the recording/reproducing position and (2) an unloading operation for ejecting the cartridge out of the optical disk device from the recording and reproducing position, and switching means for moving, during loading and unloading operations, the magnetic field applying means to a predetermined retreat position outside a moving region of the cartridge in the optical disk device, wherein the magnetic field applying means are separatable from and linkable to the light pickup, the switching means (i) separating, during loading and unloading operations of the cartridge, the magnetic field applying means from the light pickup so as to move the magnetic field applying means to the predetermined retreat position and (ii) linking, during a recording operation on the disk in the cartridge, the magnetic field applying means to the light pickup.

With this arrangement, it is possible to realize a thinner optical disk device without interfering with a positioning control of the magnetic head section on the light pickup.

A third optical disk device in accordance with the present invention is characterized by including a light pickup for projecting a light beam onto a disk encased in the cartridge placed in a recording/reproducing position through movement within a moving region of the device so as to detect reflected light off the disk, a light pickup guiding member for guiding the light pickup in the radial direction of the disk, magnetic field applying means for applying a magnetic field to the disk when recording and erasing information, a motor for rotating the disk, and loading means for (1) loading the cartridge to the recording/reproducing position and (2) unloading the cartridge out of the optical disk device from the recording and reproducing position, wherein the motor includes (a) a first motor unit which moves towards the loaded disk and (b) a second motor unit which moves between a first space adjacent to the first motor unit before moving towards the disk and a second space which is created by the movement of the first motor unit towards the disk, and the movement of the second motor unit is guided by the light pickup guiding member.

With this arrangement, it is possible to realize a thinner optical disk device. Also, the manufacturing cost can be prevented from increasing, and recording and reproducing can be stably carried out.

For a fuller understanding of the nature and advantages of the invention, reference should be made to the ensuing detailed description taken in conjunction with the accompanying drawings.

BRIEF DESCRIPTION OF THE DRAWINGS

FIG. 3(a) and FIG. 3(b) are explanatory drawings respectively showing a magnetization state of a rotor magnet.

FIG. 4 is an explanatory drawing showing an arrangement of a stator coil.

FIG. 6(a) is a top view, FIG. 6(b) is a front view, and FIG. 6(c) is a front view in a vicinity of a lifting plate on a sliding plate.

FIG. 7(a) is a top view, FIG. 7(b) is a front view, and FIG. 7(c) is a front view in a vicinity of a lifting plate on a sliding plate.

FIG. 8(a) is a top view, FIG. 8(b) is a front view, and FIG. 8(c) is a front view in a vicinity of a lifting plate on a sliding plate.

FIG. 29(a) is a side view, FIG. 29(b) is a top view, and FIG. 29(c) is a front view in vicinities of a first and second supporting arms.

FIG. 30(a) through FIG. 30(c) are drawings showing an arrangement of the optical disk device of Tenth Embodiment before inserting a cartridge; FIG. 30(a) is a side view, FIG. 30(b) is a top view, and FIG. 30(c) is a front view in vicinities of the first and second supporting arms.

FIG. 31(a) through FIG. 31(d) are drawings showing an arrangement of the optical disk device of Tenth Embodiment after inserting a cartridge; FIG. 31(a) is a side view, FIG. 31(b) is a side view in a vicinity of a light pickup, FIG. 31(c) is a top view, and FIG. 31(d) is a front view in vicinities of the first and second supporting arms.

FIG. 32(a) and FIG. 32(b) are drawings showing an arrangement wherein a magnetic section and the light pickup of the optical disk device of Tenth Embodiment are linked to each other; FIG. 32(a) is a top view, and FIG. 32(b) is a front view in vicinities of the first and second supporting arms.

FIG. 33(a) and FIG. 33(b) are cross sectional views showing how the magnetic head section and the light pickup are linked to each other.

FIG. 34(a) is a top view, and FIG. 34(b) is a front view in vicinities of the first and second supporting arms.

FIG. 38 is a plan view showing an arrangement of a main component and a position of a recognizing sensor in an optical disk device in accordance with Twelfth Embodiment of the present invention.

FIG. 39(a) and FIG. 39(b) are cross sectional views showing an operation of the recognizing sensor.

FIG. 42 is a cross sectional view showing a mechanism for carrying out the loading and unloading operations.

FIG. 43(a) and FIG. 43(b) are plan views showing how the loading and unloading operations are carried out.

FIG. 44(a) is a side view, FIG. 44(b) is a top view, and FIG. 44(c) is a front view in a vicinity of a movable plate.

FIG. 49(a) is a side view and FIG. 49(b) is a top view.

FIG. 53(a) is a side view and FIG. 53(b) is a top view.

FIG. 54(a) is a top view and FIG. 54(b) is a front view.

FIG. 55(a) is a top view and FIG. 55(b) is a side view.

FIG. 56(a) through FIG. 56(c) are plan views showing an arrangement of a separated-type spindle motor.

FIG. 57(a) and FIG. 57(b) are plan views showing one arrangement of a lifting mechanism of the first motor unit.

FIG. 60(a) through FIG. 60(e) are drawings showing an arrangement, before inserting a cartridge, of an optical disk device in accordance with Seventeenth Embodiment of the present invention; FIG. 60(a) is a side view from the left, FIG. 60(b) is a top view, FIG. 60(c) is a side view from the right, FIG. 60(d) is a front view, and FIG. 60(e) is a front view in vicinities of the first and second supporting arms.

FIG. 61(a) is a side view, FIG. 61(b) is a top view, and FIG. 61(c) is a front view in vicinities of the first and second supporting arms.

FIG. 62(a) is a top view and FIG. 62(b) is a front view in vicinities of the first and second supporting arms.

FIG. 63(a) is a top view and FIG. 63(b) is a front view in vicinities of the first and second supporting arms.

FIG. 66 is a cross sectional view of an optical disk device in accordance with Eighteenth Embodiment of the present invention illustrating the loading and unloading operations.

FIG. 67(a) and FIG. 67(b) are plan views illustrating the loading and unloading operations.

FIG. 68(a) through FIG. 68(c) are drawings showing an arrangement of the optical disk device before inserting a cartridge; FIG. 68(a) is a side view, FIG. 68(b) is a top view, and FIG. 68(c) is a front view in a vicinity of the movable plate.

FIG. 73(a) is a side view from the left, FIG. 73(b) is a top view, and FIG. 73(c) is a side view from the right.

FIG. 77(a) is a side view, and FIG. 77(b) is a top view.

DESCRIPTION OF THE EMBODIMENTS

First Embodiment

Figure 1:
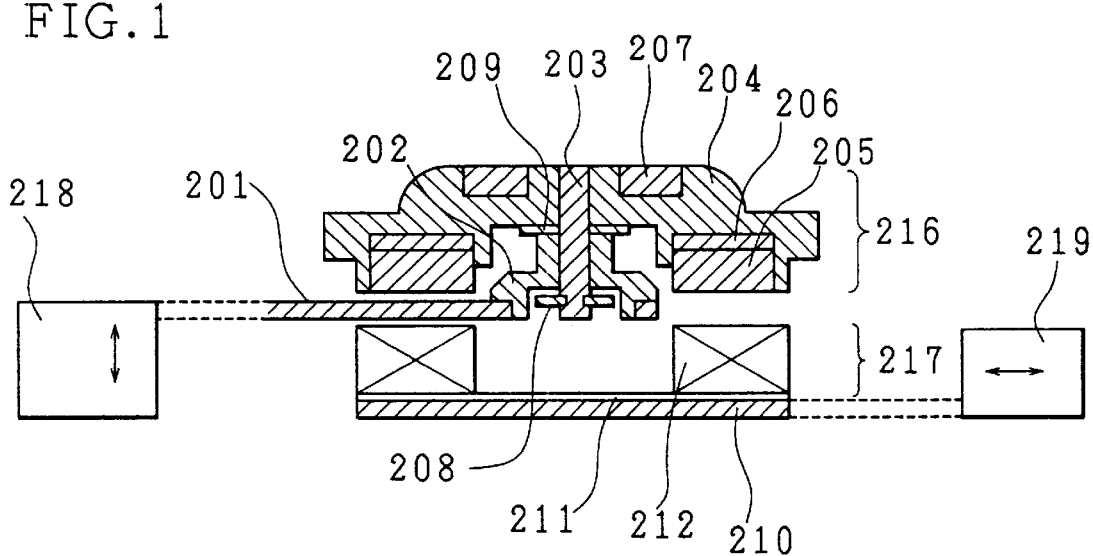
FIG. 1 is a cross sectional view showing an arrangement of a main component of an optical disk device in accordance with First Embodiment of the present invention.

FIG. 1 is a cross sectional view showing one arrangement of a main component (spindle motor) of an optical disk device of the present invention. In the present optical disk device, an optical disk is rotatably driven by the spindle motor of FIG. 1. Note that, in the following embodiment, unless noted, the use of the word "device" refers to the optical disk device.

A bearing support 201 is provided so as to lift the spindle motor with respect to a disk when loading a cartridge encasing an optical disk. To the bearing support 201, a bearing unit 202 is fixed. The bearing unit 202 is made of a material such as copper with oil, and for minuatualization, has an integrated structure composed of a conventional bearing holder and bearing. On the center of a turn table 204 (motor rotating section) on which a disk is set, a rotation shaft 203 is fixed with press-fitting, and a rotor magnet 205 is provided around the rotation shaft 203. The turn table 204 is made of a resin material to reduce the weight. On the upper portion of the turn table 204, a disk chucking magnet 207 is provided. Between the rotor magnet 205 and the turn table 204, a thin iron plate (magnetic material) is provided as a back yoke 206. In order to ensure smooth rotation of the turn table 204, and to prevent a direct contact between the turn table 204 and the bearing unit 202, a sliding section 209 is provided therebetween. Also, in order to prevent the rotation shaft 203 from coming off the bearing, the end portion of the rotation shaft 203 is engraved, and a washer 208 is attached around the groove. The rotor magnet 205 is divided into a number of regions in the circumferential direction, each of which is magnetized with a north pole and a south pole in an alternating pattern.

A stator coil 212 is provided on a coil support 210 via a flexible substrate 211. The coil support 210 is made of a magnetic material such as an iron plate, and serves also as a back yoke 211 on the coil side.

Note that, because the magnetization state of the rotor magnet 205, positioning of the stator coil 212, and wire connections are the same as those in the conventional example described above referring to FIG. 3 and FIG. 4, explanations thereof are omitted.

The spindle motor has the described arrangement. In the present embodiment, the spindle motor is composed of a first motor unit 216 and a second motor unit 217. All the components of the spindle motor except the stator coil 212 and its bearing constitute the first motor unit 216, and the second motor unit 217 is composed of the stator coil 212 and its bearing.

The first motor unit 216 is provided such that, due to the function of a lifting mechanism section 218 linked to the bearing support 201, the entire unit thereof can be lifted in the vertical direction. The second motor unit 217 is provided such that, due to the function of a sliding mechanism section 219 linked to the coil support 210, the entire unit thereof can be slid in the lateral direction.

The thickness of the second motor unit 217 provided with the stator coil 212 is set to a thickness the same as or not more than the lifting amount of the first motor unit 216 in the vertical direction.

FIG. 5(a) through FIG. 5(d) illustrate a cartridge loading operation adopting a spindle motor having the described arrangement. The loading operation adopted here is of what is generally called as a front loading system or a slot-in system.

(a) The spindle motor is composed of the first motor unit 216 and the second motor unit 217 which are positioned side by side. The first motor unit 216 and the second motor unit 217 are provided such that the lower surfaces thereof are on the same level. Namely, the lower surfaces of the bearing support 201 and the coil support 210 are on the same level. Also, the first motor unit 216 and the second motor unit 217 are respectively linked to the lifting mechanism section (not shown, described later) and the sliding mechanism section (not shown, described later) (see FIG. 5 (a)).

(b) A cartridge 220 inserted in a cartridge holder (not shown) is laterally carried to such a position that a disk 221 encased in the cartridge is coaxial to the spindle motor (see FIG. 5(b)).

(c) In the spindle motor, only the first motor unit 216 linked to the lifting mechanism section is lifted upward by the lifting mechanism section towards the cartridge 220, and a center hub 222 of the disk (absorption target) is drawn to the first motor unit 216 by the magnetic absorption force of the chucking magnet 207 integrated with the turn table 204 so that the disk 221 is held on the turn table 204. Here, since the first motor unit 216 is lifted upward, a space is created for the amount of the up-lifting below the first motor section chucking the disk (see FIG. 5(C)).

(d) The second motor unit 217 linked to the sliding mechanism section is slid by the sliding mechanism section to the space below the first motor unit 216. Here, the rotor magnet 205 of the first motor unit 216 and the stator coil 212 of the second motor unit 217 face each other appropriately (see FIG. 5(d)).

As a result, the components of the spindle motor, the first motor unit 216 and the second motor unit 217, are integrated into a single unit, resulting in an arrangement the same as the conventional integrated spindle motor.

(e) The stator coil 212 is provided in a magnetic circuit gap created by (1) the rotor magnet 205 having a back yoke and (2) the back yoke 211 on the stator coil side, and a current is sent to each coil, thereby permitting the rotation of the turn table 204 to be controlled by, for example, a three-phase half wave current control.

In the case of carrying out an ejecting operation for taking out of the cartridge, the operation of (a) to (d) is reversed.

The distance between the upper surface of the turn table 204 and the lower surface of the rotor magnet 205 of the first motor unit 216 is denoted as H1, the thickness of the bearing support 201 is denoted as H2, the distance between the upper surface of the stator coil 212 and the lower surface of the coil support 210 of the second motor unit 217 is denoted as H3, and the lifting amount of the first motor unit 216 in the vertical direction is denoted as $\Delta$H1. Note that, between the upper surface of the turn table 204 and the lower surface of the cartridge, a small spacing is provided in order to avoid the upper surface of the turn table 204 from contacting the cartridge when inserting the cartridge.

Here considers the dimension of thickness H required between the upper surface of the turn table 204 and the lower surface of the spindle motor (lower surfaces of the first and second motor units) in the spindle motor. In the arrangement of (a) and (b), since the first motor unit and the second motor unit are positioned side by side with their lower surfaces on the same level, the dimension of thickness H required is the height of the first motor unit, that is, H1+H2.

In the arrangement of (c), the lifting amount $\Delta$H1 of the first motor unit is required, whereas in the arrangement of (d), since the second motor unit needs to be slid only in the lateral direction and satisfies the condition of H3$\leq\Delta$H1, it is not required to provide an additional height.

Hence, the dimension of the thickness H required between the upper surface of the turn table and the lower surface of the spindle motor is determined by the following equation.

$$H=H1+H2+\Delta H1$$

Figure 2:
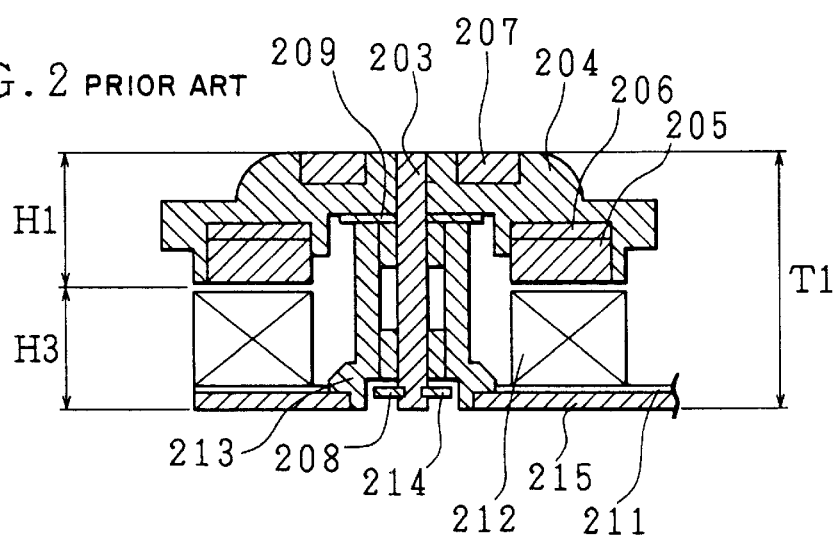
FIG. 2 is a cross sectional view showing an arrangement of a main component of a conventional optical disk device as a comparative example.

The following considers a case, as a comparative example, the dimension of thickness T between the upper surface of the turn table and the lower surface of spindle motor (lower surface of motor chassis), which is required in the conventional integrated spindle motor. In the arrangement of the motor shown in FIG. 2, the height of the spindle motor T1 between the upper surface of the turn table and the lower surface of the motor chassis can be represented by the equation of T1=H1+H3. Note that, here, the thickness H2 of the bearing support 201 of the first motor unit 216 of the present embodiment is not included in the equation, because the bearing support 201 is required only when the first motor unit and the second motor unit are provided as separate units. The lifting amount $\Delta$H2 of the integrated spindle motor when chucking the disk is the same as that in the separated spindle motors so that $\Delta$H2=$\Delta$H1.

Hence, the dimension of the thickness T required between the lower surface of the cartridge and the lower surface of the device is represented by the following condition:

$$T=T1+\Delta H2=H1+H3+\Delta H1$$

The following considers a case where the dimensions of the thickness T of the comparative example (conventional example) and the thickness H of the present embodiment between the upper surface of the turn table and the lower surface of the spindle motor, respectively, are compared. The difference between the thickness T and the thickness H is represented by the following equation:

$$T-H=H3=H2$$

Here, considering ①̂ the bearing support 201 of the first motor unit 216 of the present embodiment can be made of a thin plate, namely, H2 can take a significantly small value, and ②̂ the height between the upper surface of the stator coil and the lower surface of the coil support is increased in accordance with the thickness of the stator coil even when the thickness of the coil support and the thickness of the bearing support are the same, namely, H3 cannot take a significantly small value, H2 and H3 are related to each other by the following relation:

$$H2<H3$$

so that $$T-H=H3-H2>0$$

Thus, as in the present embodiment, by adopting a spindle motor composed of separate units, compared with the conventional spindle motor, the dimension of the thickness required between the upper surface of the turn table and the lower surface of the spindle motor in the spindle motor can be made smaller.

Note that, although the present embodiment adopts an arrangement wherein the bearing unit 202 is fixed to the bearing support 201, and the rotation shaft 203 is fixed to the center of the turn table 204, it is possible to adopt an arrangement wherein the rotation shaft 203 is fixed to the bearing support 201, and the bearing unit 202 is fixed to the center of the turn table 204.

The following explains, based on an example, a first motor unit lifting mechanism and a second motor unit sliding mechanism when loading a cartridge.

Figure 6:
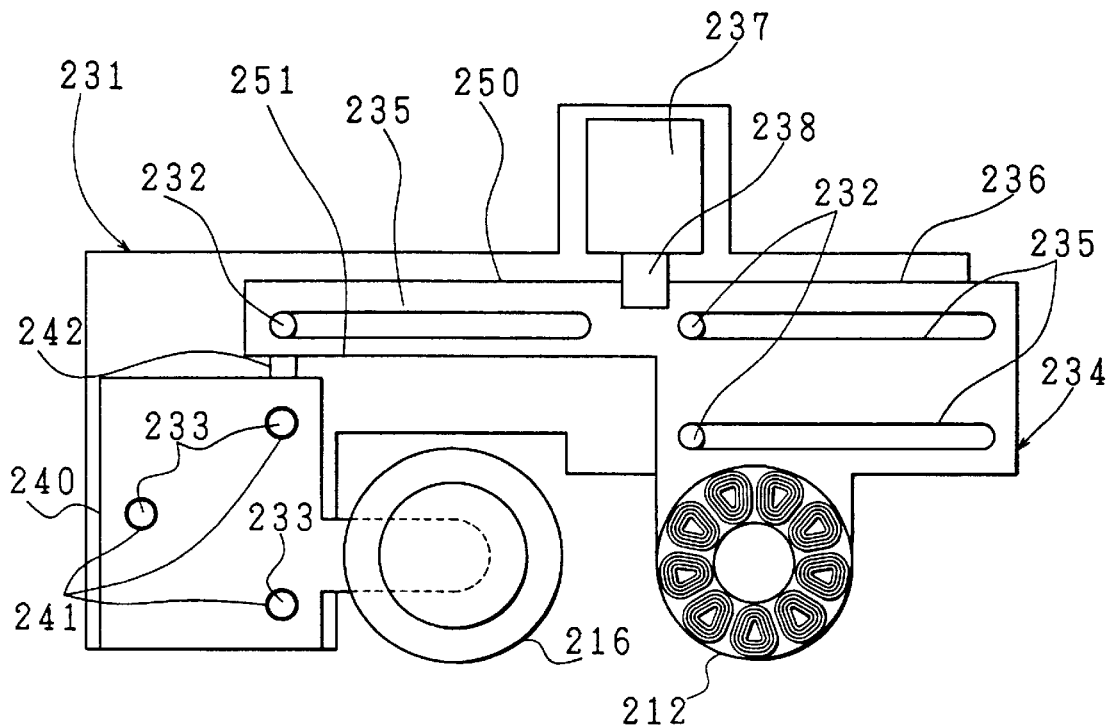
FIG. 6(a) through FIG. 6(c) are drawings illustrating an operation of a lifting mechanism and a sliding mechanism.
Figure 6:
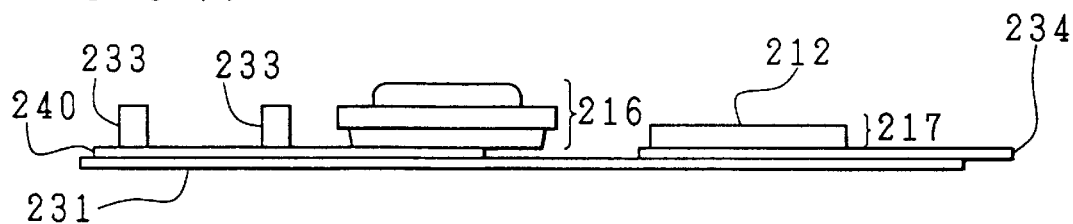
Figure 6:
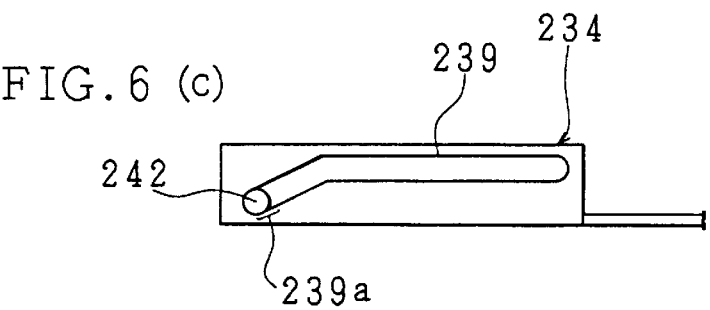

As shown in FIG. 6(a) through FIG. 6(c), on a loading base 231, slide guiding pins 232 and first lift guiding pins 233 are fixed, and on portions of a sliding plate 234 provided on the loading base 231, corresponding to the slide guiding pins 232, long slide guiding slits 235 are formed so that the sliding plate 234 can be slid freely along the slide guiding slits 235. On one end of the sliding plate 234, a first bending portion 250 is provided. The first bending portion 250 is provided with a rack gear 236. Also, on the end of the loading base 231, a loading motor 237 is fixed, and a pinion gear 238 is provided on the rotation shaft of the loading motor 237.

Figure 10:
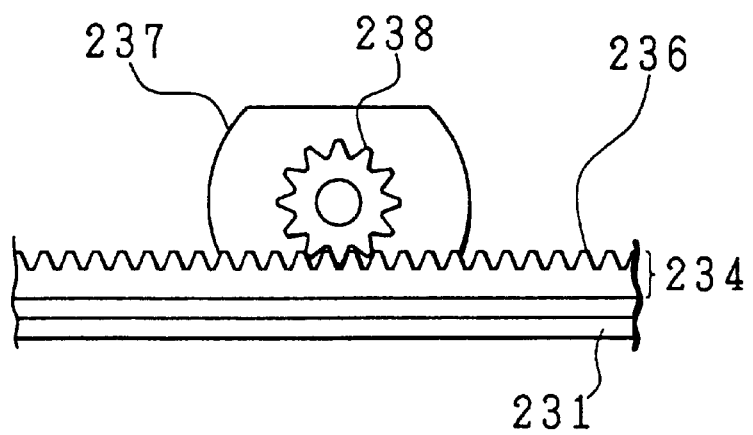
FIG. 10 is a plan view showing an arrangement in a vicinity of a combined portion of the sliding plate and a loading motor.

As shown in FIG. 10, the pinion gear 238 and the rack gear 236 are provided in mesh with smooth engagement.

On the other end of the sliding plate 234, a second bending portion 251 is provided, and on the second bending portion 251, a long lift guiding slit 239 having an inclined portion is provided. Also, on the sliding plate 234, a first stator coil 212 is provided. The sliding plate 234 also serves as a back yoke, constituting the second motor unit.

Figure 9:
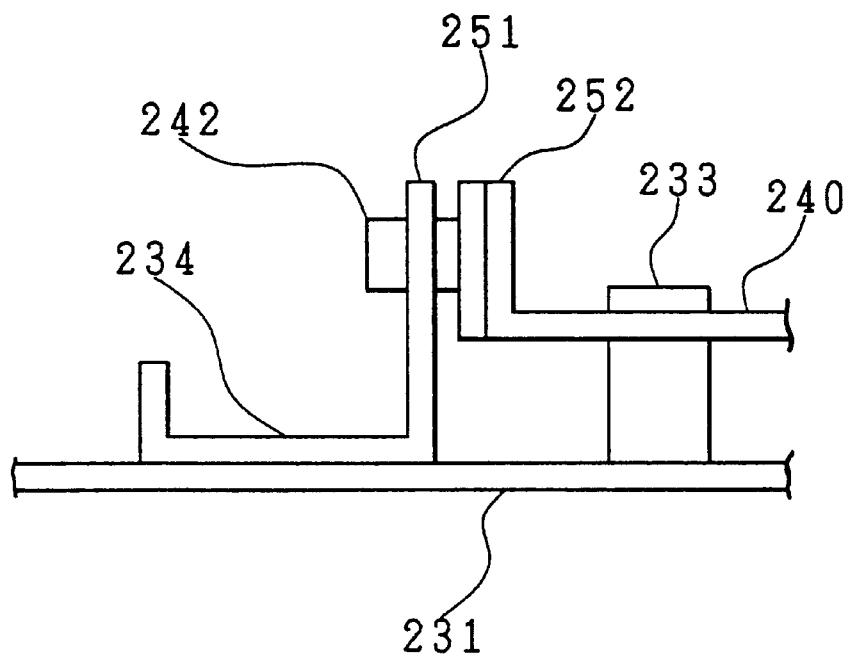
FIG. 9 is a plan view showing an arrangement in a vicinity of a combined portion of the sliding plate and the lifting plate.

On portions of a lifting plate 240, corresponding to the lift guiding pins 233, lift guiding slits 241 are provided so that the lifting plate 240 can be lifted freely in the vertical direction along the lift guiding pins 233. As shown in FIG. 9, on one end of the lifting plate 240, a bending portion 252 is provided, and a second lift guiding pin 242 is fixed to the bending portion 252. Also, on the end portion of the lifting plate 240 which serves as the bearing support, the first motor unit 216 composed of the turn table fixing the rotor magnet is provided.

The following will describe operations of the first motor unit lifting mechanism and the second motor unit sliding mechanism having the described arrangements.

FIG. 6(a) through FIG. 6(c) respectively show an arrangement wherein a cartridge has been inserted into the cartridge holder. The second lift guiding pin 242 of the lifting plate 240 is interlocked with the lift guiding slit 239 of the sliding plate 234. The second lift guiding pin 242 is positioned at a bottom portion 239a of the lift guiding slit 239 so that the first motor unit 216 of the lifting plate 240 is positioned on the lower portion of the device, thus preventing interference with the insertion of the cartridge. The lower surface of the second motor unit 217 of the sliding plate 234 is on the same level as the lower surface of the first motor unit 216, and the first motor unit 216 and the second motor unit 217 are positioned with a distance therebetween.

When a sensor (not shown) detects that the cartridge has been inserted into the cartridge holder, a driving current is sent to the loading motor 237 by a motor controlling section (not shown), and the loading motor 237 starts rotating. When the pinion gear 238 of the loading motor is rotated, since the rack gear 236 provided on one end of the sliding plate 234 is in mesh with the pinion gear 238, the sliding plate 234 starts being slid. The sliding direction is restricted in one direction by the slide guiding pins 232 and the slide guiding slits 235. Also, the moving direction of the lifting plate 240 is restricted in the vertical direction by the first lift guiding pins 233 and the lift guiding slits 241. Thus, when the sliding plate 234 slides, the second lift guiding pin 242 interlocked with the lift guiding slit 239 of the sliding plate 234 moves along the inclined portion 239b of the lift guiding slit 239. As a result, the first motor unit 216 of the lifting plate 240 moves upward by the amount of Δk which is the height of the inclined portion 239b of the lift guiding slit 239. Here, the second motor unit 217 provided with the stator coil 212 is moved to a position in a vicinity of the first motor unit 216 in accordance with the sliding made by the sliding plate 234. FIG. 7(a) through FIG. 7(c) illustrate how this is carried out.

Figure 8:
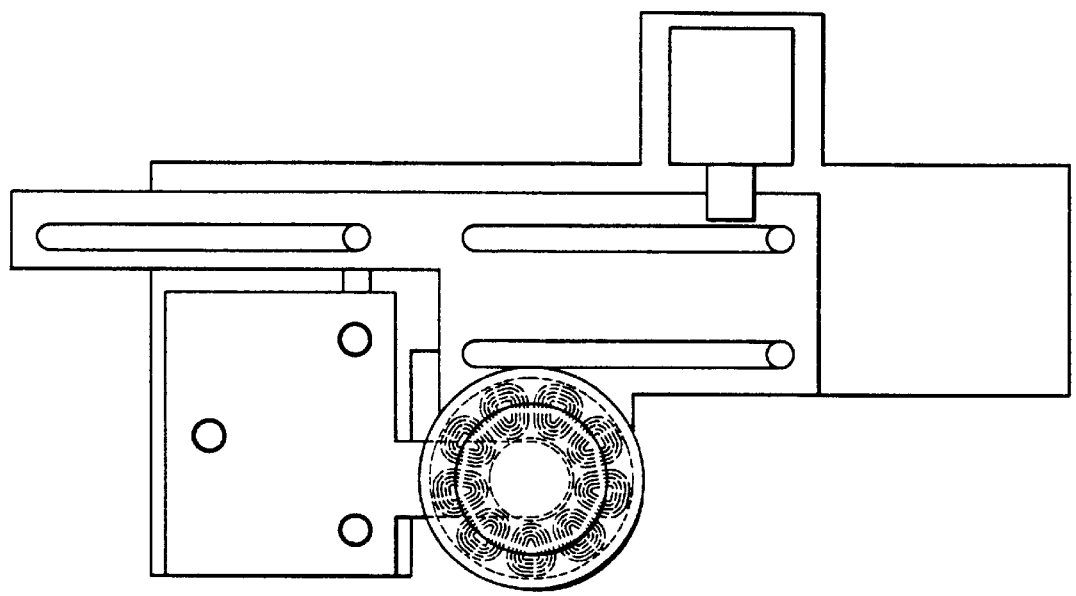
FIG. 8(a) through FIG. 8(c) are drawings illustrating the operation of the lifting mechanism and the sliding mechanism.
Figure 8:
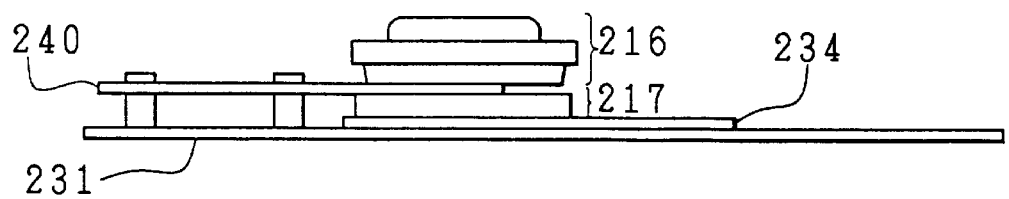
Figure 8:
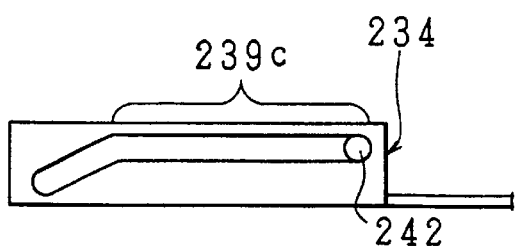

When the loading motor is driven further, and the sliding plate 234 is moved, since the second lift guiding pin 242 is interlocked with a level portion 239c of the lift guiding slit 239, the first motor unit 216 on the lifting plate 240 is not moved in the vertical direction, but is fixed. On the other hand, the second motor unit 217 on the sliding plate 234 is moved in accordance with the movement of the sliding plate 234 to a space which had been occupied by the first motor unit 216 prior to moving upward. The second motor unit 217 thus moved below the first motor unit 216, together with the first motor unit 216, functions as the spindle motor, and in response to a signal from a sensor (not shown) upon detecting this positioning of the first motor unit 216 and the second motor unit 217, the motor driving current from the motor controlling section is cut off, thus stopping the rotation of the loading motor. FIG. 8(a) through FIG. 8(c) illustrate how this is carried out.

In the case of carrying out an ejecting operation for taking out of the cartridge, the described operation is carried out in the reversed order by reversing the rotation direction of the loading motor.

Note that, although the explanations given above are based on a system wherein the sliding plate is moved by the loading motor, the present invention is not limited to the specified one. As long as the lifting operation of the first motor unit and the sliding operation of the second motor unit are appropriately carried out, other systems, such as a system wherein the sliding plate is moved by a spring force of a coil, may be adopted.

Second Embodiment

The optical disk device of the present embodiment is characterized by the bearing support 201 provided on the spindle motor of the optical disk device of First Embodiment. Other members of the present embodiment have the same functions as that of First Embodiment, and therefore are given the same reference numerals, and explanations thereof are omitted.

Figure 11:
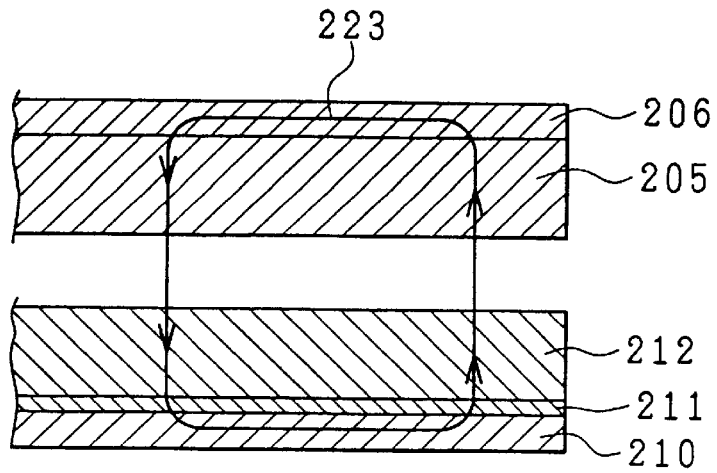
FIG. 11 is an explanatory drawing showing a magnetic flux in a magnetic circuit of an optical disk device not provided with a bearing support, as a comparative example of an optical disk device in accordance with Second Embodiment of the present invention.

FIG. 11 shows a magnetic circuit in the case where the bearing support 201 is not inserted into a magnetic gap between the rotor magnet 205 and the stator coil 212. The rotor magnet 205 is divided into a number of regions in the circumferential direction, each of which is magnetized with a north pole and a south pole in an alternating pattern. The arrow in FIG. 11 indicates a magnetic line.

The rotor magnet 205, the stator coil side back yoke (coil support) 210, and the rotor magnet side back yoke 206 constitute a magnetic circuit 223, and a spacing between the rotor magnet 205 and the stator coil side back yoke 210 is a magnetic gap. In the magnetic gap is the stator coil 212 which is fixed to the back yoke 210 on the stator coil side.

Figure 12:
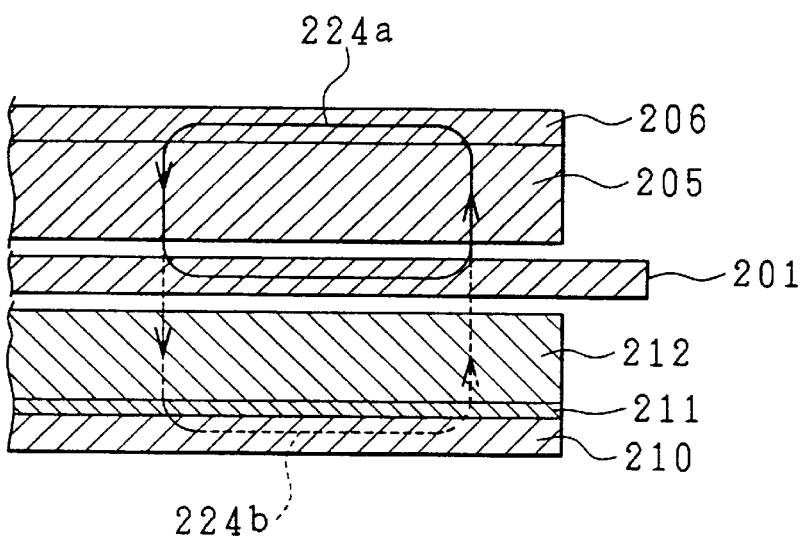
FIG. 12 is an explanatory drawing showing, as a comparative example, a magnetic flux in a magnetic circuit of an optical disk device provided with a bearing support made of a magnetic material.

FIG. 12 shows a magnetic circuit wherein the bearing support 201 is inserted into the magnetic gap between the rotor magnet 205 and the stator coil 212. In the case where the bearing support 201 is made of a magnetic material, a single magnetic path 224a is formed by the rotor magnet 205, the bearing support 201, and the rotor magnet side back yoke 206. Thus, leaking magnetic flux 224b from the magnetic path 224a is the only magnetic flux at the gap portion where the stator coil is provided so that the quantity of the magnetic flux at this portion is fewer than that at the portion where the bearing support 201 is not provided, and therefore only a small magnetic flux density is obtained. As a result, the rotation driving force of the rotor magnet obtained while energizing the stator coil becomes weak.

Figure 13:
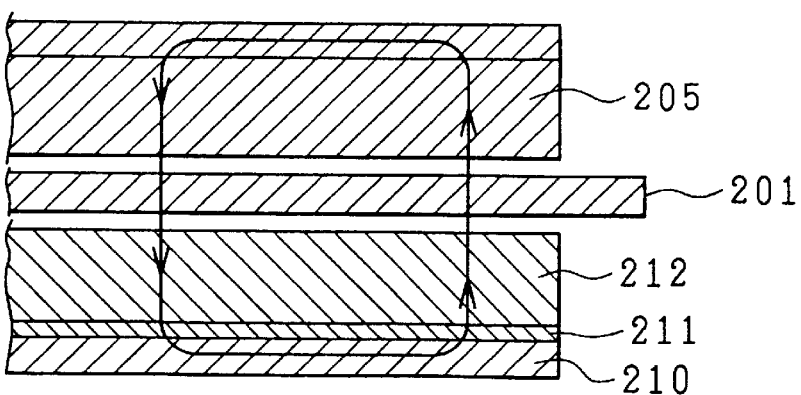
FIG. 13 is an explanatory drawing showing a magnetic flux in a magnetic circuit of an optical disk device provided with a bearing support made of a non-magnetic material.

In order to solve this problem, in the present embodiment, the bearing support 201 is made of a non-magnetic material. FIG. 13 shows a magnetic circuit in the case where the bearing support 201 made of a non-magnetic material is inserted into the magnetic gap between the rotor magnet 205 and the stator coil 212. Since the bearing support 201 is made of a non-magnetic material, the magnetic flux transmits through the bearing support 201. Thus, the same magnetic circuit as obtained when the bearing support 201 is not provided is formed. As a result, it is possible to substantially completely eliminate the adverse effect on the magnetic circuit caused by the presence of the bearing support in the magnetic gap.

Note that, in the above-explanation, the entire bearing support 201 is made of a non-magnetic material; however, a portion of the bearing support 201, facing the stator coil 212, may be made of a non-magnetic material.

Third Embodiment

The optical disk device of the present embodiment has the same arrangement as that of First Embodiment or Second Embodiment except that the shape of the stator coil 212 is modified.

In First and Second Embodiment, the stator coil 212 is provided below the bearing support 201. With this arrangement, it is required that the combined thickness of the stator coil 212 and the stator coil side back yoke 210 be confined only in the range of the lifting amount of the first motor unit 216, and therefore it is difficult to ensure a sufficient number of winding wires around the stator coil 212. Also, in First and Second Embodiment, the examples are based on the case wherein the lifting operation in the vertical direction required for chucking of the disk onto the spindle motor is carried out entirely by the spindle motor. However, for example, in a recording-reproducing MD device, in order to provide a space for an external magnetic field generating head, which is required for recording of information, on the opposite side of an optical head on the other side of the disk, there is a case where it is required to share the lifting amount by the down-lifting of the cartridge and the up-lifting of the spindle motor. In such a case, the lifting amount of the spindle motor is further reduced, and it becomes impossible to provide a space for winding of wires around the stator coil 212.

Figure 14:
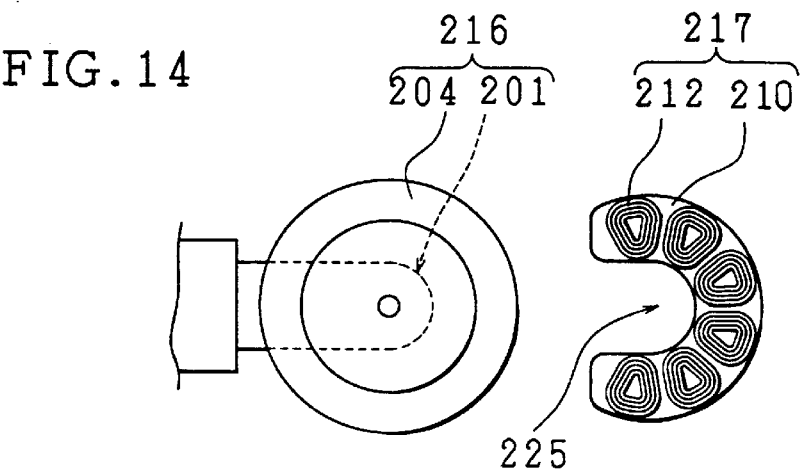
FIG. 14 is a plan view showing an arrangement of a main component of an optical disk device in accordance with Third Embodiment of the present invention.

FIG. 14 is a plan view of an optical disk device having an arrangement wherein a cut-out portion is provided on the second motor unit 217 so as to prevent interference of the second motor unit 217 with the bearing support 201 of the first motor unit 216 when sliding. The second motor unit 217 composed of the stator coil 212 and the stator coil side back yoke 210 is provided with a cut-out portion 225, and is linked to the sliding mechanism section (not shown).

As described, in the cartridge loading operation, the first motor unit 216 is lifted upward by the lifting mechanism section with respect to the cartridge which has been moved laterally, and the second motor unit 217 is moved by the sliding mechanism section to the space created by the uplifting of the first motor unit 216. The cut-out portion 225 of the second motor unit 217 is provided in such a shape that interference with the bearing support 201 of the first motor unit 216 is not caused when the second motor unit 217 is slidably moved.

Figure 15:
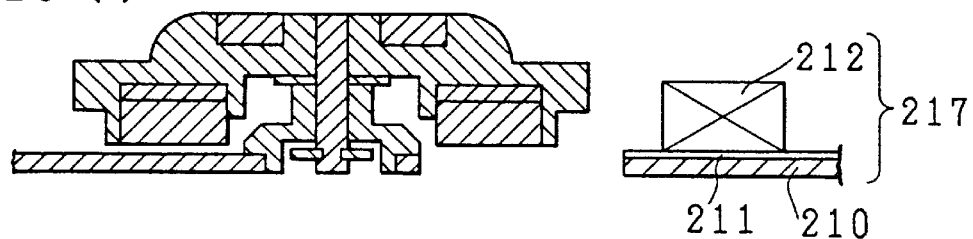
FIG. 15(a) through FIG. 15(c) are cross sectional views illustrating an operation of a motor during a cartridge loading operation.
Figure 15:
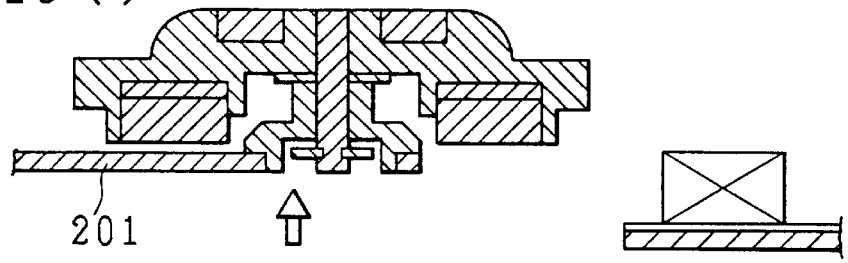
Figure 15:
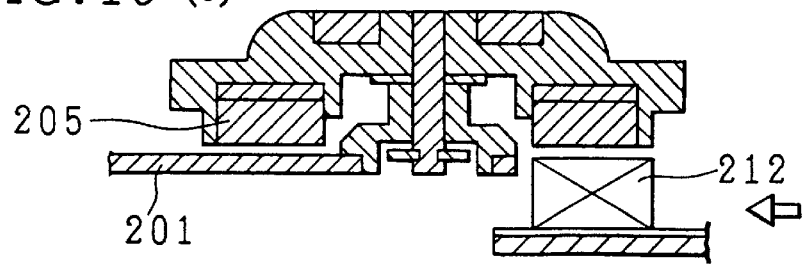

FIG. 15(a) is a cross sectional view of the spindle motor prior to up-lifting of the first motor unit 216. The lower surface of the coil support (stator coil side back yoke) 210 is on the same level as the lower surface of the bearing support 201 of the first motor unit 216.

FIG. 15(b) is a cross sectional view of the spindle motor prior to sliding of the second motor unit 217 after the up-lifting of the first motor unit 216. The upper surface of the stator coil 212 is on the same level as the upper surface of the bearing support 201 of the first motor unit 216.

FIG. 15(c) is a cross sectional view of the spindle motor after sliding of the second motor unit 217 is made. The upper surface of the stator coil 212 is on the substantially same level as the upper surface of the bearing support 201.

As described, the optical disk device of the present embodiment has an arrangement wherein the cut-out portion is provided on the second motor unit so as to avoid interference of the cut-out portion with the bearing support of the first motor unit when sliding is made by the second motor unit. For this reason, it is not required, unlike First and Second Embodiment, that the upper surface of the stator coil 212 be lower than the lower surface of the bearing support 201 of the first motor unit 216, and therefore it is possible to provide a large margin for the stator coil 212 by the amount of the thickness of the bearing support 201, thereby allowing a sufficient number of winding wires around the coil.

Fourth Embodiment

In Third Embodiment, because the second motor unit 217 is partially cut-out in a shape which does not cause interference with the bearing support 201 when sliding, and because no coil is provided on this cut-out portion, no motor rotation driving force is generated thereon.

The optical disk device of the present embodiment aims to overcome this drawback by proving the bearing support 201 with a cut-out stator coil as a second stator coil so as to increase the motor rotation driving force.

Figure 7:
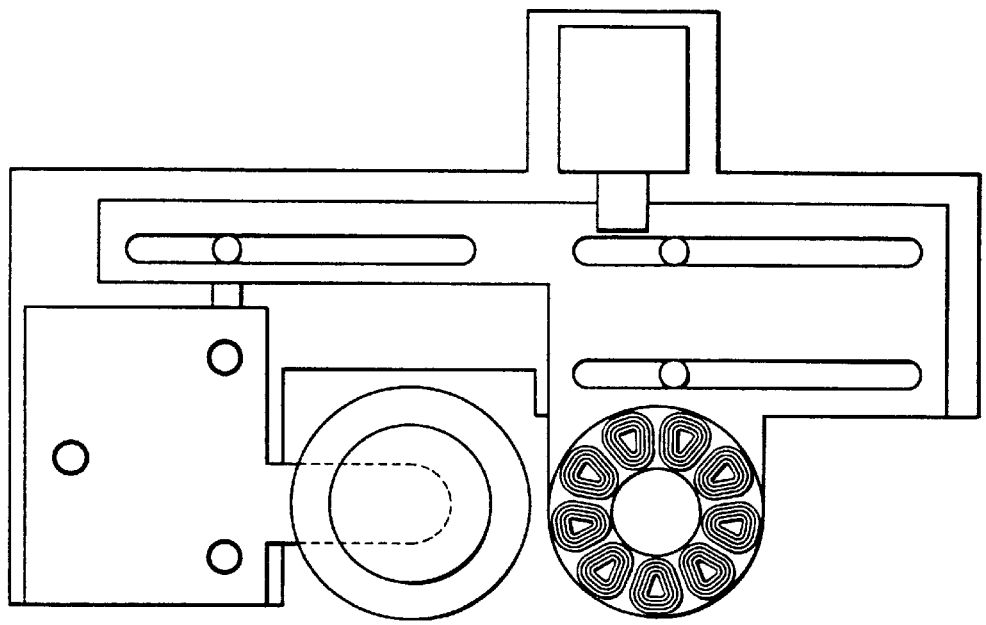
FIG. 7(a) through FIG. 7(c) are drawings illustrating the operation of the lifting mechanism and the sliding mechanism.
Figure 7:
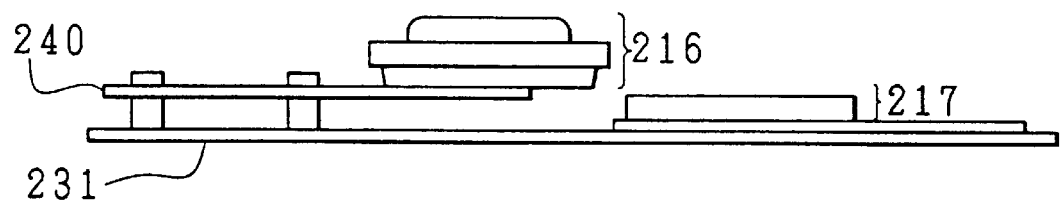
Figure 7:
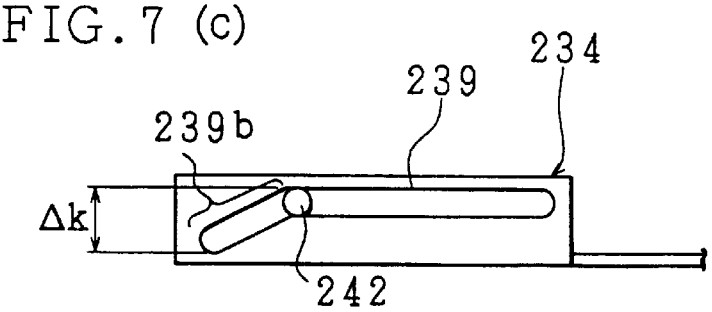

Although it is preferable that a winding coil such as the first stator coil is provided on the bearing support 201, in the arrangement of a thin motor of FIG. 7, there is substantially no space for such a winding coil between the bearing support 201 and the rotor magnet 205.

Incidentally, a stator coil which is generally adopted has an arrangement wherein a plurality of coils, each wound with a copper wire covered with an insulated sheath for a predetermined number of times, are positioned in a ring. Also, a new type of coil, an HP (Hybrid Pattern) coil has been brought into use in some applications as a successor of the conventional coil. The HP coil has an arrangement wherein a copper foil applied with an insulating material is wound in a spiral form, and a plurality of the spiral coil prepared in this manner are positioned in a ring and fixed by resin. One of the characteristics of the HP coil is that coils are directly fixed to one another by resin so that it is not required, unlike the conventional coil, to provide a substrate for fixing coils, and the substrate and the coils are provided as an integral unit, thus making the coils thinner.

Figure 16:
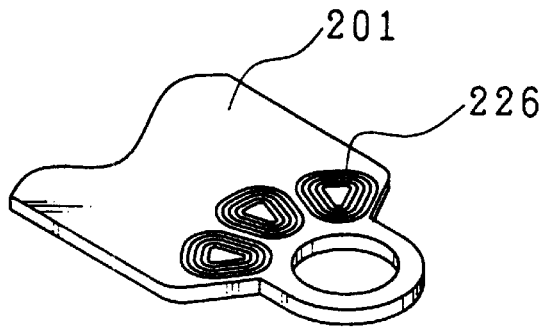
FIG. 16 is a perspective view showing an arrangement of a second stator coil of an optical disk device in accordance with Fourth Embodiment of the present invention.

In the present embodiment, as shown in FIG. 16, the bearing support 201 is provided with HP coils 226 having the same thickness as the bearing support 201. The first stator coil (stator coil 212) to be slid and the second stator coil 226 provided on the bearing support 201 are combined with each other by a coil current controlling circuit section (not shown), and a current is sent to the coils, thus realizing a thin spindle motor with a large motor rotation driving force. Also, since the second stator coil (HP coils 226) and the bearing support 201 are provided as an integral unit, no additional space is required.

Fifth Embodiment

In the described embodiment, the first and second stator coils 212 and 226 are combined with each other by the coil current controlling circuit section (not shown).

Incidentally, in the described loading operation of a cartridge, the second stator coil 226 is lifted upward as the first motor unit 216, and the first stator coil 212 is slid to the space which had been occupied by the first motor unit 216 prior to moving upward. Here, both the first and second stator coils are moved, and since coils are connected to the coil current controlling circuit section via lead wires, the lead wires are dragged along with the movement of the stator coils. In particular, because the amount of sliding made by the first stator coil 212 is large, in order to take an account of the dragging of the wires by the first stator coil 212, a large space is required, and also the lead wires become susceptible to breakage by repeated movement.

Figure 17:
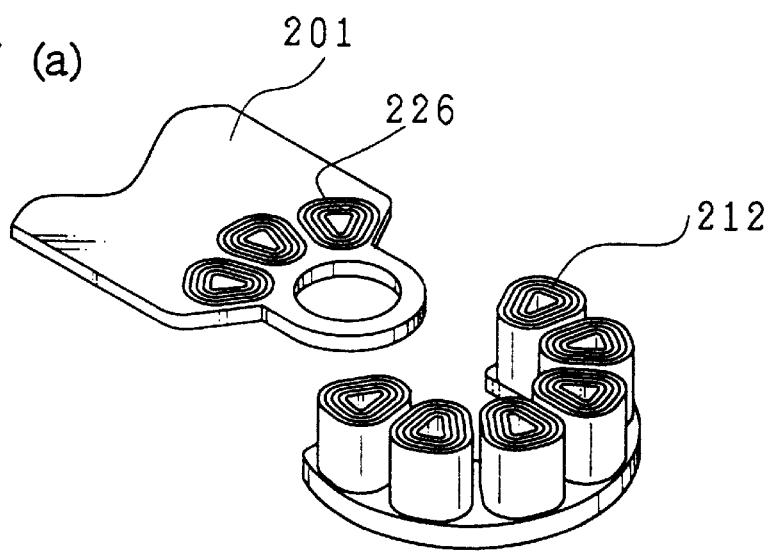
FIG. 17(a) and FIG. 17(b) are perspective views showing an operation of a stator coil during a cartridge loading operation of an optical disk device in accordance with Fifth Embodiment of the present invention.
Figure 17:
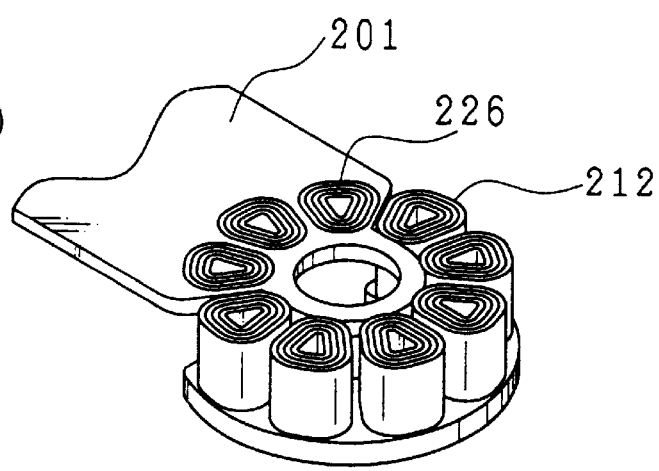

As shown in FIG. 17(a) and FIG. 17(b), when the first stator coil 212 is slidably moved, the first stator coil 212 and the second stator coil 226 provided on the bearing support 201 become adjacent to each other on the coil sides.

In the present embodiment, connection terminals are respectively provided on the adjacent sides of the first stator coil 212 and the second stator coil 226 so as to face each other, and as shown in FIG. 17(b), when the first stator coil 212 is slidably moved, and is adjacent to the second stator coil 226, the first stator coil 212 and the second stator coil 226 are directly combined with each other via the connection terminals.

Figure 18:
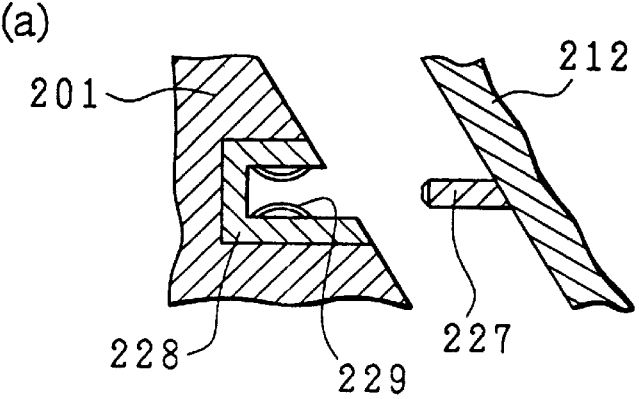
FIG. 18(a) and FIG. 18(b) are cross sectional views showing how a first stator coil and a second stator coil are combined with each other.
Figure 18:
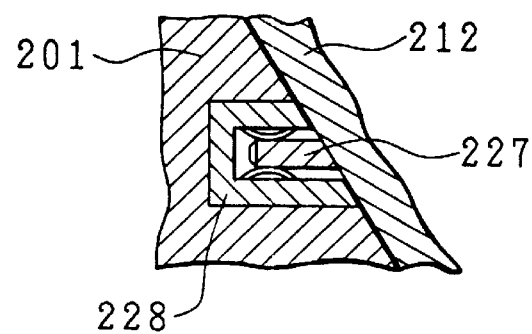

FIG. 18(a) and FIG. 18(b) show how the first stator coil 212 and the second stator coil 226 provided on the bearing support 201 are directly combined with each other when the first stator coil 212 is slidably moved.

FIG. 18(a) shows an arrangement before the first stator coil 212 is slidably moved. On the side portion of the first stator coil 212, a connection pin 227 is provided as a connection terminal. On the side portion of the bearing support 201 facing the connection pin 227, a connection jack 228 is provided, and in the connection jack 228, a connection contact 229 is provided. Note that, the connection pin 227 and the connection contact 229 are respectively connected to the first stator coil 212 and the second stator coil 226.

FIG. 18(b) shows an arrangement after the first stator coil 212 is slidably moved. The connection pin 227 provided on the first stator coil 212 is inserted into the connection jack 228 provided on the bearing support 201 so that the connection pin 227 comes into contact with the connection contact 229.

The first stator coil 212 and the second stator coil 226 are directly combined with each other in the described manner. Thus, provided that the second stator coil 226 is connected to the coil current controlling circuit section, it is not required to connect the first stator coil 212 to the coil current controlling circuit section via a lead wire. As a result, it is not required to provide a space for lead wires which are dragged by the first stator coil 212, and also the breakage of the lead wires caused by the repeated movement is prevented.

Note that, it is possible to adopt an arrangement wherein no lead wires are attached to the second stator coil 226, and the first stator coil 212 is connected to the coil current controlling circuit section.

Sixth Embodiment

In the optical disk device of the present embodiment, in an arrangement wherein the stator coil 212 is provided with a cut-out portion as in Third Embodiment, a member for detecting the position of the rotor magnet 205 is provided on the bearing support 201. The following describes this arrangement.

When carrying out a rotation control of the spindle motor, it is required to detect the position of the rotor magnet 205. This is because, as described above referring to FIG. 3(a) through FIG. 4, since the rotor magnet 205 is divided in the circumferential direction, and is magnetized with a north pole and a south pole in the direction of thickness, and because the direction of magnetic flux received by the stator coil 212 facing the rotor magnet 205 is constantly changing, in order to maintain the rotation direction of the rotor magnet 205 constant, it is required to decide as to which coil of the stator coil 212 should be energized and in which direction.

Although a sensor-less controlling system not requiring a rotor magnet position detecting element has been developed, a rotor magnet position detecting system adopting a hall element has been still widely adopted due to its simple operation of rotation control.

Figure 19:
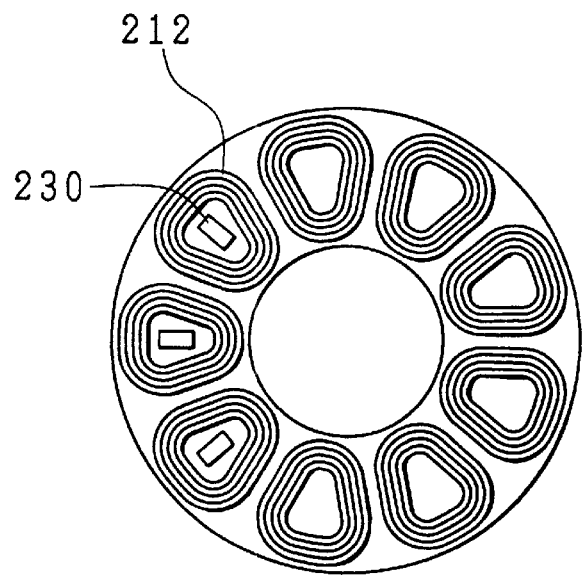
FIG. 19 is a plan view showing an arrangement of hall elements, as a comparative example of an optical disk device in accordance with Sixth Embodiment of the present invention.

As shown in FIG. 19, a hall element 230 is generally provided on the central portion of a winding coil constituting the stator coil 212. However, as the motor is made smaller and thinner, it becomes necessary to reduce the size of the stator coil, consequently, the central portion of a winding coil to be provided with the hall element 230 becomes significantly smaller. As a result, it becomes impossible to provide the hall element on the central portion of the winding coil.

Figure 20:
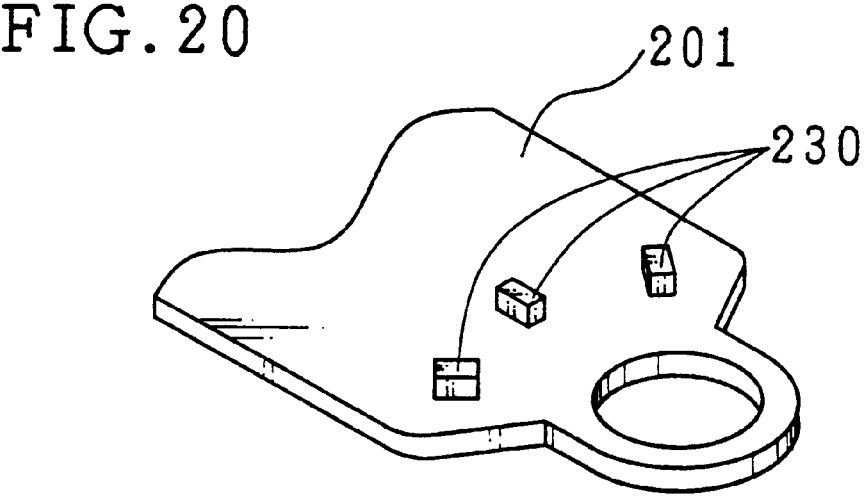
FIG. 20 is a perspective view showing one arrangement of the hall elements.

In order to counteract this problem, in the present embodiment, hall elements are provided on the bearing support 201. FIG. 20 shows an arrangement wherein hall elements 230 are provided on the bearing support 201 constituting the first motor unit 216. Here, the bearing support 201 is not provided with the second stator coil, but rather provided only with the hall element 230. With this arrangement, it is possible to accurately detect the position of the rotor magnet 205. Also, when the hall elements 230 are provided on the central portions of the winding coils of the stator coil 212 which is provided circumferentially (cut-out portion is not provided), the detection of the rotor magnet position can be made in the same way as in the conventional method.

Figure 21:
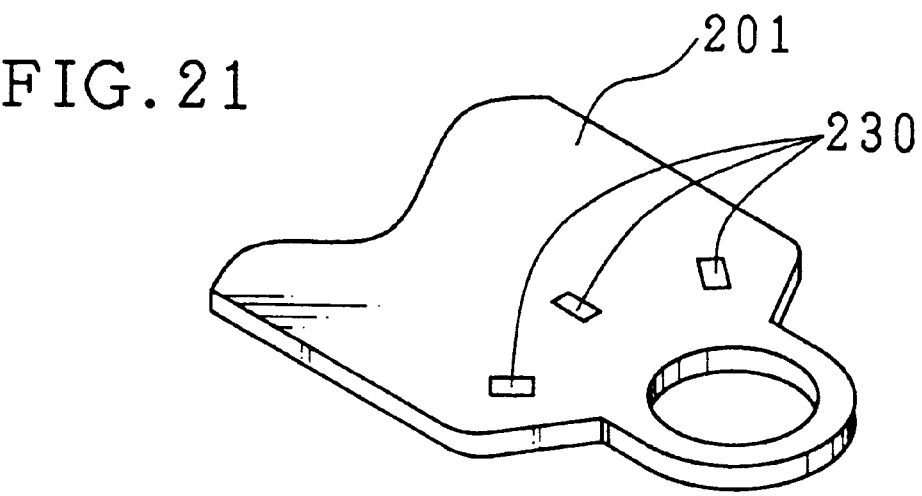
FIG. 21 is a perspective view showing another arrangement of the hall elements.

Note that, a significantly smaller and thinner hall element has been developed, enabling an arrangement wherein the hall elements are provided on the bearing support, or an arrangement wherein the hall elements are provided as an integral unit with the bearing support. In the arrangement of the latter, as shown in FIG. 21, the thickness of the hall elements is within the thickness of the bearing support.

Seventh Embodiment

The optical disk device of the present embodiment aims to overcome the problem presented, as in Third Embodiment, when the second motor unit 217 is provided with the cut-out portion.

First, explanations will be given through a comparison with a case where the cut-out portion is not provided.

Figure 22:
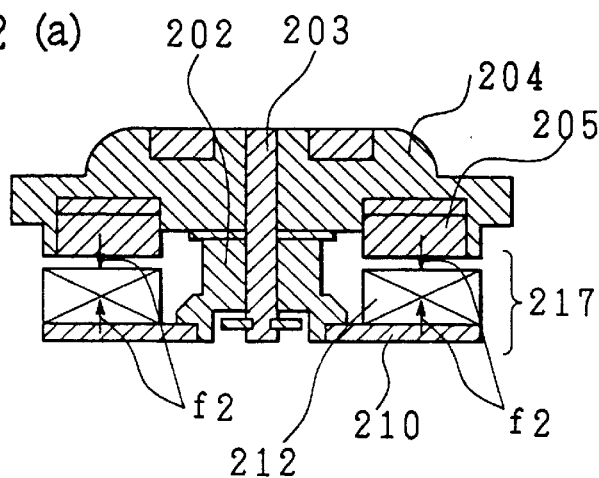
FIG. 22(a) and FIG. 22(b) are cross sectional views respectively showing an arrangement of a main component of a comparative example of an optical disk device in accordance with Seventh Embodiment of the present invention.
Figure 22:
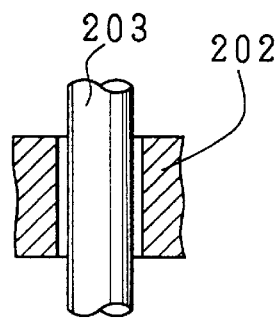

FIG. 22(*a*) and FIG. 22(*b*) are schematic diagrams showing an arrangement wherein the second motor unit 217 is not provided with the cut-out portion. The turn table 204 is integrally provided with the rotation shaft 203, and the rotation shaft 203 is inserted in the bearing unit 202. In order to ensure a smooth rotation of the rotation shaft 203 in the bearing unit 202, the diameter of the rotation shaft 203 and the inner diameter of the bearing unit 202 are set such that a small clearance is provided. As shown in FIG. 22(*b*), while the turn table is rotating, the rotation shaft 3 rotates freely in the bearing unit 202.

The coil support 210 on which the stator coil 212 is provided is made of a magnetic material, and serves also as a back yoke. The rotor magnet 205 and the coil support 210 constitute a single magnetic circuit, and as a result, between the rotor magnet 205 and the coil support 210, a magnetic absorption force f2 (second thrust direction magnetic absorption force) is acting. The magnetic absorption force f2 acts in the thrust direction (rotation shaft direction) of the turn table rotation shaft 203. Here, since the second motor unit 217 is not provided with the cut-out portion, the magnetic absorption force f2 acts substantially uniformly over the entire circumference of the turn table 204.

Figure 23:
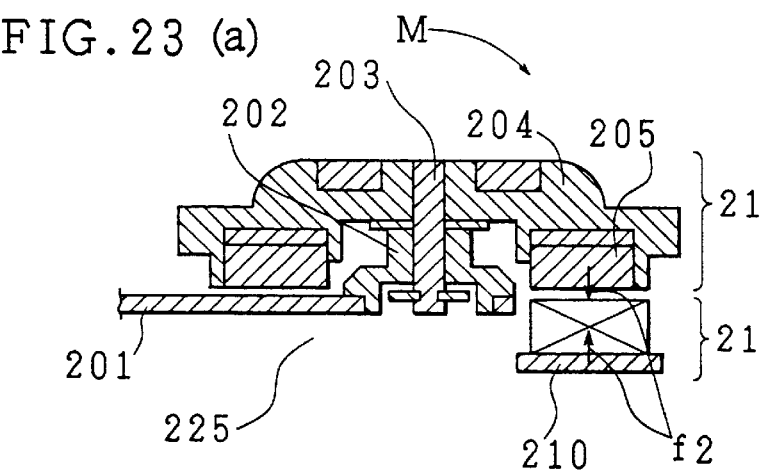
FIG. 23(a) and FIG. 23(b) are cross sectional views respectively showing a main component of a comparative example of the optical disk device.
Figure 23:
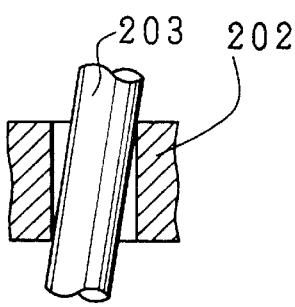

FIG. 23(*a*) and FIG. 23(*b*) are schematic diagrams showing an arrangement wherein the bearing support 201 constituting the first motor unit 216 is made of a non-magnetic material, and the second motor unit 217 is provided with the cut-out portion. Here, the coil support 210 is not provided uniformly around the turn table rotation shaft 203. The second motor unit 217 is provided with the cut-out portion 225 so as to avoid interference of the cut-out portion 225 with the bearing support 201 of the first motor unit 216 when the second motor unit 217 is slid.

Since the bearing support 201 is made of a non-magnetic material, no magnetic absorption force is generated between the bearing support 201 and the rotor magnet 205. In contrast, between (1) the coil support 210 constituting the second motor unit 217 and (2) the rotor magnet 205, the magnetic absorption force f2 (second thrust direction magnetic absorption force) is generated; however, since the coil support 210 has a cut-out portion, the magnetic absorption force does not act uniformly over the entire circumference of the turn table 204. Because the magnetic absorption force acts only on a portion where the coil support 210 is provided, not uniformly around the turn table rotation shaft 203, the magnetic absorption force f2 acts in such a direction that the turn table rotation shaft 203 is inclined with respect to the bearing unit 202.

As a result, a moment M acts on the rotation shaft 203, and as shown in FIG. 23(*b*), the rotation shaft 203 rotates in such a manner that the upper and lower portions of the bearing unit 202 makes a contact with the rotation shaft 203. When the rotation shaft 203 rotates in this manner, the load of rotation is increased. As a result, (1) the chance of damaging the bearing and (2) a rotation driving current are increased, and because the load is concentrated on certain portions of the bearing, the bearing and the rotation shaft are scratched, causing a noise to generate, thereby lowering the operativity of the spindle motor.

Figure 24:
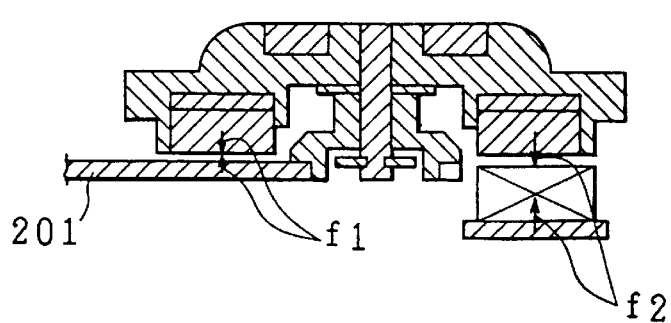
FIG. 24(a) and FIG. 24(b) are cross sectional views respectively showing a main component of a comparative example of the optical disk device.
Figure 24:
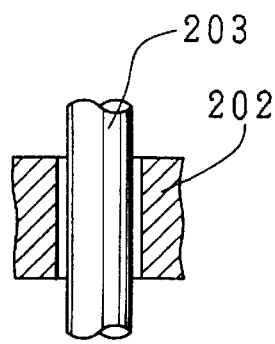

In the present embodiment, the bearing support 201 is made of a magnetic material, and the strength of the magnetic absorption force acting between the bearing support 201 and the rotor magnet 205 is balanced with the strength of the magnetic absorption force acting between the coil support 210 and the rotor magnet 205. When the strength of the magnetic absorption force f1 (first thrust direction magnetic absorption force) acting between the rotor magnet 205 and the bearing support 201 provided above the cut-out portion of the coil support 210 is optimized, the magnetic absorption forces f1 and f2 act substantially uniformly over the entire circumference of the turn table, thus suppressing the moment acting on the turn table rotation shaft 203. As a result, as shown in FIG. 24(*a*) and FIG. 24(*b*), the rotation shaft 203 can be freely rotated in the bearing unit 202, and lowering of operativity of the spindle motor can be prevented.

Eighth Embodiment

The optical disk device of the present embodiment is a modification of the optical disk device of Seventh Embodiment.

Figure 25:
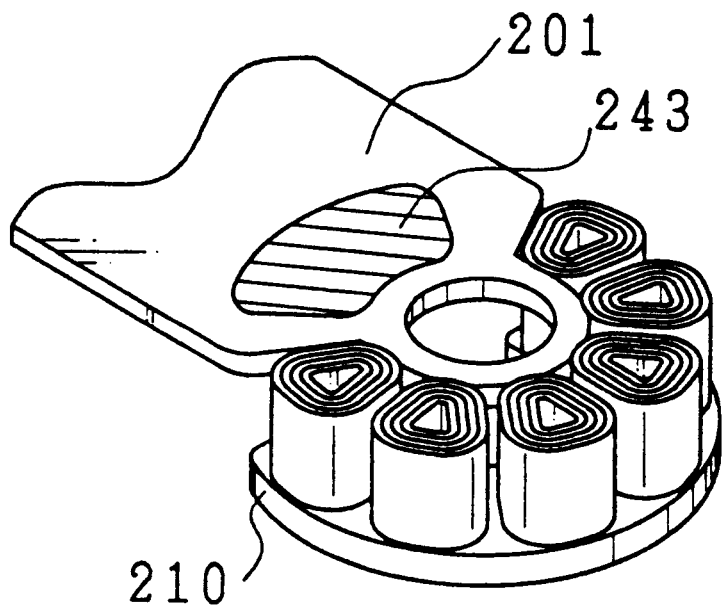
FIG. 25 is a perspective view showing an arrangement of a main component of an optical disk device in accordance with Eighth Embodiment of the present invention.
Figure 26:
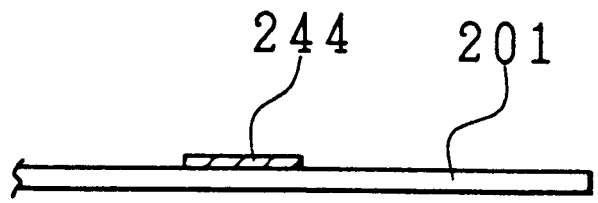
FIG. 26 is a cross sectional view showing another arrangement of a main component of the optical disk device.

FIG. 25 and FIG. 26 are schematic diagrams respectively showing one arrangement of a main component of the optical disk device of the present embodiment. Here, the bearing support 201 is made of a non-magnetic material, and an absorbing member made of a magnetic material is integrally provided with the bearing support 201. Because the bearing support 201 is made of a non-magnetic material, no magnetic absorption force is generated between the bearing support 201 and the rotor magnet 205.

In the arrangement of FIG. 25, an absorbing member made of a magnetic material is integrally provided with the bearing support 201. For example, an absorbing member 243 made of an iron plate is integrally provided, by the insert molding means, etc., with the bearing support 201 made of a resin material which is non-magnetic. The shape (size, thickness, etc.) of the absorbing member 243 is optimized so that (1) the strength of the magnetic absorption force acting between the absorbing member 243 and the rotor magnet and (2) the strength of the magnetic absorption force acting between the coil support 210 (second motor unit) and the rotor magnet are balanced, and the moment acting on the turn table rotation shaft is suppressed.

In the arrangement of FIG. 26, an absorbing member 244 made of a magnetic material is attached on the bearing support 201 made of a non-magnetic material.

The manner in which the absorbing member is integrally provided with the bearing support 201 is not limited to the specified one, so that other methods may be adopted, such as molding of the absorbing member with the bearing support 201.

Ninth Embodiment

The optical disk device of the present embodiment, as in Seventh and Eighth Embodiment, aims to prevent unbalanced moment from generating on the rotation shaft of the turn table.

Figure 27:
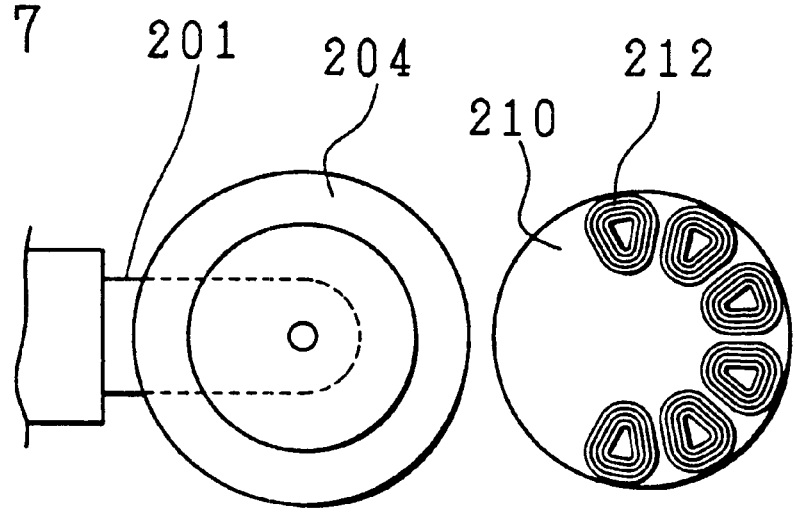
FIG. 27 is a plan view showing an arrangement, before loading a cartridge, of a main component of an optical disk device in accordance with Ninth Embodiment of the present invention.
Figure 28:
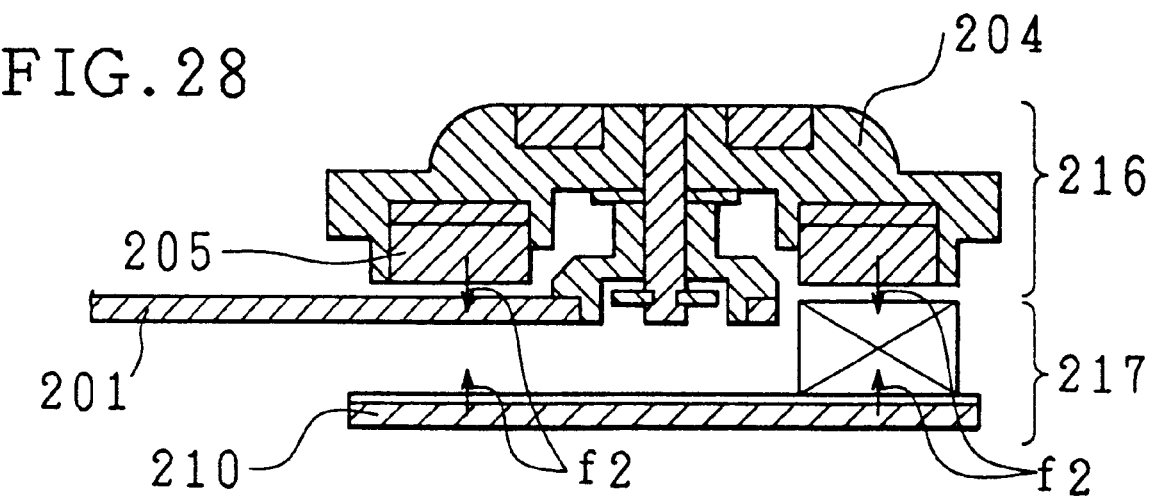
FIG. 28 is a cross sectional view showing an arrangement, after loading a cartridge, of a main component of the optical disk device.

FIG. 27 is a drawing showing an arrangement of the optical disk device of the present embodiment. FIG. 27 is a plan view before loading the cartridge, and FIG. 28 is a cross sectional view after loading the cartridge.

The stator coil 212 constituting the second motor unit 217 is fan-shaped so as to provide a cut-out portion, and the coil support 210 for fixing the stator coil 212 is provided in the substantially same form as the rotor magnet with respect to the entire surface facing the rotor magnet. The operation of the first motor unit and the second motor unit when loading the cartridge is the same as the one described in Third Embodiment.

In the present embodiment, since the bearing support 201 is made of a non-magnetic material, no magnetic absorption force acts between the bearing support 201 and the rotor magnet 205. On the other hand, because the coil support 210 is made of a magnetic material, and has substantially the same shape as that of the rotor magnet 205, the magnetic absorption force f2 uniformly acts on the rotor magnet 205 and the coil support 210 with respect to the entire circumference of the turn table. As a result, it is possible to suppress unbalanced moment from generating with respect to the turn table rotation shaft 203, thus realizing a spindle motor with superior operativity.

Note that, although the coil support 210 has substantially the same shape as that of the rotor magnet, provided that the coil support is provided with respect to the entire facing surface of the rotor magnet, the shape thereof is not limited to the specified one.

Tenth Embodiment

The following will explain Tenth embodiment of the present invention referring to FIG. 29(a) through FIG. 36.

The optical disk device in accordance with the present embodiment is a magneto-optical disk device provided with magnetic field applying means (described later) for applying a magnetic field onto a disk when recording and erasing information.

Figures 29A, 29B, 29C:
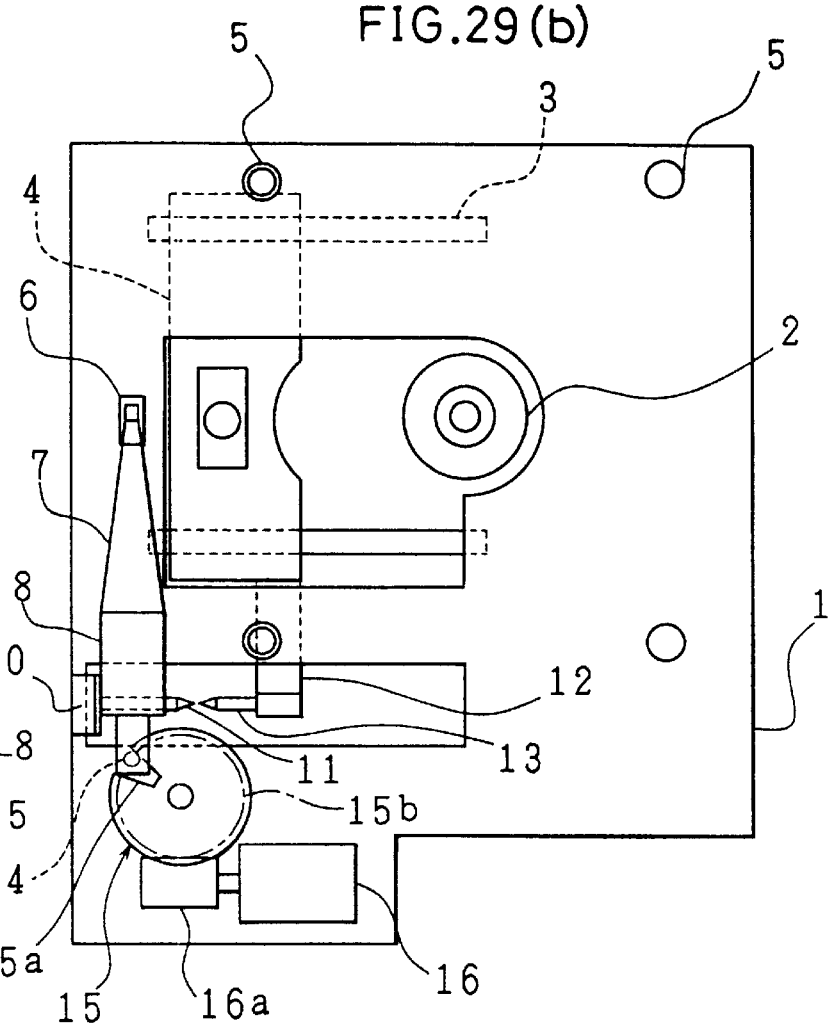
FIG. 29(a) through FIG. 29(c) are drawings showing a main component of one arrangement of an optical disk device in accordance with Tenth Embodiment of the present invention.

FIG. 29(a) through FIG. 29(c) show one arrangement of a main component of the optical disk device of the present embodiment. A main chassis 1 is provided with (1) a spindle motor 2 for rotatably driving a disk (recording medium), (2) a light pickup 4 via a guiding member 3, and (3) a cartridge position determining pins 5.

Also, on positions adjacent to the spindle motor 2, there are provided (i) a magnetic head section 6 composed of a resin slider member having a core section with coils and (ii) a suspension member 7 supporting the magnetic head section 6. The magnetic head section 6 and the suspension member 7 constitute the magnetic field applying means.

The suspension member 7 is fixed to a second supporting arm 8. The second supporting arm 8 is provided with two guiding openings 9. On the main chassis 1, a guiding pin supporting plate 10 is fixed. The guiding pin supporting plate 10 is provided with two second magnetic head guiding pins 11, and the guiding openings 9 are interlocked with the second magnetic head guiding pins 11, thus allowing the second supporting arm 8 to be moved along the second magnetic head guiding pins 11.

The light pickup 4 is integrally provided with a first supporting arm 12 extending therefrom, and two first magnetic head guiding pins 13 are fixed to the first supporting arm 12. The first magnetic head guiding pins 13 and the second magnetic head guiding pins 11 have the same diameter, and are coaxial to each other.

A driving pin 14 is fixed to the second supporting arm 8. On the main chassis 1, a driving gear 15 is fixed so as to be free to rotate, and a cut-out portion 15a to be interlocked with the driving pin 14 is provided on a portion of the driving gear 15. Also, on the main chassis 1, a driving motor 16 is fixed, and a rotating section of the driving motor 16 is provided with a worm gear 16a. On the periphery of the driving gear 15, a wheel gear 15b to be interlocked with the worm gear 16a is provided. The driving motor 16, the driving gear 15, and the driving pin 14 constitute switching means.

The magnetic field applying means are linked to a magnetic field applying means lifting mechanism (not shown) for carrying out a lifting operation of the magnetic head section 6 (magnetic field generating section and a slider member of the magnetic field applying means facing the disk). In the lifting operation, the magnetic head section 6 is moved so as to be (1) in contact with or in a vicinity of a disk surface or (2) moved away from the disk surface.

Figure 35:
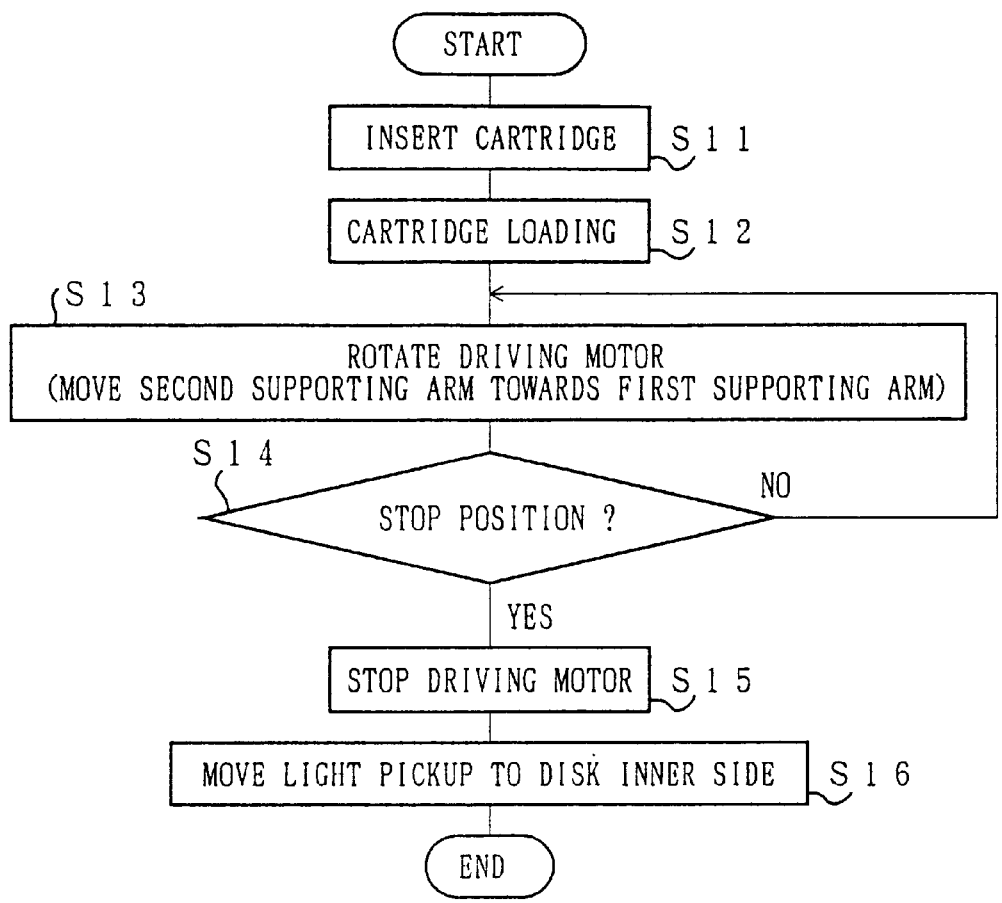
FIG. 35 is a flowchart showing a cartridge loading operation.
Figure 36:
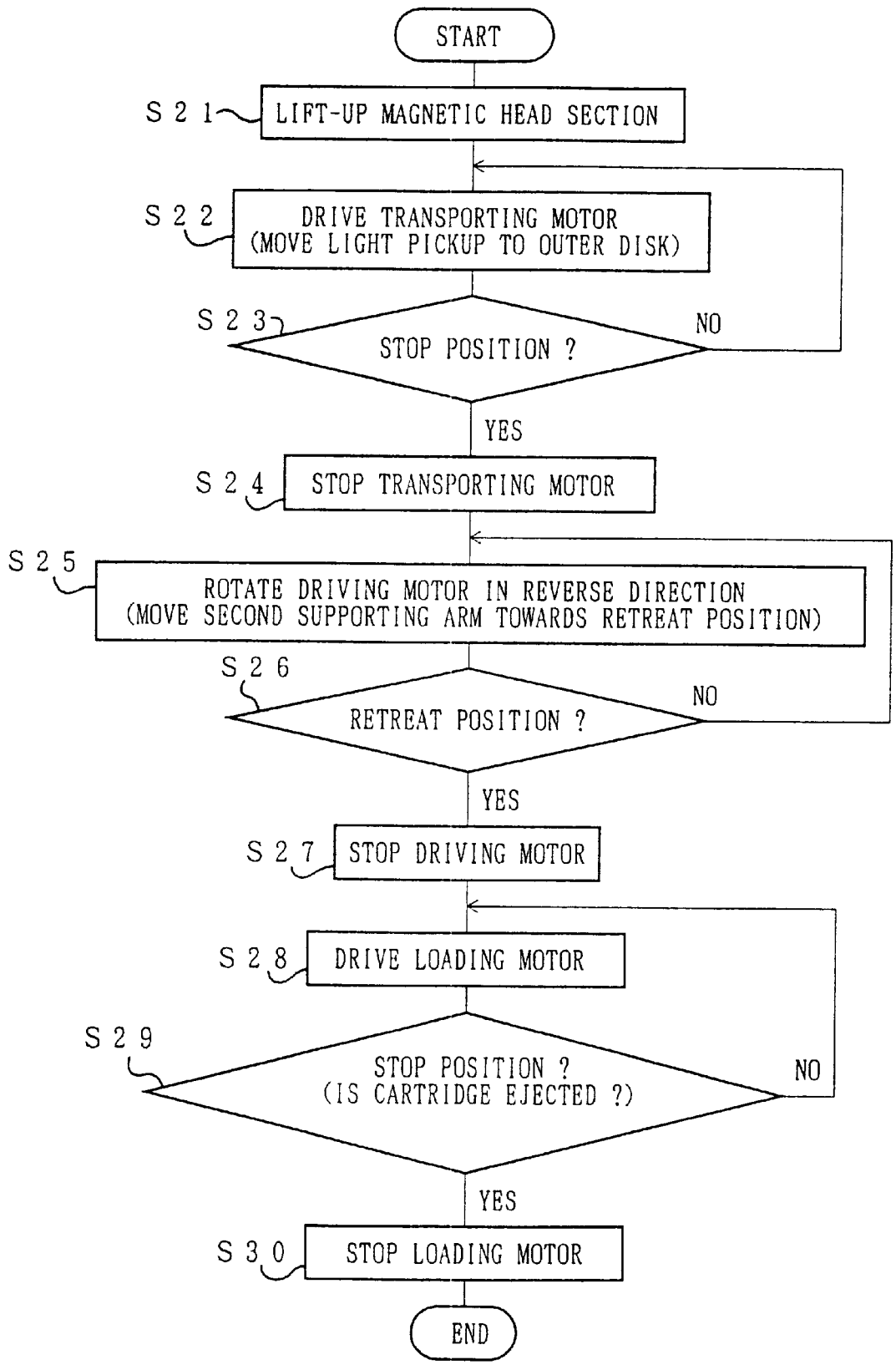
FIG. 36 is a flowchart showing a cartridge unloading operation.

The following will describe, referring to the flowchart of FIG. 35, the operation of the described members when a cartridge encasing a disk is inserted into the optical disk device.

FIG. 30(a) through FIG. 30(c) show an arrangement before a cartridge 17 encasing a disk 18 is inserted into the optical disk. The second supporting arm 8 fixed to the magnetic head section 6 is positioned on the second magnetic head guiding pins 11. The second supporting arm 8 is positioned at a retreat position outside a cartridge insertion position so that the cartridge 17 does not come into contact with the magnetic head section 6 when the cartridge 17 is inserted into the optical disk device. Here, the position of the light pickup 4 is controlled by a light pickup transporting mechanism (not shown) so that the light pickup 4 is above an outermost side of the disk for recording and reproducing information of the disk outermost portion. When the light pickup 4 is in this position, (1) the first magnetic head guiding pins 13 integrally provided with the light pickup 4 and (2) the second magnetic head guiding pins 11 integrally fixed to the main chassis 1 become coaxial to each other with their end portions in vicinities of each other.

The cartridge 17 is inserted in S11. Here, the magnetic head section 6 is in the retreat position, and the light pickup 4 is positioned on the outer side of the disk. FIG. 31(a) through FIG. 31(d) show a loading operation in which the cartridge 17 is inserted into the optical disk device. The cartridge 17 encased in a cartridge holder (not shown) is moved laterally by a loading mechanism (not shown) in a direction parallel to the disk surface towards the inside of the optical disk device (downward direction in FIG. 31(a) through FIG. 31(c)).

In the case where the thickness of the optical disk device is to be made thinner, because the upper surface of the cartridge 17 is substantially on the same level as the upper surface of the optical disk device, it is impossible to position the magnetic head section 6 above the cartridge 17. Here, the light pickup 4 is moved to a position above the outermost side of the disk 18, and the second supporting arm 8 fixed to the magnetic head section 6 is, as shown in FIG. 31(a) through FIG. 31(c), moved to a position outside the moving region of the cartridge 17 (retreat position), thereby preventing the cartridge 17 from contacting the magnetic head 6 in the cartridge loading operation.

In the retreat position, the position of the magnetic head 6 is maintained by a magnetic head lifting mechanism such that the upper surface of the magnetic head section 6 is substantially on the same level as the upper surface of the optical disk device, thereby preventing the thickness of the optical disk device from being increased by the projection of the magnetic head section 6.

The loading operation is carried out in S12. In the loading operation, after transporting the chucking target section of the disk 18 to a position above the chucking section of the spindle motor 2, the cartridge 17 is down-lifted in such a direction that the cartridge 17 is in a vicinity of the spindle motor 2. On the main chassis 1 provided with the spindle motor 2 and the light pickup 4, as described above, the cartridge position determining pins 5 are attached so as to position the cartridge 17 in a predetermined position. The disk 18 is provided with a center hub 19 which is made of a magnetic material. In a vicinity of the chucking section of the spindle motor 2, a disk chucking magnet 20 is fixed, and by the magnetic absorption force of the disk chucking magnet 20, the disk 18 is held on the chucking surface of the spindle motor 2.

In accordance with the down-lifting operation of the cartridge 17 towards the spindle motor 2, a space Q is created above the cartridge 17 which has been moved downward, between (1) the height ($h_1$ in FIG. 31($a$)) of the upper surface of the cartridge 17 during the lateral movement and (2) the height ($h_2$ in FIG. 31($a$)) of the upper surface of the cartridge 17 after moving downward.

In S13, the driving motor 16 is rotated, and the second supporting arm 8 is moved in a direction towards the first supporting arm 12. Namely, when a current is sent to the driving motor 16, the worm gear 16$a$ provided on the rotation section of the driving motor 16 starts rotating; consequently, the driving gear 15 having the wheel gear 15$b$ interlocked with the worm gear 16$a$ is rotated in the direction of the arrow A in FIG. 31($c$). In response to this, the driving pin 14 interlocked with the cut-out portion 15$a$ of the driving gear 15 is moved in accordance with the rotation of the driving gear 15. As a result of the movement of the driving pin 14, the second supporting arm 8 is moved in a direction from the retreat position to the light pickup 4 side along the second magnetic head guiding pins 11. Here, the lower surface of the magnetic head section 6 is set to a position so as to avoid contacting the upper surface of the cartridge 17 after moving downward. Thus, the suspension member 7 and the magnetic head section 6, fixed to the second supporting arm 8, are allowed to move into the space Q created after down-lifting of the cartridge 17. As described, since the first magnetic guiding pins 13 and the second magnetic guiding pins 11 are coaxial to each other with their end portions in vicinities of each other, the second supporting arm 8 is moved from a position on the second magnetic guiding pins 11 to a position on the first magnetic head guiding pins 13.

When the second supporting arm 8 comes to a stop position where the magnetic head section 16 and the light pickup 4 are linked to each other (S14), the driving motor 16 is stopped (S16). FIG. 32($a$) and FIG. 32($b$) show an arrangement wherein the magnetic head section 6 is linked to the light pickup 4. The second supporting arm 8, having moved to a position on the first magnetic head guiding pins 13, is integrally linked to the first supporting arm 12. Because the moving direction of the second supporting arm 8 is always regulated by the first magnetic head guiding pins 13, the positional relationship between the second supporting arm 8 and the first supporting arm 12 when the linkage is made is always maintained constant, thereby allowing accurate positioning of a light spot on the supplementary magnetic field applied region.

FIG. 33($a$) and FIG. 33($b$) show one arrangement of a linking mechanism for integrally linking the first supporting arm 12 and the second supporting arm 8 in the described manner. A linking pin 21 having a cut-out portion 21$a$ is fixed to a tip portion of the second supporting arm 8. On the first supporting arm 12, a linkage opening 12$a$ receiving the linking pin 21 is provided, and in the linkage opening 12$a$, a fixed spring end portion 22 fixed to the first supporting arm 12 is provided. When the second supporting arm 8 is moved on the first magnetic guiding pins 13 and comes to a position contacting the first supporting arm 12, the cut-out portion 21$a$ of the linking pin 21 and the fixed spring end portion 22 are interlocked. In this manner, the first supporting arm 12 and the second supporting arm 8 are integrally linked to each other.

Figure 34A:
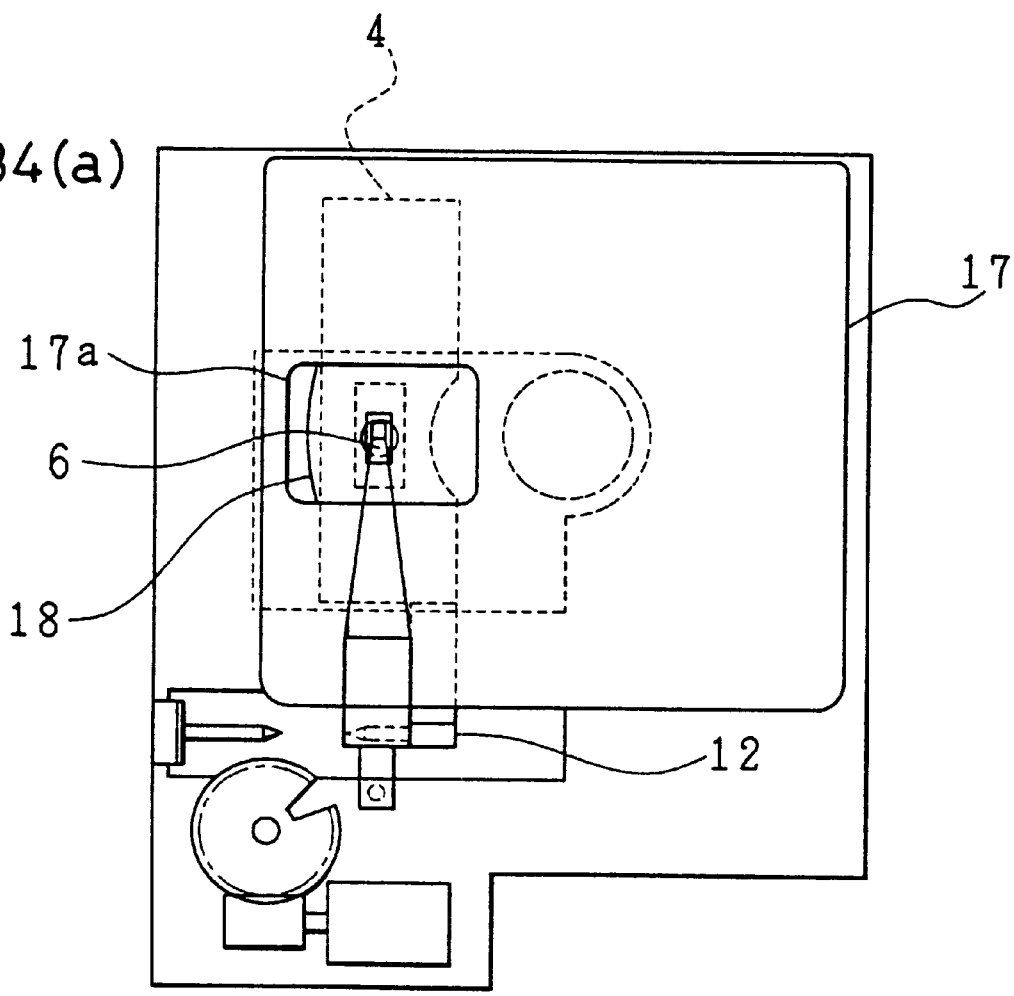
FIG. 34(a) and FIG. 34(b) are drawings showing an arrangement wherein the magnetic head section and the light pickup of the optical disk device are integrally subjected under control.
Figure 34B:
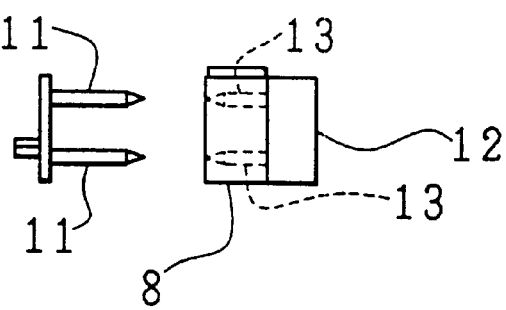

Then, the light pickup 4 is moved to a disk inner side (S16). FIG. 34($a$) and FIG. 34($b$) show an arrangement wherein the magnetic head section 6 and the light pickup 4 are integrally subjected to a tracking control. The light pickup 4 integrally fixed to the magnetic head section 6, in order to start recording and reproducing of information, is moved to the inner side of the disk by a pickup transporting mechanism (not shown).

On the upper surface of the cartridge 17 encasing the recordable disk 18, a magnetic head insertion window 17$a$ is provided. The magnetic head section 6 integrally linked to the light pickup 4 is placed above the magnetic head insertion window 17$a$ so as to be in a vicinity of the disk surface or made contact with the disk surface by the magnetic head lifting mechanism (not shown).

As described, since the magnetic head section 6 and the light pickup 4 are integrally linked to each other, even when the light pickup 4 under tracking control is moved between the inner side and the outer side of the disk, the positional relationship between the supplementary magnetic filed applied region and the light spot is not changed. Therefore, a positional control for maintaining a positional relationship, required in an arrangement wherein the magnetic head section 6 and the light pickup are provided as separate units, is not required.

The unloading operation for taking out the cartridge outside of the optical disk device is carried out by reversing the described loading operation. The following describes the unloading operation referring to the flowchart of FIG. 36. The magnetic head section 6 is lifted upward by the magnetic head section lifting mechanism (not shown) to such a position that the lower surface thereof does not contact the upper surface of the cartridge 17 (S21). On the other hand, the light pickup 4 is moved to a position above the outermost side of the disk by the pickup transportation mechanism (S22 to S24). Thereafter, the driving motor 16 is rotated in the reverse direction (S25), and the second supporting arm 8 linked to the first supporting arm 12 is moved, via the driving gear 15, from a position on the first magnetic head guiding pins 13 to a position on the second magnetic head position guiding pins 11 so as to hold the magnetic head section 6 on a predetermined retreat position in the side of the second magnetic head guiding pins 11 (S26 to S27). Then, the loading motor is driven (S28), and the cartridge 17 is lifted upward, moved laterally, and ejected out of the optical disk device (S29), and the loading motor is stopped (S30), thus finishing the unloading operation.

Eleventh Embodiment

Figure 37A:
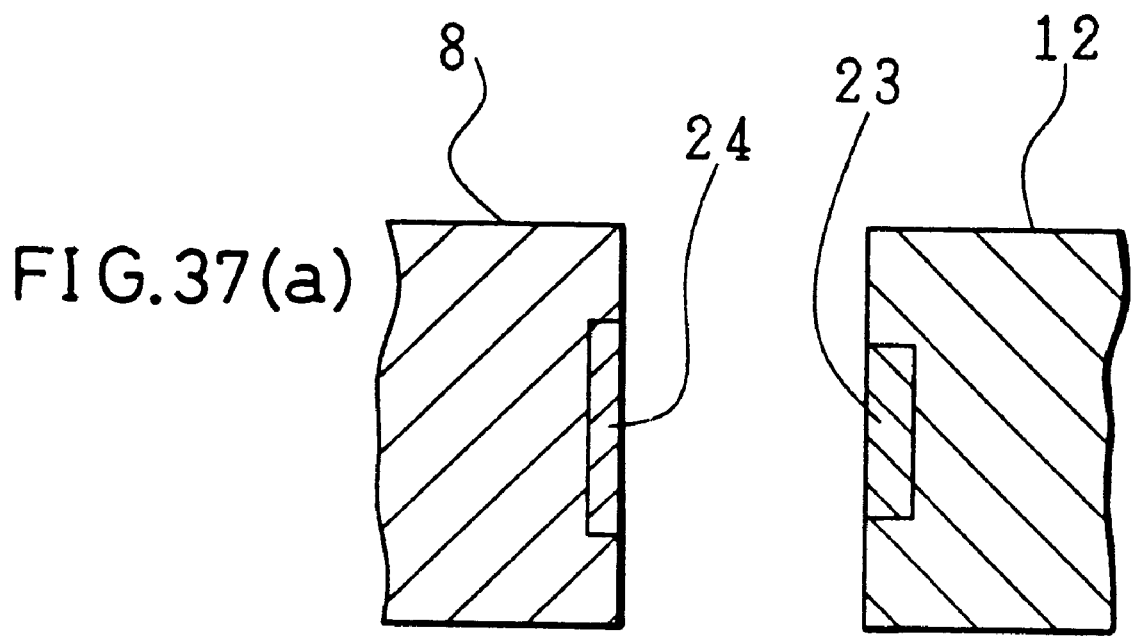
FIG. 37(a) and FIG. 37(b) are drawings showing how the magnetic head section and the light pickup of an optical disk device of Eleventh Embodiment are linked to each other.
Figure 37B:
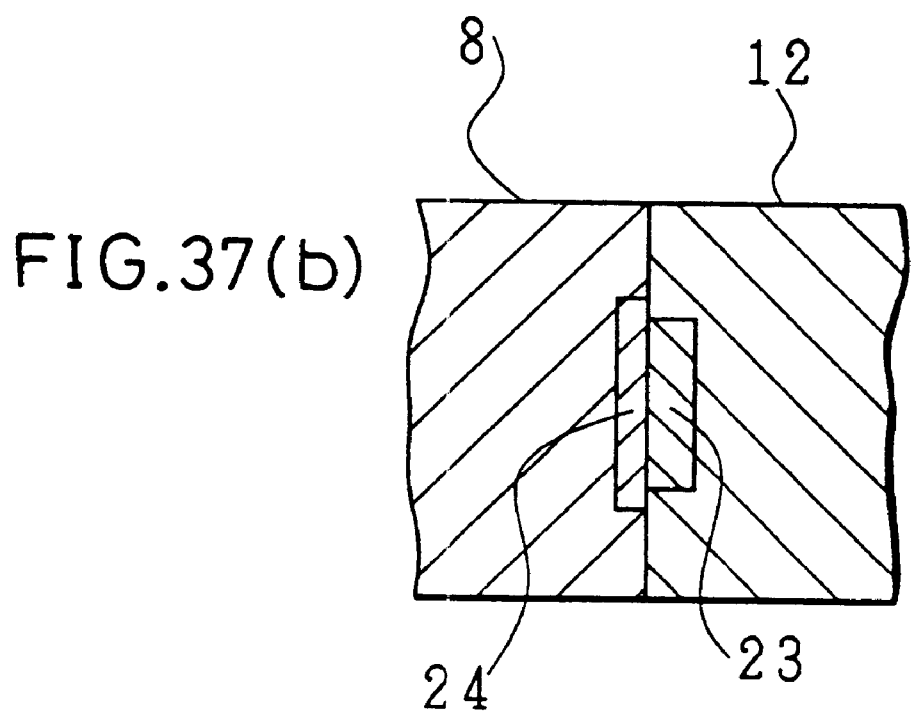

The following will describe Eleventh Embodiment of the present invention referring to FIG. 37($a$) and FIG. 37($b$).

Note that, for convenience, members having the same functions as the members indicated in Figures of the previous embodiment are given the same reference numerals, and the explanations thereof are omitted.

Figure 5:
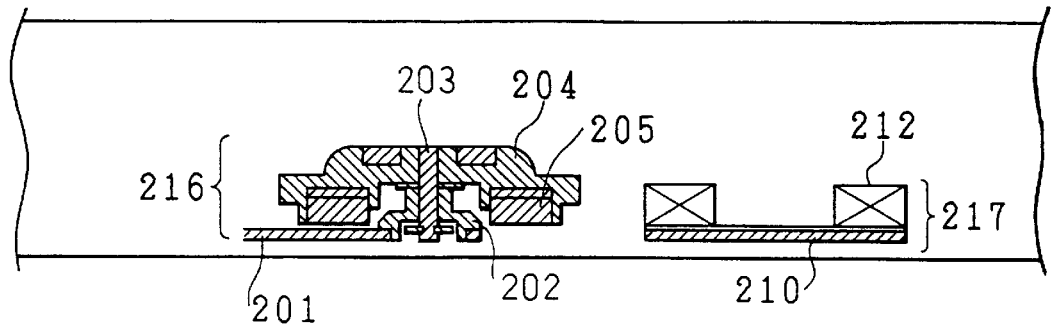
FIG. 5(a) through FIG. 5(d) are cross sectional views showing a cartridge loading operation of First Embodiment.
Figure 5:
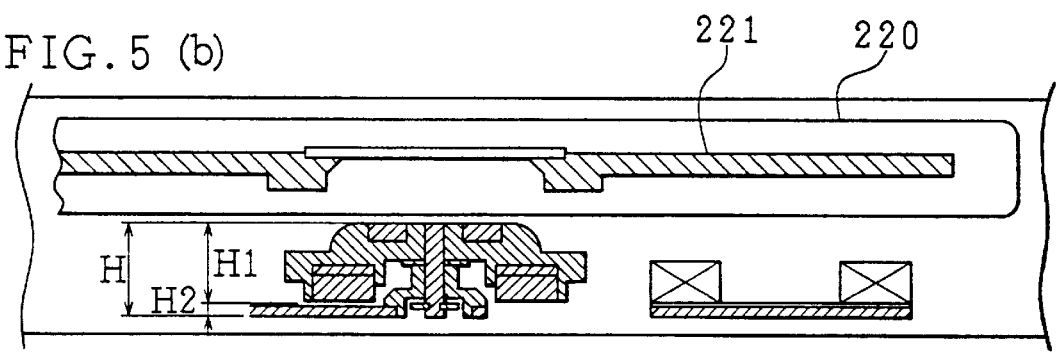
Figure 5:
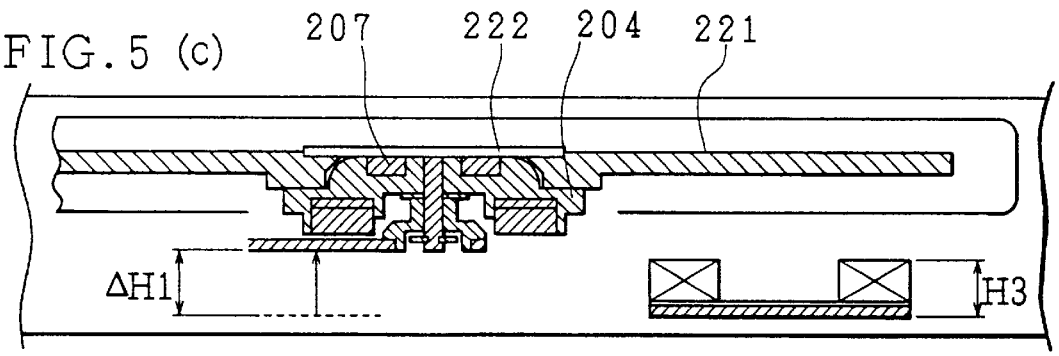
Figure 5:
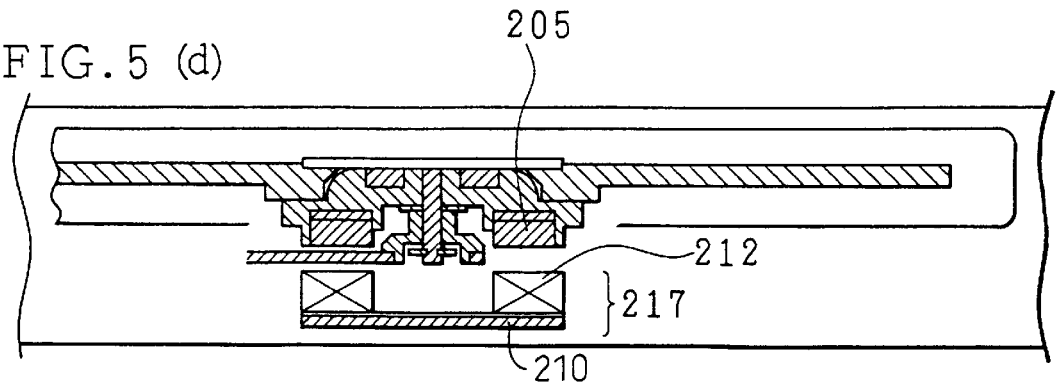

The present embodiment has substantially the same arrangement as that of Tenth Embodiment, and therefore the following explanations will be given based on differing parts. As described, even though the second supporting arm 8 can have a separatable and linkable arrangement with respect to the first supporting arm 12, when the second supporting arm 8 and the first supporting arm 12 are in a linked arrangement, it is required to maintain the linkage. For this reason, as shown in FIG. 5, Tenth Embodiment adopts an arrangement wherein the linking pin 21 having the cut-out portion 21a is fixed to the tip portion of the second supporting arm 8. In contrast, in the present embodiment, as shown in FIG. 37(*a*) and FIG. 37(*b*), as a holding mechanism of the linkage, the first supporting arm 12 and the second supporting arm 8 are provided with a magnet 23 and an absorbing magnetic substance 24, respectively. Namely, the magnet 23 is fixed to a portion of the first supporting arm 12 where linkage to the second supporting arm 8 is made, and, and on a portion of the second supporting arm 8 made of a non-magnetic material, facing the magnet 23, an absorbing member 24 made of a magnetic material such as an iron chip is provided. When the second supporting arm 8 is moved by a supporting arm moving mechanism to a position where the first supporting arm 12 is provided, by the magnetic absorption force between the magnet 23 and the absorbing member 24, the first supporting arm 12 and the second supporting arm 8 are held onto each other. In this manner, by using the magnetic absorption force of the magnet 23, it is possible with a simple arrangement to ensure that the positional relationship between the first supporting arm 12 and the second supporting arm 8 are maintained.

Note that, in the described arrangement, the first supporting arm 12 and the second supporting arm 8 are respectively provided with the magnet and the magnetic material; however, it is possible to have an arrangement wherein the first supporting arm 12 and the second supporting arm 8 are respectively provided with the magnetic material and the magnet. Further, it is also possible that the supporting arm is made of a magnetic material, rather than providing the supporting arm with the magnetic material.

Twelfth Embodiment

The following will describe Twelfth Embodiment of the present invention referring to FIG. 38 through FIG. 41. Note that, for convenience, members having the same functions as the members indicated in Figures of the previous embodiment are given the same reference numerals, and the explanations thereof are omitted.

Generally, there are two types of optical disks available: a read-only disk and a recordable disk. Also, an MD device comes in a reproducing-only device and a recording/reproducing device. A cartridge is provided with recognizing means for recognizing whether a disk encased in the cartridge is a read-only disk or a recordable disk. The recognizing means is presence or absence of a cut-out portion, or depth of the cut-out portion. A type of the disk is recognized by a recognizing sensor provided with the device.

Incidentally, the magnetic field applying means (supplementary magnetic field applying device) are for applying a magnetic field to a light spot of the laser beam when recording and erasing information, and are not required for reproducing of information. In response to a development of smaller and lighter optical disk device, it has been strongly demanded to reduce the power consumption of the device. In order to carry out a tracking control of the light pickup, it is required to move the light pickup from the inner side to the outer side of the disk by the driving force of the light pickup transporting motor. In order to reduce the power consumption of the light transporting motor, a lighter light pickup has been demanded.

In the optical disk device of the present embodiment, as shown in FIG. 38, a recognizing sensor (detecting means) 25 for recognizing a type of the disk is provided on the main chassis 1. The following describes the operation of the recognizing sensor 25 referring to the flowchart of FIG. 41.

First, when the cartridge 17 (not shown) is transported to a predetermined position in the optical disk device by the loading operation (S31 to S32), and when the position of the cartridge 17 is determined by the cartridge position determining pins 5, the recognizing sensor 25 in the optical disk device recognizes whether a disk in the cartridge 17 is a read-only disk or a recordable disk in the following manner (S33).

FIG. 39(*a*) and FIG. 39(*b*) illustrate the operation of the recognizing sensor 25. For example, in an MD cartridge, a recognition cut-out portion is provided. A cartridge encasing a read-only disk is provided with a deep cut-out portion 17b. A cartridge encasing a recordable disk is provided with a shallow cut-out portion 17c. A type of the disk is recognized based on whether the recognizing sensor 25 is turned on or turned off in accordance with the movement of a sensor pin 25a of the recognizing sensor 25 provided on a position corresponding to the cut-out portion, wherein the recognizing sensor 25 is turned on when the sensor pin 25a is pushed in by the cut-out portion, and the recognizing sensor 25 is turned off when the sensor pin 25a is not pushed in by the cut-out portion.

When it is recognized that the disk is a recordable disk, the magnetic head section 6 in the retreat position is integrally linked to the light pickup 4 by the supporting arm moving mechanism in accordance with the movement of the second supporting arm (S35 to S37), and as shown in FIG. 33(*a*) and FIG. 33(*b*), the magnetic head section 6 and the light pickup 4 are integrally subjected to the tracking control (S38). Note that, since the details are the same as that of Tenth Embodiment, explanations thereof are omitted here.

Figure 40:
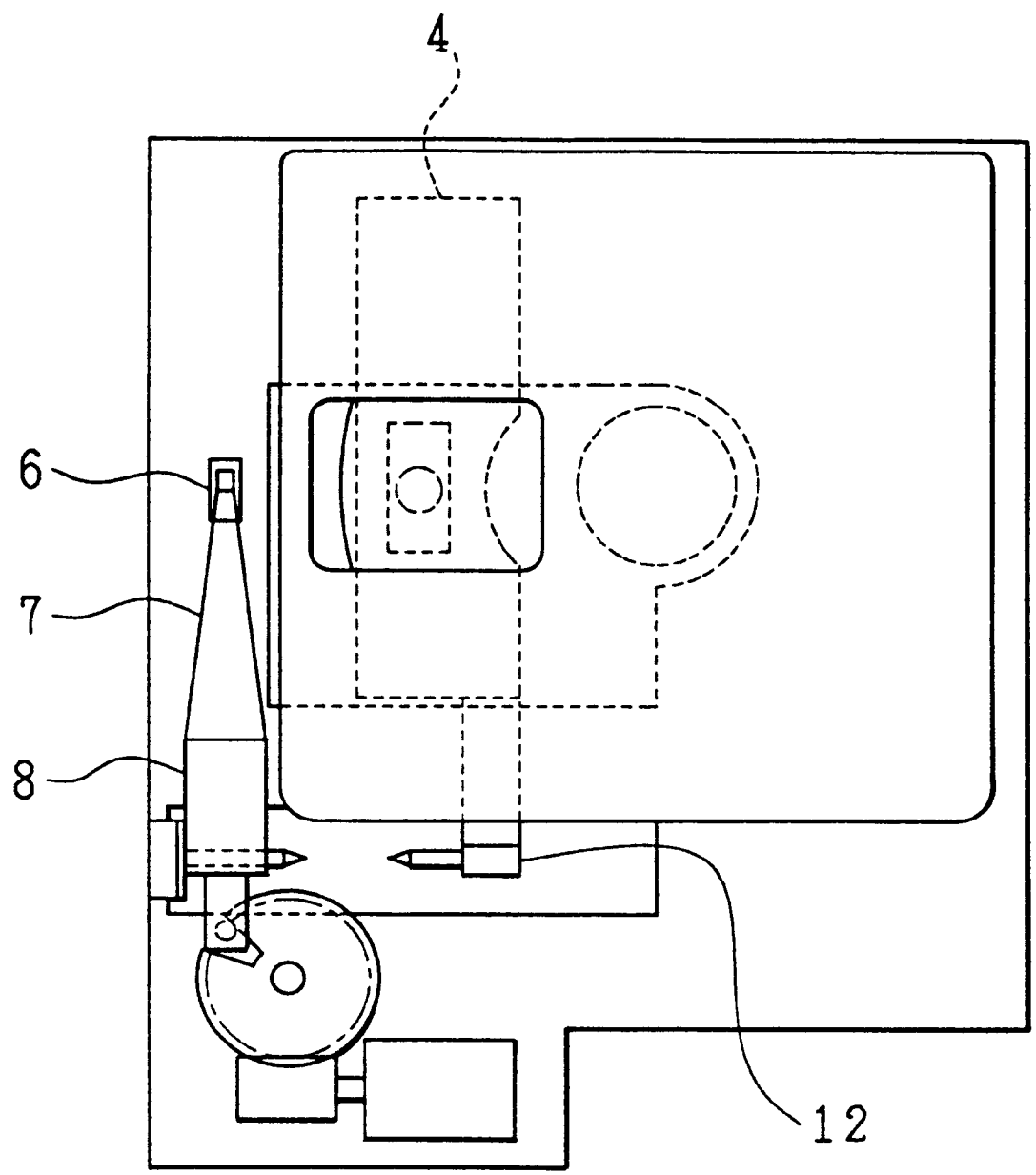
FIG. 40 is a plan view showing an arrangement wherein the light pickup of the optical disk device is singly subjected under control.
Figure 41:
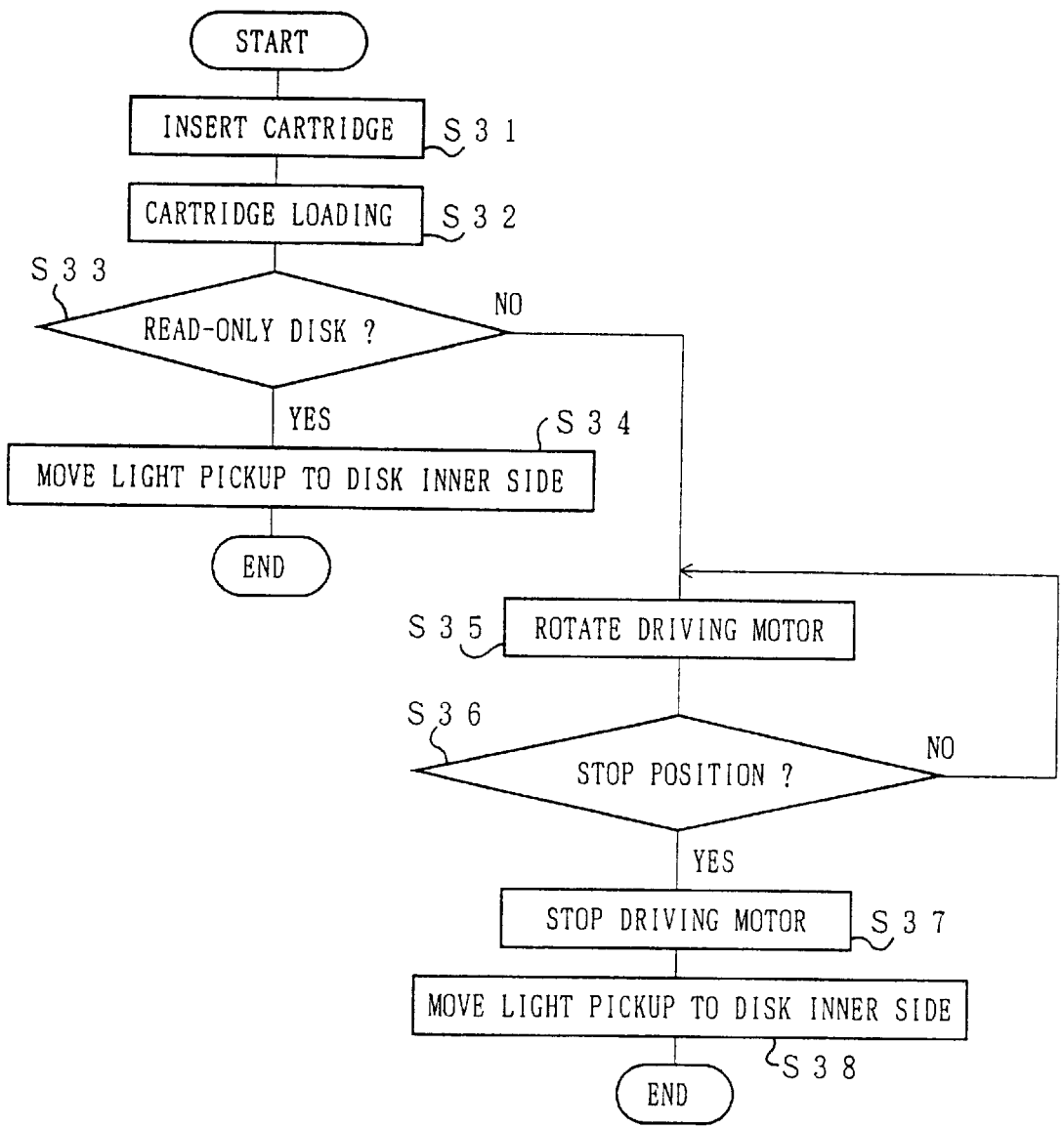
FIG. 41 is a flowchart showing a moving operation of the magnetic head section and the light pickup when the recognizing sensor is adopted.

On the other hand, when it is recognized by the recognizing sensor 25 that the disk is a read-only disk (S34), the supporting arm moving mechanism is not driven, and the magnetic head section 6 is held in the retreat position. Thus, the light pickup 4 is not linked to the magnetic head section 6, and as shown in FIG. 40, only the light pickup 4 is subjected to the tracking control. Here, since the magnetic head section 6, the suspension member 7, and the second supporting arm 8 are not fixed to the light pickup 4, compared with the case where the linkage to the light pickup 4 is made, the weight of the movable section to be subjected to the tracking control is greatly reduced, thus significantly reducing the power consumption of the light pickup transporting motor carrying out the tracking control.

Thirteenth Embodiment

The following will describe Thirteenth Embodiment of the present invention referring to FIG. 42 through FIG. 48. Note that, for convenience, members having the same functions as the members indicated in Figures of the previous embodiment are given the same reference numerals, and the explanations thereof are omitted.

The loading operation in which the cartridge 17 is laterally transported into the optical disk device and the disk 18 is down-lifted so as to be chucked with the spindle motor 2, and the unloading operation in which the cartridge 17 is ejected out of the optical disk device are carried out in the following manner.

FIG. 42 is a drawing showing a mechanism for holding the cartridge 17, viewed from the far side of the cartridge 17 when it is inserted. As shown in FIG. 42, on the both ends (right end and left end) of a plate-shaped cartridge holder 26 for holding the cartridge 17, bending portions 26a are provided, respectively, for holding of the cartridge 17. Each of the bending portions 26a is fixed to a holder pin 27, and the cartridge holder 26 and holder pins 27 form an integral unit.

On the periphery of the cartridge holder 26, a base plate 28 fixed in a U-shape is provided, and on the both ends of the base plate 28, bending portions 28a are provided. On each of the bending portions 28a, as shown in FIG. 43(a) and FIG. 43(b), a lift guiding slit 28b interlocked with the holder pin 27 in the vertical direction is provided. Also, between the bending portions 28a of the base plate 28 and the bending portions 26a of the cartridge holder 26, a movable plate 29 is provided so as to be interlocked with the holder pins 27.

The described arrangement generally has an arrangement shown in FIG. 43(a) and FIG. 43(b). FIG. 43(a) and FIG. 43(b) respectively show the mechanism of FIG. 42 as viewed from the right side, and the cartridge 17 is inserted from the right side. On the movable plate 29, a diagonal guiding slits 29a are provided, and each guiding slit 29a is interlocked with the holder pin 27. As shown in FIG. 43(a), when inserting the cartridge 17 (not shown), the holder pin 27 is positioned at the upper portion of the guiding slit 29a. As described, since the cartridge holder 26 is integrally provided with the holder pins 27, the cartridge holder 26 (not shown) is also positioned at the upper portion of the optical disk device. Then, the cartridge 17 is inserted in the lateral direction into the cartridge holder 26 manually. When it is confirmed that the cartridge 17 is inserted to a predetermined position, a loading motor (not shown) is rotated, and the movable plate 29 is moved in the direction of the arrow C in FIG. 43(a) and FIG. 43(b), i.e., in the direction opposite to the loading direction. Since the holder pins 27 are interlocked with the guiding slits 29a and the lift guiding slits 28b, when the movable plate 29 is moved, as shown in FIG. 43(b), the holder pins 27 are down-lifted perpendicularly along the lift guiding slits 28b. Accordingly, the cartridge holder 26 integrally provided with the holder pins 27 as well as the cartridge 17 in the cartridge holder 26 are also down-lifted perpendicularly, thereby finishing the loading operation.

In the arrangement of FIG. 43(a) and FIG. 43(b), the unloading operation for ejecting the cartridge 17 out of the optical disk device is carried out by rotating the loading motor (not shown) in the reverse direction, and the movable plate 29 of FIG. 43(b) is moved in the direction of the arrow D, i.e., in the direction opposite to the unloading direction. In response to this, the holder pins 27 are up-lifted perpendicularly along the lift guiding slits 28b. In order to allow the light pickup 4 to record and reproduce information on the disk 18, the cartridge 17 is provided with a window, and for protection, a shutter is provided, covering the window. By the spring force of the shutter opening-closing mechanism for opening and closing of the shutter, the cartridge 17 in the cartridge holder 26 is ejected out of the optical disk device in the lateral direction. Since the mechanism of this operation is well known, detailed explanations thereof are omitted here.

In the present embodiment, in addition to the described loading and unloading operations, a retreating operation and a retreating releasing operation of the magnetic head section 6 are carried out by using the driving force of the loading motor which carries out the loading operation of the cartridge. The following describes how these operations are carried out. Note that, for simplicity, the cartridge holder 26 and the base plate 28 constituting the loading mechanism will be omitted in the explanations. Rather, explanations will be given in accordance with the operation of the movable plate 29.

Figure 44A:
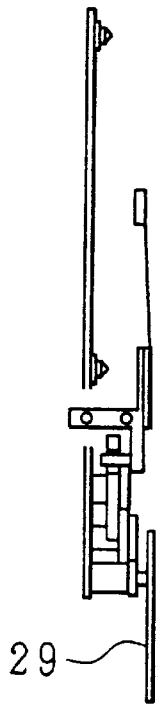
FIG. 44(a) through FIG. 44(c) are drawings showing an arrangement, before inserting a cartridge, of an optical disk device in accordance with Thirteenth Embodiment of the present invention.
Figure 44B:
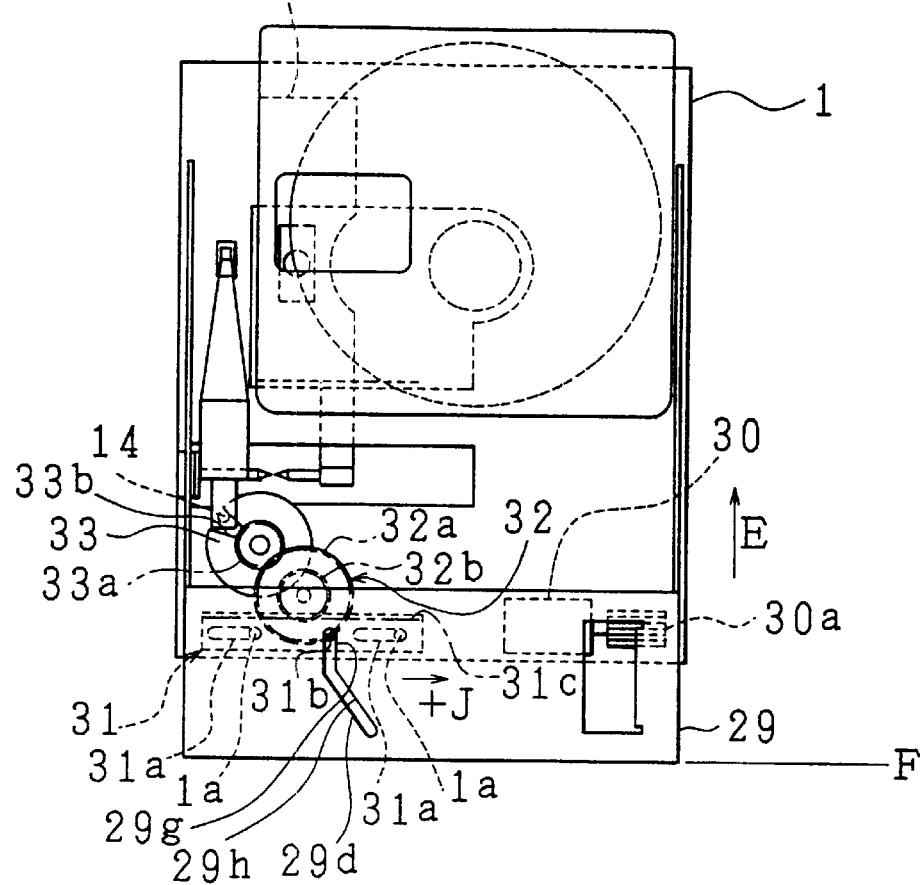
Figure 44C:
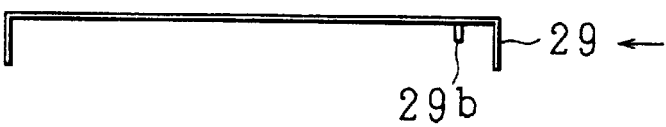
Figure 45:
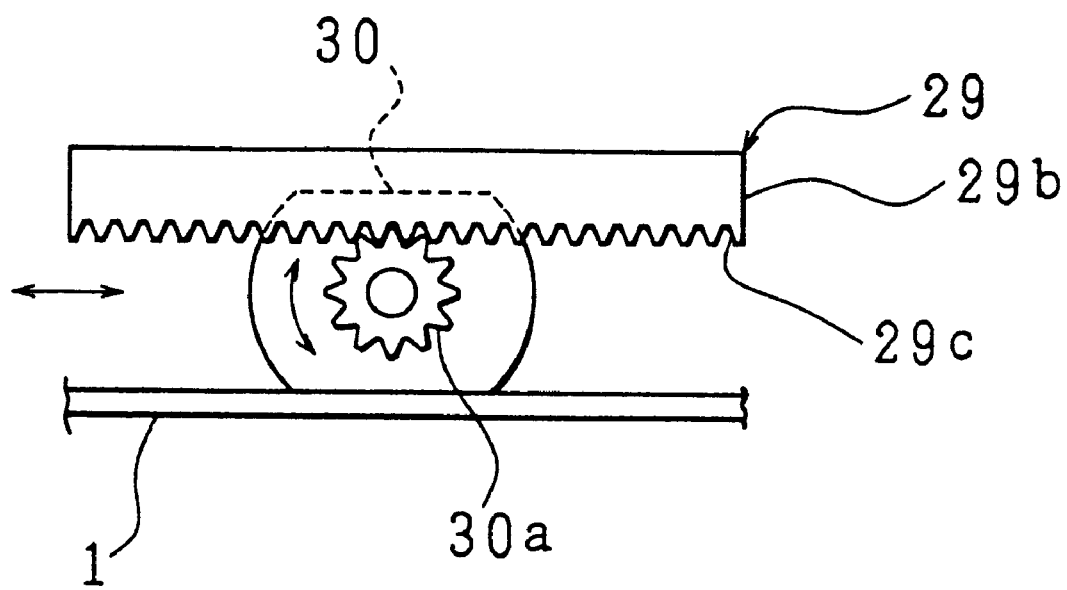
FIG. 45 is a plan view showing how a rack is interlocked with a rotation gear.

FIG. 44(a) through FIG. 44(c) show one arrangement of the optical disk device while the cartridge 17 is being inserted into the optical disk device. FIG. 44(c) is a bottom view of FIG. 44(b), and FIG. 45 is a view from the direction of the arrow in FIG. 44(c).

As shown in FIG. 44(b), a loading motor (loading means) 30 for moving the movable plate 29 is fixed on the main chassis 1, and a rotation section on an end of the loading motor 30 is provided with a rotation gear 30a. Also, as shown in FIG. 44(c), the movable plate 29 having a U-shape is provided with a bending portion 29b which is formed by bending a portion of the upper surface of the movable plate 29 inward (downward direction in FIG. 44(c)) in a U-shape. As shown in FIG. 45, the bending portion 29b is provided with a rack 29c, and the rack 29c and the rotation gear 30a are interlocked. Thus, by rotating the loading motor 30, the movable plate 29 is moved in the direction of the arrow E in FIG. 44(b), i.e., in a direction opposite to the loading direction.

Also, as shown in FIG. 44(b), on the upper surface of the movable plate 29, a guiding slit 29d is provided. The guiding slit 29d is composed of (1) a guiding slit 29g which is an opening parallel to the loading direction on the movable plate 29 on the near side of the cartridge 17, i.e., an opening parallel to a direction in which the movable plate 29 is moved and (2) a guiding slit 29h which is an opening diagonally extending from the guiding slit 29h.

Also, on the lower surface of the movable plate 29 (direction into the plane of the paper in FIG. 44(b)), a sliding plate 31 is provided. The sliding plate 31 is provided with two guiding slits 31a, at the both ends in a direction perpendicular to the moving direction of the movable plate 29, extending in a direction parallel to the direction perpendicular to the moving direction of the movable plate 29. Here, guide pins 1a fixed to the base plate 28 are interlocked with the guiding slits 31a, and the guide pins 1a are positioned in the end portions of the guiding slits 31a, respectively, in a direction of the arrow +J in FIG. 44(b). Thus, the sliding plate 31 is movable only in a direction of the arrow +J from the position shown in FIG. 44(b).

Also, the sliding plate 31 is provided with a slide guiding pin 31b on the central portion. The slide guiding pin 31b is interlocked with the guiding slit 29d of the movable plate 29, and is positioned at the end portion of the guiding slit 29d in a direction of the arrow E in FIG. 44(b), i.e., in the moving direction of the movable plate 29.

In a vicinity of the end portion of the sliding plate 31 in the direction of the arrow E, a rack 31c is provided. Here, a linking gear 32 and a driving gear 33 are fixed on the main chassis 1 so as to be free to rotate. A cut-out portion 33b of the driving gear 33 is interlocked with the driving pin 14 of the second supporting arm 8 fixed to the magnetic head section 6 so as to move the driving pin 14 by rotation. The loading motor 30, the sliding plate 31, the linking gear 32, the driving gear 33, and the driving pin 14 constitute switching means. The linking gear 32 is a two-step gear composed of a larger diameter linking gear 32a and a smaller diameter linking gear 32b, and the driving gear 33 is provided with a smaller diameter driving gear 33a with steps. The larger diameter linking gear 32a of the linking gear 32 and the smaller diameter driving gear 33a of the driving gear 33 are interlocked, and the rack 31c and the smaller diameter linking gear 32b are interlocked.

Figure 46:
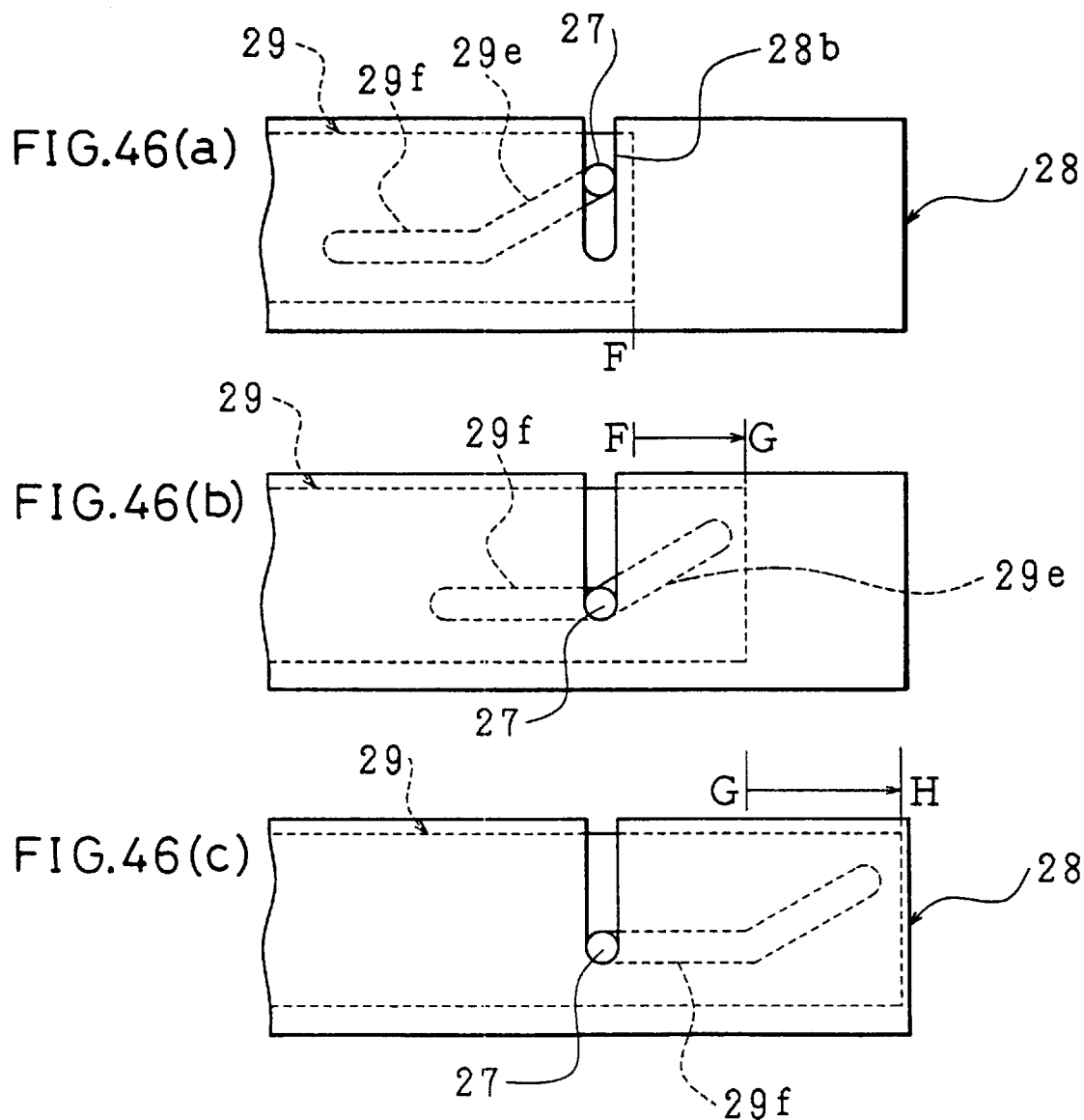
FIG. 46(a) through FIG. 46(c) are plan views showing how the loading and unloading operations are carried out.

FIG. 46(*a*) through FIG. 46(*c*) respectively show a positional relationship of the movable plate 29, the base plate 28, the holder pin 27, and the cartridge 17 of the present embodiment. FIG. 46(*a*) through FIG. 46(*c*) are slightly different from FIG. 43(*a*) through FIG. 43(*c*). On the base plate 28, a lift guiding slit 28b is provided in the vertical direction. On the movable plate 29, there is provided a guiding slit having an inclined portion 29e and a level portion 29f extending from the inclined portion 29e. The holder pin 27 fixed to the cartridge holder 26 (not shown) is interlocked with the lift guiding slit 28b and the guiding slit having the inclined portion 29e and the level portion 29f.

As shown in FIG. 46(*a*), a moment after the insertion of the cartridge 17, the holder pin 27 is positioned at the upper portion of the inclined portion 29e of the guiding slit of the movable plate 29, and accordingly, the cartridge holder 26 is also positioned at the upper portion of the optical disk device. A position, on the side of the guiding slit of the movable plate 29, parallel to the lift guiding slit 28b is denoted as F. Here, as shown in FIG. 44(*a*) through FIG. 44(*c*), the light pickup 4 is positioned on the outermost side of the disk, and the magnetic head section 6 is positioned in the retreat position on the side of the second magnetic head guiding pins 11.

When the cartridge 17 is inserted into the cartridge holder 26, the loading motor 30 shown in FIG. 44(*b*) start being rotated, and the movable plate 29 is moved in the direction of the arrow E in FIG. 44(*b*).

Figure 47:
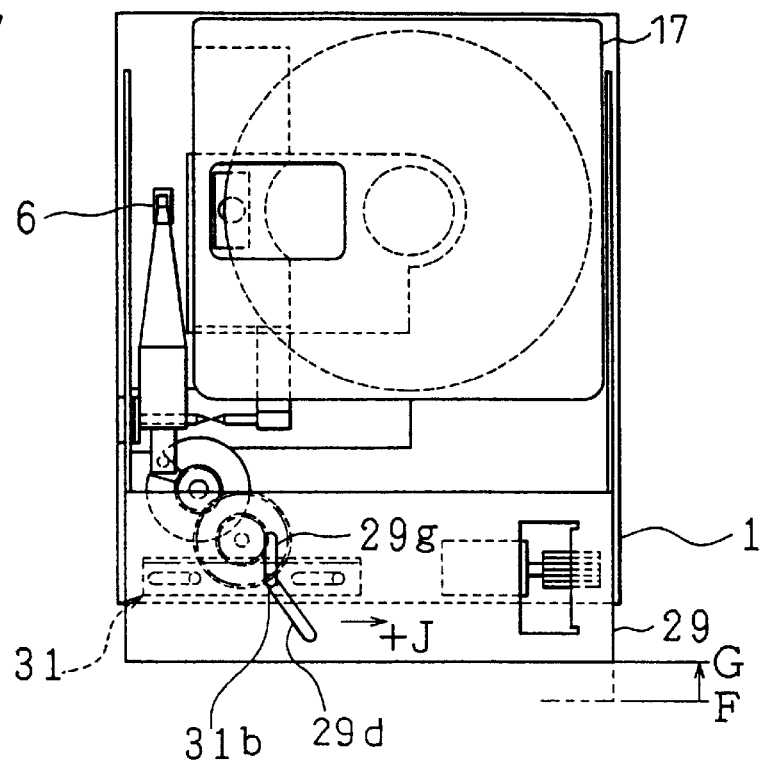
FIG. 47 is a plan view showing an arrangement wherein a cartridge is being inserted into the optical disk device.

As a result, as shown in FIG. 46(*b*), the holder pin 27 is lifted downward along the inclined portion 29e of the guiding slit of the movable plate 29 until the holder pin 27 reaches the portion where the inclined portion 29e and the level portion 29f meet. As a result, the cartridge 17 is down-lifted, and the disk 18 is chucked onto the spindle motor 2, thereby completing the loading operation. Here, a position on the side of the movable plate 29 (previously F) is denoted as G. As shown in FIG. 47, the slide guiding pin 31b fixed to the sliding plate 31 is interlocked with the sliding slit 29d on the upper surface of the movable plate 29; however, since the slide guiding pin 31b moves along the guiding slit 29g in a direction the same as the moving direction of the movable plate 29, even when the movable plate 29 is moved from F to G, the slide guiding pin 31b does not move in the +J direction, but rather the position thereof is fixed. Thus, the magnetic head section 6 linked to the slide guiding pin 31b via the driving gear 33, etc. is held in the predetermined retreat position.

Then, the loading motor 30 is further rotated so as to move the movable plate 29 in the E direction in FIG. 44(*b*).

Figure 48:
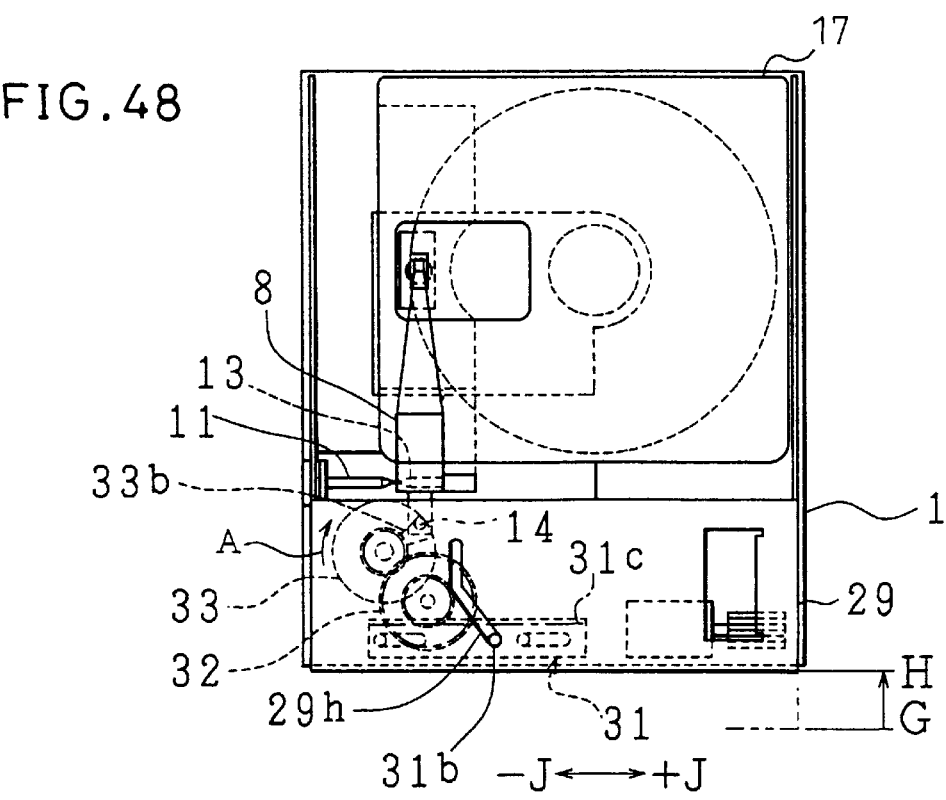
FIG. 48 is a plan view showing an arrangement wherein the magnetic head section and the light pickup of the optical disk device are linked to each other.

Here, as shown in FIG. 46(*c*), since the holder pin 27 is interlocked with the level portion 29f of the guiding slit of the movable plate 29, the position of the holder pin 27, namely, the position of the cartridge 17 which has been loaded is not changed. The movable plate 29 is moved to the end portion (right side in FIG. 46(*c*)) of the base plate 28. Here, a position on the side of the movable plate (previously G) is denoted as H. As shown in FIG. 48, since the slide guiding pin 31b fixed to the sliding plate 31 moves along a guiding slit 29h inclined with respect to the moving direction of the movable plate 29, when the movable plate 29 is moved from G to H, the slide guiding pin 31b is moved in the +J direction, and the sliding plate 31 is also moved in the +J direction. Then, the linking gear 32 interlocked with the rack 31c of the sliding plate 31 is rotated, and the driving gear 33 starts being rotated in the direction of the arrow A in FIG. 48. In response to this, the driving pin 14 interlocked with the cut-out portion 33b of the driving gear 33 is moved, and in response to this movement of the driving pin 14, the second supporting arm 8 is moved from the retreat position towards the light pickup 4 along the second magnetic head guiding pins 11 and the first magnetic head guiding pins 13, thereby linking the first supporting arm 12 and the second supporting arm 8.

In order to move the magnetic head section 6 linked to the light pickup 4 to the predetermined retreat position, the described operation is reversed. Namely, the magnetic head section 6 is lifted upward by the magnetic head section lifting mechanism (not shown) to a position where the lower surface of the magnetic head section 6 does not contact the upper surface of the cartridge 17, and the light pick up 4 is moved to a position above the outermost side of the disk. When the loading motor 30 is rotated in the reverse direction so as to move the movable plate 29 from H to G, the sliding plate 31 is moved in the −J direction. Then, the second supporting arm 8 linked to the first supporting arm 12 is moved from a position on the first magnetic head guiding pins 13 to a position on the second magnetic head guiding pins 11 via the linking gear 32 and the driving gear 33, and the magnetic head section 6 is held in the predetermined retreat position on the side of the second magnetic head guiding pins 11. Thereafter, the movable plate 29 is moved from G to F (see FIG. 47). In response to this, the holder pin 27 is up-lifted, and accordingly the cartridge 17 is also up-lifted. Then, the cartridge 17 is ejected out of the optical disk device in the lateral direction, thereby completing the unloading operation.

As described, by carrying out the retreating operation and the retreating releasing operation of the magnetic field applying means with the loading motor 30 which carries out the loading and unloading operations for drawing and ejecting the cartridge 17 into and out of the optical disk device, respectively, it is not required to additionally provide a magnetic head section retreating motor, and therefore it is possible to provide the magnetic head retreating mechanism inexpensively.

Fourteenth Embodiment

The following will describe Fourteenth Embodiment of the present invention referring to FIG. 49(*a*) through FIG. 53(*b*). Note that, for convenience, members having the same functions as the members indicated in Figures of the previous embodiment are given the same reference numerals, and the explanations thereof are omitted.

Even when a recordable optical disk is used, it is rare that the recording operation is always carried out, but generally, the reading operation for reading of information is carried out most of the time. During recording of information, the surface of the magnetic head section 6 facing the disk, namely, the magnetic field generating section and a slider member are in vicinities of or made contact with the disk surface. When the recording of information is finished, and in the case where the disk facing surface of the magnetic head section 6 facing the disk is not moved but is held in the vicinity of the disk surface, there is a danger that the magnetic head section 6 and the disk 18 are collided, resulting in the damage, and in the case where the magnetic head section 6 is made contact with the disk 18 for a period of time, a load is put on the spindle motor 2 rotating the disk 18 so that the power consumption of the spindle motor 2 is increased. For this reason, it is a common practice to adopt a system in which the magnetic head section 6 is made in a vicinity of or made contact with the disk surface only during recording of information, and upon finishing of recording, the magnetic head section 6 is retreated above the disk surface. For the driving source of the lifting mechanism for carrying out the lifting operation in which the magnetic head section 6 is lifted in the vertical direction, a lifting motor is generally adopted.

Figures 49A, 49B:
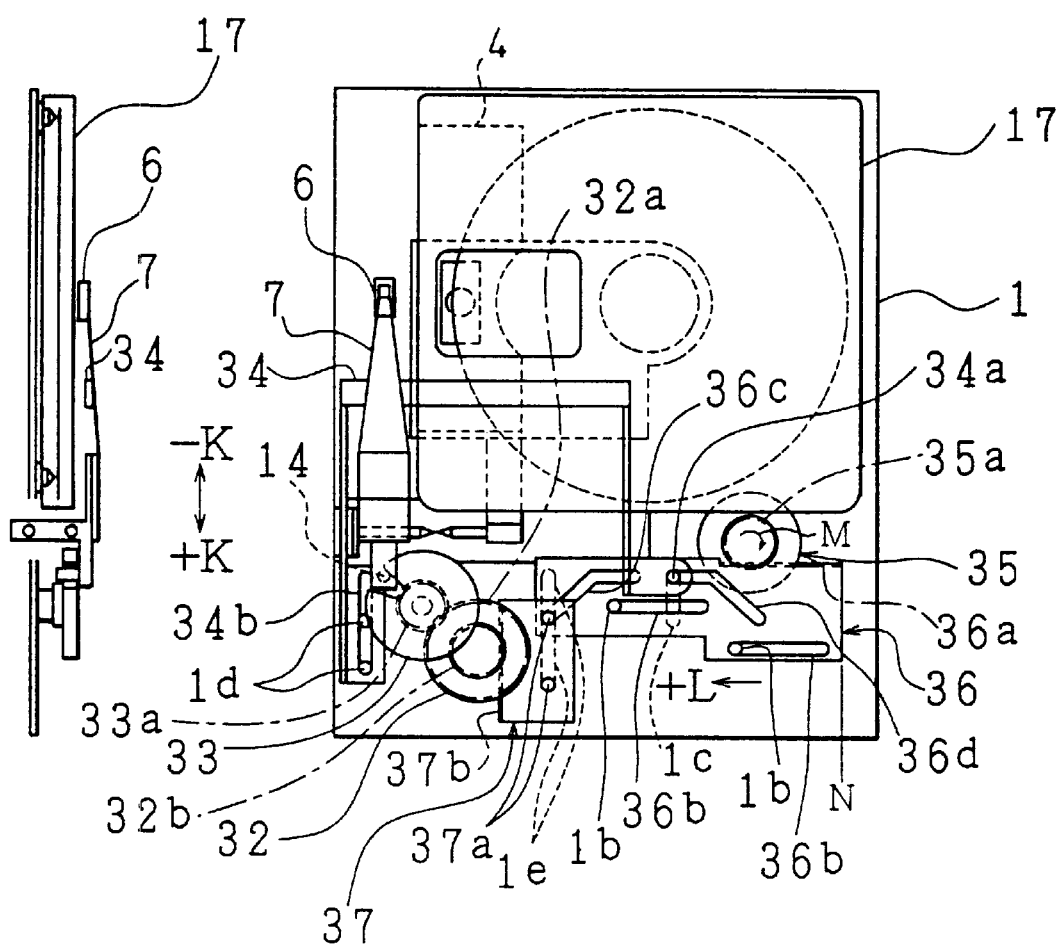
FIG. 49(a) and FIG. 49(b) are drawings showing an arrangement of an optical disk device in accordance with Fourteenth Embodiment of the present invention wherein a cartridge is being inserted.

FIG. 49(a) and FIG. 49(b) show an arrangement wherein, in the cartridge loading operation, a lifting motor (separating-contacting means) (described later) 35 is used for (1) an operation of separating the magnetic field applying means from the light pickup 4 so as to move the magnetic field applying means to the retreat position outside the moving region of the cartridge 17 and (2) an operation of linking the magnetic field applying means to the light pickup 4 from the retreat position. Here, the cartridge 17 is placed in a predetermined position in the optical disk device by a loading mechanism (not shown).

Under the suspension member 7 of the magnetic head section 6 placed in the retreat position, a lifting arm (separating-contacting means) 34 is provided. The lifting arm 34 is provided over the moving range of the magnetic head section 6 from the inner side of the disk to the retreat position. Also, the lifting arm 34 contacts the suspension member 7 of the magnetic head section 6 from below, and is slidable along the longitudinal direction of the suspension member 7. When the lifting arm 34 is positioned in a vicinity of the midway portion of the suspension member 7 so that the magnetic head section 6 is not in contact with the cartridge 17, as shown in FIG. 49(a) and FIG. 49(b), the lifting arm 34 is slidable only in the direction of +K in FIG. 49(a) and FIG. 49(b), namely, as will be described later, the lifting arm 34 is slidable only in a direction from the magnetic head section 6 towards the "root" of the suspension member 7. The height of the lower surface of the magnetic head section 6 is set so as to avoid contacting the upper surface of the cartridge 17 when the device is in the arrangement of FIG. 49(a) and FIG. 49(b).

On the main chassis 1, the lifting motor 35 is fixed, and also a first sliding plate 36 parallel to the disk surface is provided. The first sliding plate 36 is provided with four guiding slits 36b, 36c, and 36d. The guiding slits 36b are linearly provided in a direction perpendicular to the sliding direction of the lifting arm 34, and two guiding pins 1b fixed to the main chassis 1 are respectively interlocked with the guiding slits 36b. This allows the first sliding plate 36 to be moved in the direction of +L, namely, the first sliding plate 36 is able to move in a predetermined direction parallel to the guiding slits 36b. Note that, an end portion of the first sliding plate 36, on the side opposite to the +L direction when the magnetic head section 6 is in the retreat position and is higher than the upper surface of the cartridge 17 is denoted as N. The guiding slit 36c is composed of a level portion parallel to the guiding slits 36b and an inclined portion which is positioned on the end in the +L direction of the guiding slit 36b. The guiding slit 36d is composed of a level portion parallel to the guiding slits 36b and an inclined portion which is positioned on the end in a direction opposite to the +L direction of the guiding slit 36b.

Figure 50A:
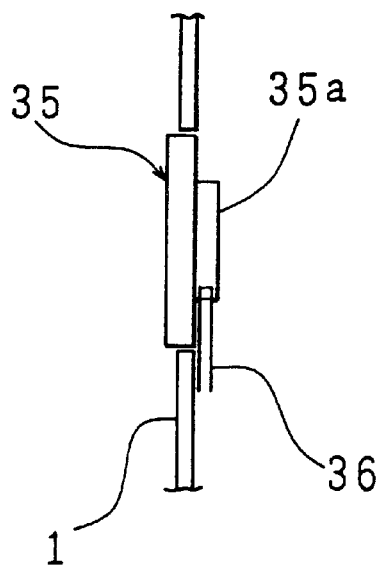
FIG. 50(a) and FIG. 50(b) are plan views respectively showing how the rack and the rotation gear are interlocked with each other.
Figure 50B:
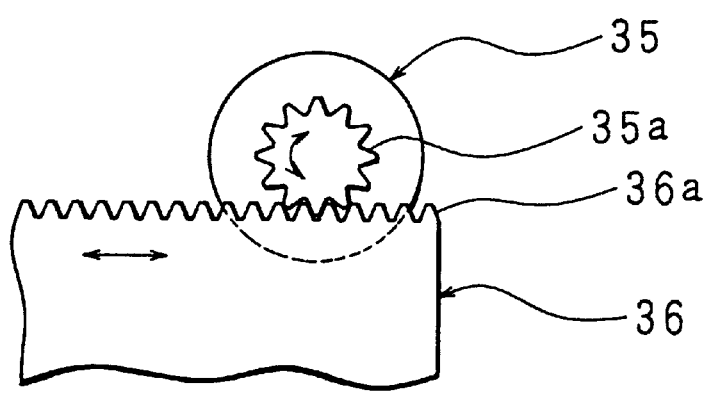

As shown in FIG. 50(a) and FIG. 50(b), on the end of the upper side of the first sliding plate 36, a rack 36a is provided, and the rack 36a is interlocked with a rotation gear 35a of the lifting motor 35. FIG. 50(a) shows a portion of the lifting motor 35 as viewed from the left side of the optical disk device of FIG. 49(b), and FIG. 50(b) shows the arrangement of FIG. 50(a) as viewed from the right side, namely, FIG. 50(b) shows an enlarged portion of the lifting motor 35 of FIG. 49(b).

As shown in FIG. 49(b), on the main chassis 1 under the first sliding plate 36, a guiding slit 1c is provided in the sliding direction (+K and −K directions) of the lifting arm 34. On one end portion (right side in FIG. 49(b)) of the lifting arm 34, a driving pin 34a is fixed, and the driving pin 34 is interlocked with both the guiding slit 36d of the first guiding slit 36 and the guiding slit 1c of the main chassis 1. On the other end portion (left side in FIG. 49(b)) of the lifting arm 34, a guiding slit 34b is provided in the sliding direction of the lifting arm 34, and two guiding pins 1d fixed to the main chassis 1 are interlocked with the guiding slit 34b. Thus, the movement of the lifting arm 34 is restricted only in the +K and −K directions. As shown in FIG. 49(b), one of the two guiding pins 1d, which is on the side of the end in the +K direction, is positioned on an end portion in the +K direction of the guiding slit 34b. For this reason, the lifting arm 34 is movable only in the +K direction in this arrangement.

On the other hand, on the upper side of the first sliding plate 36, a second sliding plate 37 is provided. on the second sliding plate 37, two guiding pins 37a are fixed. The main chassis 1 is provided with two guiding slits 1e in the −K and +K directions, facing the guiding pins 37a. One of the guiding pins 36 (lower pin in FIG. 49(b)) is interlocked with only one of the guiding slits 1e of the main chassis 1. The other one of the guiding pins 37 (upper pin in FIG. 49(b)) is interlocked with both the guiding slit 36c of the first sliding plate 36 and the other guiding slit 1e of the main chassis 1. As shown in FIG. 49(b), the guiding pins 37a are positioned on the end portions in the +K direction of the guiding slits 1e, respectively. For this reason, the second sliding plate 37 is movable only in the +K direction.

On a side of the end portion (left side in FIG. 49(b) of the second sliding plate 37, a rack 37b is provided. On the main chassis 1, a linking gear 32 and a driving gear 33 are fixed so as to be free to rotate. The linking gear 32 is a two-step gear composed of a larger diameter linking gear 32a and a smaller diameter linking gear 32b. The driving gear 33 is provided with a smaller diameter driving gear 33a with steps. The smaller diameter driving gear 33a is interlocked with the larger diameter linking gear 32a, and the smaller diameter linking gear 32b is interlocked with the rack 37b of the second sliding plate. The driving gear 33 is interlocked with the driving pin 14 of the second supporting arm 8 fixed to the magnetic head section 6. The lifting motor 35, the first sliding plate 36, the second sliding plate 37, the linking gear 32, the driving gear 33, and the driving pin 14 constitute the switching means.

The following describes the lifting and moving operations of the magnetic head section 6.

When the lifting motor 35 is rotated in the direction of the arrow M, an end portion of the first sliding plate 36 interlocked with the lifting motor 35 is slid in the +L direction.

Figure 51:
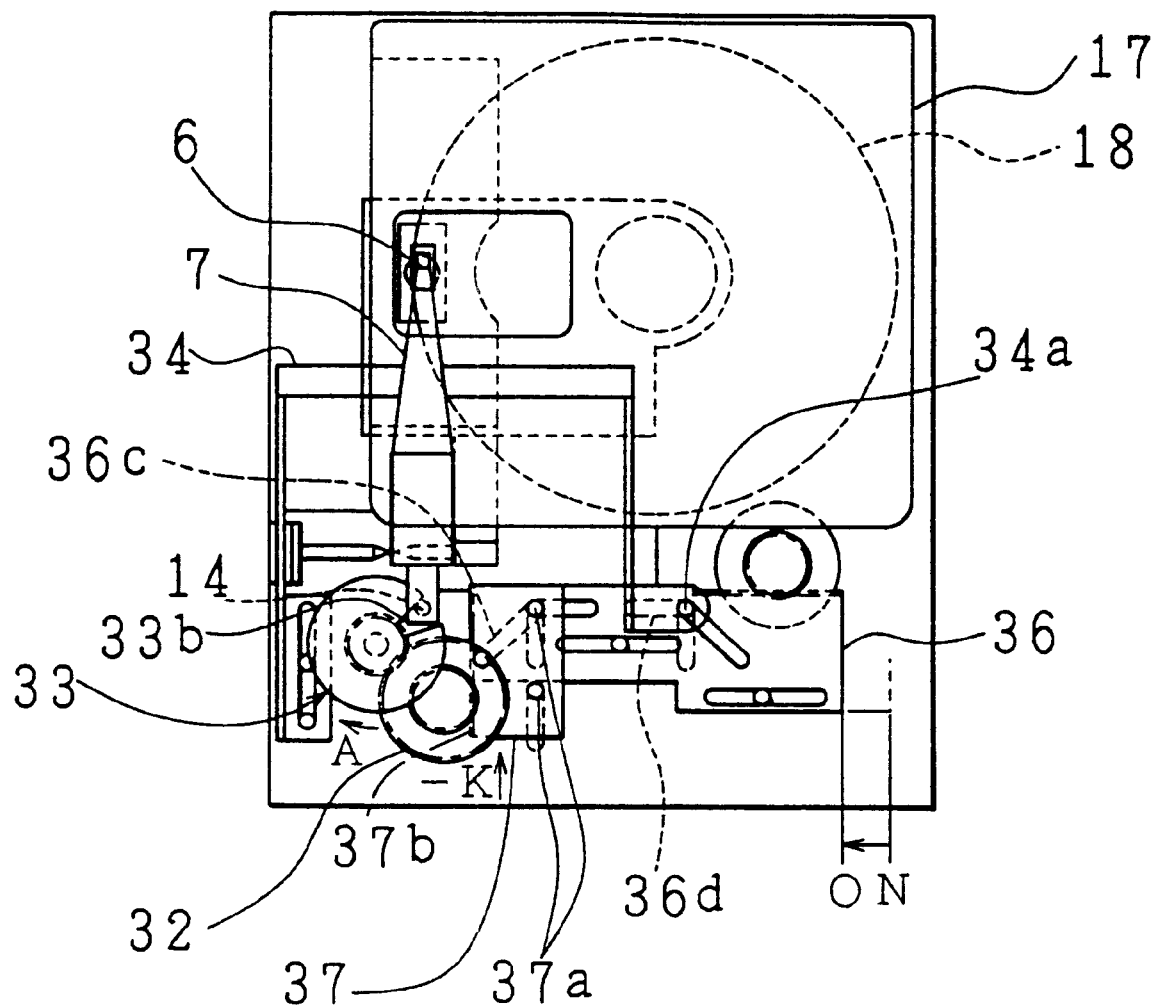
FIG. 51 is a plan view showing an arrangement wherein the magnetic head section and the light pickup of the optical disk device are linked to each other.

In response to this, as shown in FIG. 51, the first sliding plate 36 is moved to a position such that the driving pin 34a fixed to the lifting arm 34 reaches the bending portion of the guiding slit 36d of the first sliding plate 36. Here, since the guiding slit 36d of the first sliding plate 36 interlocked with the driving pin 34a fixed to the lifting arm 34 is in the same direction as the sliding direction, the driving pin 34a of the lifting arm 34 is not moved in the +K direction, and so the position thereof is not changed. Thus, the magnetic head section 6 as lifted with the suspension member 7 by the lifting arm 34 is held in the same position. Note that, a side of the first sliding plate 36 opposite to the +L direction when the retreating of the magnetic head section 6 is released and when the magnetic head section 6 is higher than the upper surface of the cartridge 17 is denoted as O.

In the transition between the arrangement of FIG. 49(a) and FIG. 49(b) and the arrangement of FIG. 51, the guiding pin 37a fixed to the second sliding plate 37, interlocked with the guiding slit 36c of the first sliding plate 36 is moved in the −K direction along the inclined portion because the guiding pin 37a is interlocked with the inclined portion of the guiding slit 36c. In response to this, the second guiding slit 37 is moved in the −K direction, and the linking gear 32 interlocked with the rack 37b provided on the end portion of the second sliding plate 37 is rotated which in turn causes the driving gear 33 to rotate in the A direction. Then, the driving pin 14 interlocked with the cut-out portion 33b of the driving gear 33 is moved in accordance with the rotation of the driving gear 33, and in response to this movement of the guiding pin 14, the second supporting arm 8 is moved towards the light pickup along the first and second magnetic head guiding pins, thus linking the first supporting arm 12 and the second supporting arm 8. Here, because the magnetic head section 6 is lifted by the lifting arm 34 to a position which does not allow contact with the upper surface of the cartridge 17, the magnetic head section 6 is prevented from contacting the cartridge 17 when moved from the retreat position.

Figure 52:
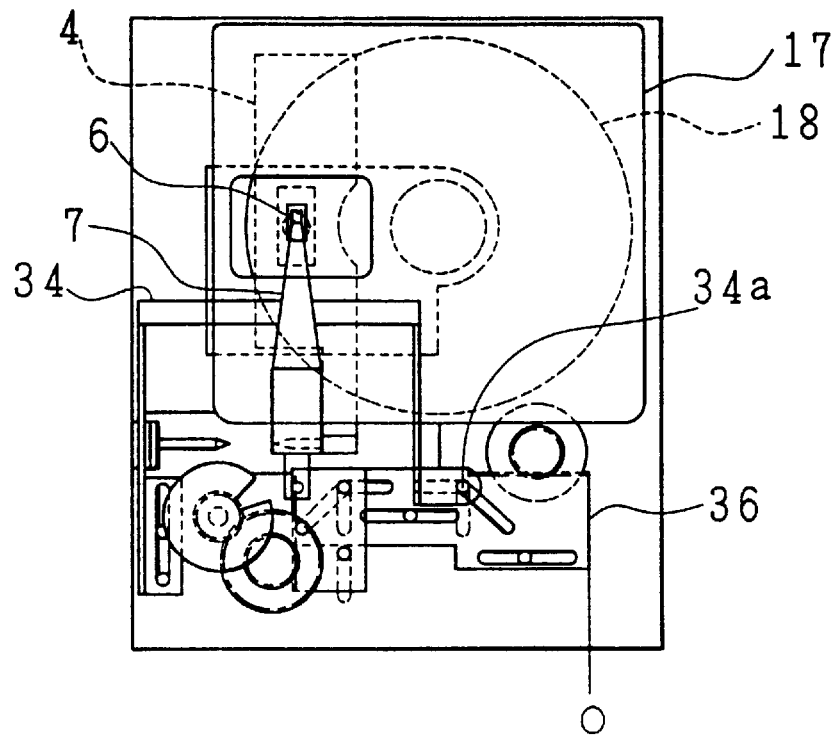
FIG. 52 is a plan view showing an arrangement of the optical disk device wherein the magnetic head section is lifted upward.

FIG. 52 shows an arrangement wherein the magnetic head section 6 is integrally linked to the light pickup 4, and is positioned on the inner side of the disk. Here, the first sliding plate 36 is positioned at O as in FIG. 51, and the magnetic head section 6 is up-lifted by the lifting arm 34. When reproducing of information by the light pickup 4 is carried out in this arrangement, it is possible to reduce (1) the danger of the magnetic head section 6 colliding the disk 18 and (2) the load on the spindle motor 2 induced by a prolonged contact.

When recording and erasing information, it is required to down-lift the magnetic head section 6 towards the disk.

Figure 53A:
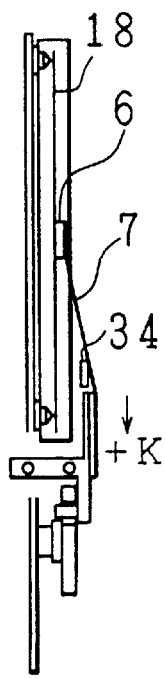
FIG. 53(a) and FIG. 53(b) are drawings showing an arrangement of the optical disk device wherein the magnetic head section is lifted-down towards a medium.
Figure 53B:
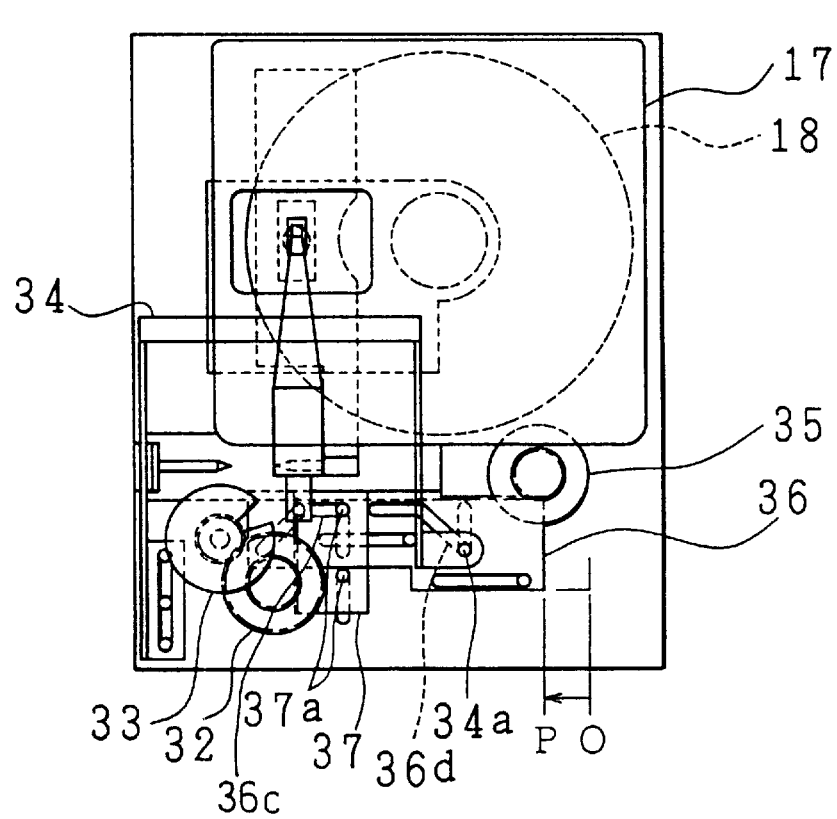

As shown in FIG. 53(a) and FIG. 53(b), when the lifting motor 35 is rotated so as to move further the end portion of the first sliding plate 36, the driving pin 34a fixed to the lifting arm 34 is moved in the +K direction along the inclined portion of the guiding slit 36d of the first sliding plate. As a result, in response to the slide movement of the driving pin 34a in the +K direction, the up-lifting of the suspension member 7 of the magnetic head section 6 is released, and the magnetic head section 6 of the suspension member 7 is sprung down towards the surface of the disk 18 by the spring force. Note that, a side of the first sliding plate 36 opposite to the +L direction when the retreating of the magnetic head section 6 is released and when the magnetic head section 6 is moved downward towards the surface of the disk 18 is denoted as P.

Because the guiding pin 37a fixed to the second sliding plate 37 is interlocked with a latter-half portion of the guiding slit 36c provided in the same direction as the moving direction of the first sliding plate 36, the guiding pin 37a is not moved in the +K direction, but is rather fixed in the same position. Thus, the linking gear 32 and the driving gear 33 are not rotated.

In order to move the magnetic head section 6 linked to the light pickup 4 to the predetermined retreat position, the described operation is reversed. Namely, the lifting motor 35 is rotated in the reverse direction and the end portion of the first sliding plate 36 is moved from P to O so as to up-lift the magnetic head section 6 to a position where the lower surface of the magnetic head section 6 does not contact the upper portion of the cartridge 17. The light pickup 4 is moved to a position above the outermost side of the disk by the light pickup transporting mechanism. Then, the lifting motor 35 is further rotated in the reverse direction, and the end portion of the first sliding plate 36 is moved from O to N. This makes the second sliding plate 37 to slide in the +K direction, and the second supporting arm 8 linked to the first supporting arm 12 to move from a position on the first magnetic head guiding pins 13 to a position on the second magnetic head guiding pins 11 via the linking gear 32 and the driving gear 33, thus holding the magnetic head section 6 in the predetermined retreat position on the side of the second magnetic head guiding pins 11.

As described, by carrying out the retreating operation and the retreating releasing operation of the magnetic field applying means by the lifting motor 35 which is a driving source of the lifting mechanism of the magnetic field applying means, it is not required to additionally provide a magnetic head section retreating motor, and therefore it is possible to provide the magnetic head retreating mechanism inexpensively.

Fifteenth Embodiment

The following will describe Fifteenth Embodiment of the present invention referring to FIG. 54(a) through FIG. 57(b).

Figure 54A:
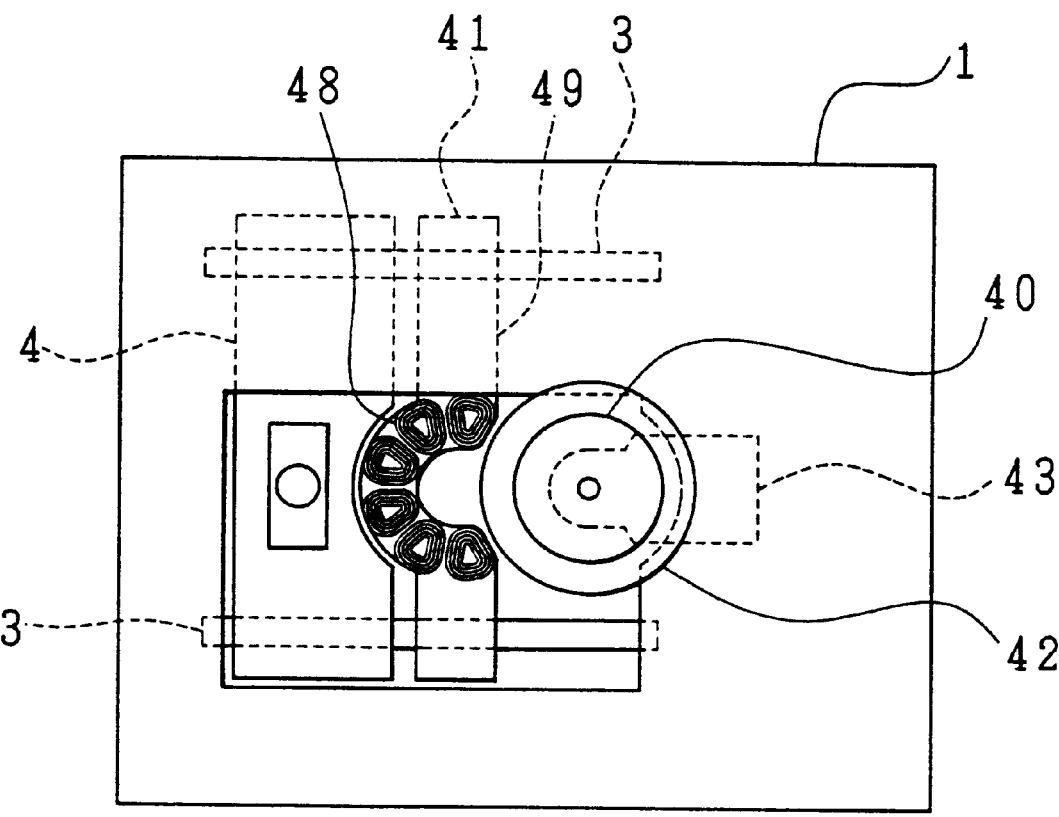
FIG. 54(a) and FIG. 54(b) are drawings showing a main component of one arrangement of an optical disk device in accordance with Fifteenth Embodiment of the present invention.
Figure 54B:
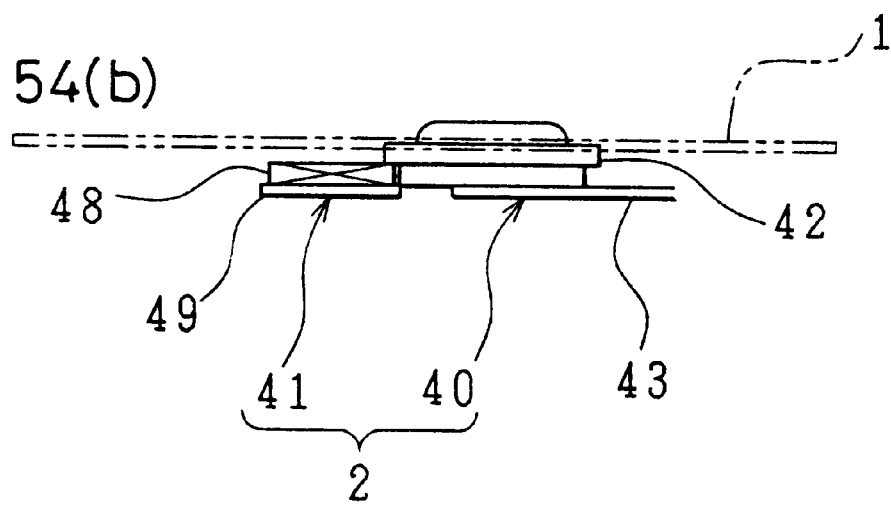

FIG. 54(a) and FIG. 54(b) respectively show one arrangement of a main component of the optical disk device in accordance with the present embodiment. On the main chassis 1, a pair of guiding members (light pickup guiding members) 3 are fixed. The light pickup 4 is provided so as to be free to rotate in the radial direction of a disk (not shown) via the guiding members 3, and is linked to a transporting mechanism section (not shown) for the tracking operation.

The spindle motor 2 for rotatably driving a disk as a recording medium is divided into a first motor unit 40 and a second motor unit 41. The first motor unit 40 is composed of a bearing supporting plate 43, a turn table 42, a rotation shaft (not shown), a rotor magnet, a bearing, and a disk chucking magnet. The second motor unit 41 is composed of a stator coil 48 and a coil support 49 which also serves as a back yoke. The first motor unit 40 and the second motor unit 41 are respectively linked to a lifting mechanism section (not shown) and a sliding mechanism section (not shown).

FIG. 54(a) and FIG. 54(b) respectively show an arrangement before the cartridge is inserted. The light pickup 4 is positioned on a portion corresponding to the outer side of the disk. The first motor unit 40 which can be up-lifted and down-lifted is positioned on the bottom of the optical disk device to avoid contacting the cartridge when inserting the cartridge. The second motor unit 41 is positioned in a direction parallel to the disk surface, namely, the second motor unit 41 is adjacent, side by side with the first motor unit 40 in a direction which does not add thickness. Also, the second motor unit 41 is provided so as to be freely slid via the guiding members 3 of the light pickup 4.

Generally, an optical disk and MD are encased in a cartridge for easy handling which is a characteristic of such disks. However, conventionally, the vertical movement mechanism for the cartridge has been a problem in an attempt to make the optical disk device thinner due to the space required for the movement of the cartridge. In order to realize a thinner optical disk device, the present embodiment adopts an arrangement wherein the spindle motor 2 is divided into two components of (1) the first motor unit 40 composed of the turn table fixed to the rotor magnet and (2) the second motor unit 41 provided with the first stator coil, and while loading the cartridge, the second motor unit 41 is slid to a space (second space) which has been created by the movement of the first motor unit 40 towards the disk, and the second motor unit 41 thus slid is linked to the first motor unit 40 so as to be rotatably driven as the spindle motor 2. The second motor unit 41, prior to moving to the second space, is positioned adjacent to the first motor unit 40 (first space). In this manner, by adopting an arrangement wherein the amount of down-lifting of the cartridge is shared by the down-lifting of the cartridge and the up-lifting of the spindle motor, the amount of down-lifting of the cartridge is reduced. Also, the spindle motor 2 is divided into an upper part and a lower part, and by positioning the two parts side by side prior to up-lifting, an increase in thickness of the optical disk device, due to the up-lifting of the spindle motor, is prevented, thereby realizing a thinner optical disk device.

The following describes the described arrangement referring to FIG. 56(*a*) through FIG. 56(*c*). First, as shown in FIG. 56(*a*), the cartridge 17 is laterally inserted into the optical disk device. Note that in the present invention, unless noted, reference to "lateral direction" and "vertical direction" is made with respect to the case where the disk 18 is positioned above the spindle motor 2, and therefore the "lateral direction" and "vertical direction" do not necessarily indicate such directions in a general sense. Therefore, the present invention includes, for example, an arrangement wherein a disk in inserted into an optical disk device with its insertion opening perpendicular to the ground.

Then, as shown in FIG. 56(*b*), the cartridge 17 which has been moved laterally to a predetermined position is down-lifted towards the spindle motor 2, and simultaneously, the first motor unit 40 is up-lifted by the lifting mechanism section towards the cartridge 17, thus chucking the disk 18 encased in the cartridge 17 on the turn table 42. Here, since the first motor unit 40 is lifted upward, a space R (second space) is created for the amount of the up-lifting below the first motor unit 40 chucking the disk 18.

Then, as shown in FIG. 56(*c*), the second motor unit 41 linked to the sliding mechanism section is slid by the sliding mechanism section to the space R below the first motor unit 40. Here, the rotor magnet (not shown) provided on the first motor unit 40 and the stator coil (not shown) provided on the second motor unit 41 face each other at a predetermined position. Here, the divided components of the spindle motor 2, the first motor unit 40 and the second motor unit 41, are integrated as a single unit, thus having the same arrangement as the conventional integrated spindle motor.

As described, the spindle motor 2 is divided into two units, and when the cartridge 17 is not inserted, the second motor unit 41 is positioned beside the first motor unit 40, and when loading the cartridge 17, the first motor unit 40 is up-lifted, and the second motor unit 41 is moved to the space created by the up-lifting of the first motor unit 40. This arrangement allows the thickness of the spindle motor to be reduced, thereby realizing a thinner optical disk device.

Incidentally, in the described arrangement, As driving members carrying out, after the cartridge loading operation, (1) an operation of up-lifting of the first motor unit 40 and (2) an operation of sliding the second motor unit 41, specialized motors are provided, respectively. The following describes, as another example, an arrangement wherein, in the above operations (1) and (2), the up-lifting of the first motor unit 40 is carried out without providing a specialized motor for up-lifting thereof, referring to FIG. 57(*a*) and FIG. 57(*b*).

First, as shown in FIG. 57(*a*), the cartridge 17 is laterally inserted by the loading mechanism (not shown). The first motor unit 40 is fixed to the bearing supporting plate 43. On the main chassis 1, the guiding pins 44 are fixed, and the bearing supporting plate 43 is movable in the vertical direction along the guiding pins 44. The diameter of the upper portion of each guiding pin 44, namely, on the side of the main chassis 1 is larger than the diameter of the lower portion, and the lower portion of each guiding pin 44 is a bearing supporting plate contacting section 44*a* contacting the bearing supporting plate 43. Also, a damp spring 45 is provided around each guiding pin 44 so as to press downward the bearing supporting plate 43.

On the main chassis 1, a bearing support 46 is fixed for rotatably holding a lifting pin 47 provided under the bearing support 46. On one end (right side in FIG. 57(*a*) and FIG. 57(*b*)) of the lifting pin 47, the cartridge contacting section 47*a* is provided, which sticks out onto the main chassis 1 from the cutout portion 1*h* of the main chassis 1. The other end of the lifting pin 47 contacts the lower surface of the bearing supporting plate 43 as a spindle motor contacting section 47*b*.

On the "root" of the cartridge contacting section 47*a* of the lifting pin 47, a contacting section 47*c* contacting the lower surface of the main chassis 1 is provided. This arrangement prevents the cartridge contacting section 47*a* from being up-lifted for an excessive amount. The first motor unit 40 is pressed downward by the spring force of the damp spring 45; however, the position of the first motor unit 40 is restricted by the contacting section 47*c*.

Then, as shown in FIG. 57(*b*), the cartridge 17 is down-lifted by the loading mechanism (not shown). In response to this, the cartridge contacting section 47*a* on one end of the lifting pin 47 is pressed downward, and the lifting pin 47 starts being rotated. In accordance with the rotation of the lifting pin 47, the spindle motor contacting section 47*b* on the other end of the lifting pin 47 lifts upward the first motor unit 40. Here, since the guiding pin 44 is provided with the bearing supporting plate contacting section 44*a*, the up-lifting position of the first motor unit 40 is determined by the bearing supporting plate contacting section 44*a*.

In the described manner, by the downward movement of the cartridge 17 and the upward movement of the first motor unit 40, the disk encased in the cartridge 17 is chucked on the turn table constituting the first motor unit 40.

When ejecting the cartridge 17, the cartridge 17 is moved upward by the loading mechanism (not shown). In response this, the cartridge contacting section 47*a* on the end portion of the lifting pin 47 is separated from the cartridge 17. The first motor unit 40 is pressed downward by the spring force of the damp spring 45 until its movement is restricted by the contacting section 47*c* of the lifting pin 47 on the main chassis 1. Thereafter, the cartridge 17 is laterally ejected out of the optical disk device.

With the described arrangement, it is possible to carry out the up-lifting and down-lifting of the first motor unit 40 of the divided spindle motor in accordance with the loading operation of the cartridge 17.

Incidentally, the guiding of sliding of the second motor unit 41 can be carried out by additionally providing a specialized member. However, in the described arrangements in accordance with the present embodiment, as will be described in the following, a member provided for other purpose is used.

Figure 55A:
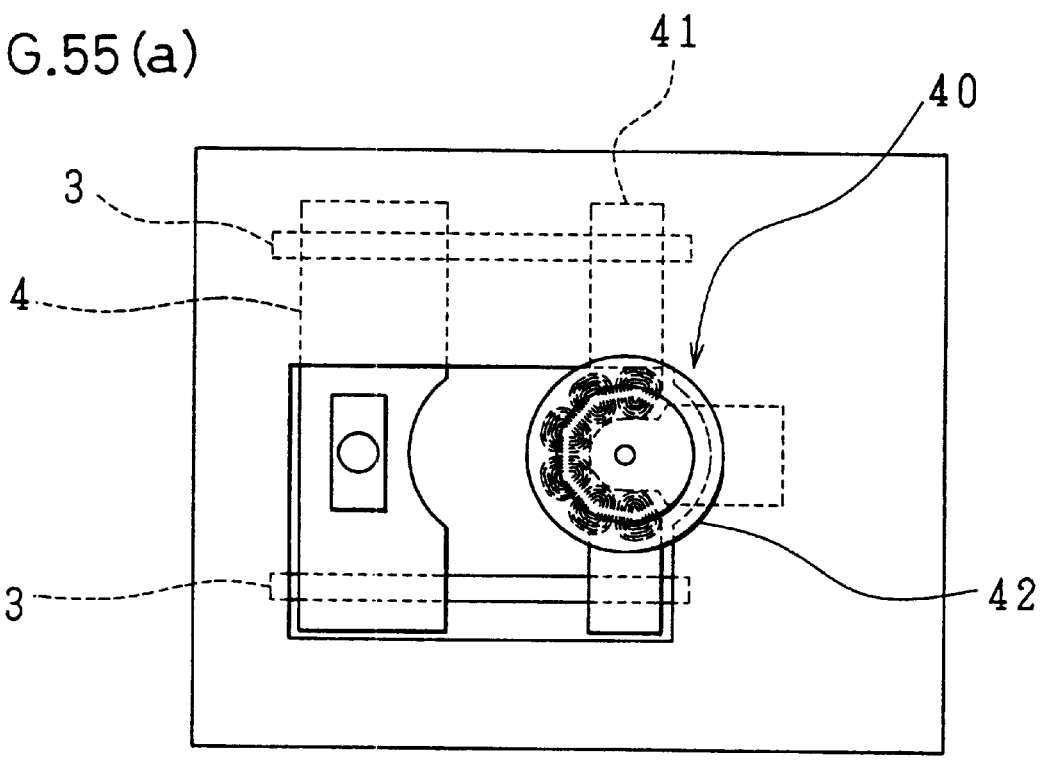
FIG. 55(a) and FIG. 55(b) are drawings showing an arrangement of the optical disk device wherein a cartridge is being inserted.
Figure 55B:
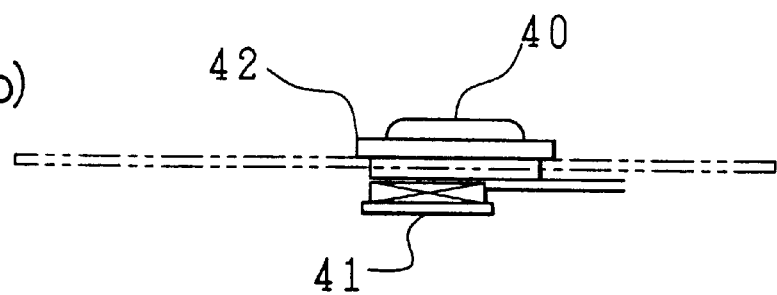

FIG. 55(*a*) and FIG. 55(*b*) show an arrangement wherein the cartridge (not shown) is inserted, and a disk (not shown) is chucked on the turn table. When the second motor unit 41 is slidably moved, the arrangement of the optical disk device changes from the arrangement of FIG. 54(*a*) and FIG. 54(*b*) to the arrangement of FIG. 55(*a*) and FIG. 55(*b*). The first motor unit 40 is lifted upward toward the cartridge by the lifting mechanism section (not shown) to a predetermined position, and the second motor unit 41 linked to the sliding mechanism section is moved along the guiding members 3 of the light pickup 4 by the sliding mechanism section to a space created by the up-lifting of the first motor unit 40. As a result, the divided components, the first motor unit 40 and the second motor unit 41, are integrated as a single unit, thus having the same arrangement as the conventional integrated spindle motor.

As described, in the present embodiment, a member for sliding the second motor unit 41 and a guiding member for tracking movement of the light pickup 4 are the same. For this reason, it is not required to additionally provide a guiding member specialized in sliding of the second motor unit 41, thus realizing a smaller optical disk device. Also, since it is possible to reduce the number of components of the optical disk device, and to simplify the structure, a rise in manufacturing cost, due to an increase in the number of specialized driving members, can be prevented.

As described, the guiding of sliding of the second motor unit 41 is carried out by the guiding members 3 of the light pickup 4. Here, because it is required that the relative positions of the turn table 42 of the first motor unit 40 and the light pickup 4 are accurately determined, (1) the guiding members 3 which determine the relative positions of the light pickup 4 and (2) the turn table 42 of the first motor unit 40 are accurately positioned. Therefore, by sliding the second motor unit 41 in accordance with the guiding members 3, it is possible to always accurately position the first motor unit 40 and the second motor unit 41 with ease. Thus, when the second motor unit 41 is slidably moved to a space below the first motor unit 40, it is possible to obtain with ease the same characteristic as that of an integrated spindle motor.

Sixteenth Embodiment

Figure 58:
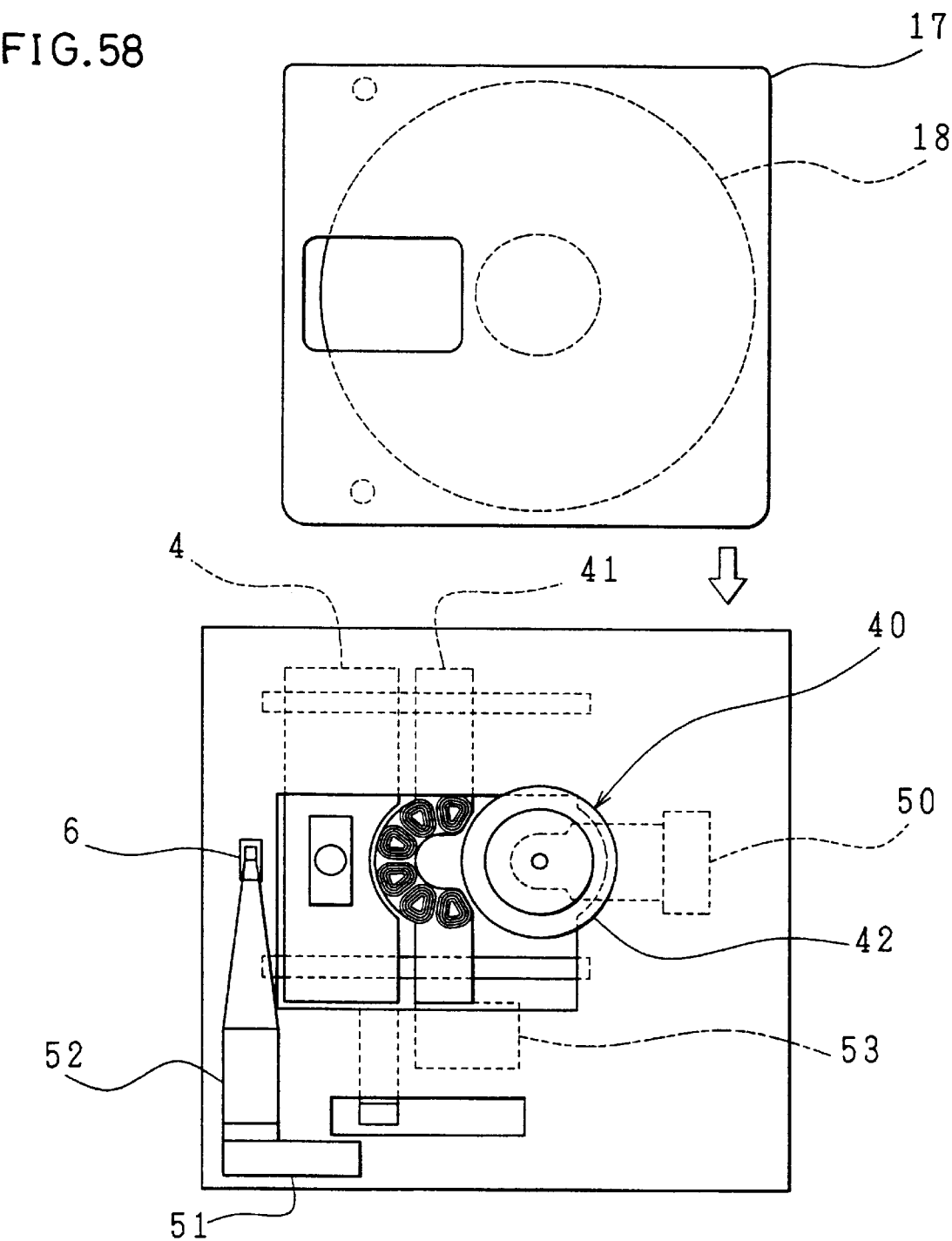
FIG. 58 is a plan view showing an arrangement, before inserting a cartridge, of an optical disk device in accordance with Sixteenth Embodiment of the present invention.
Figure 59:
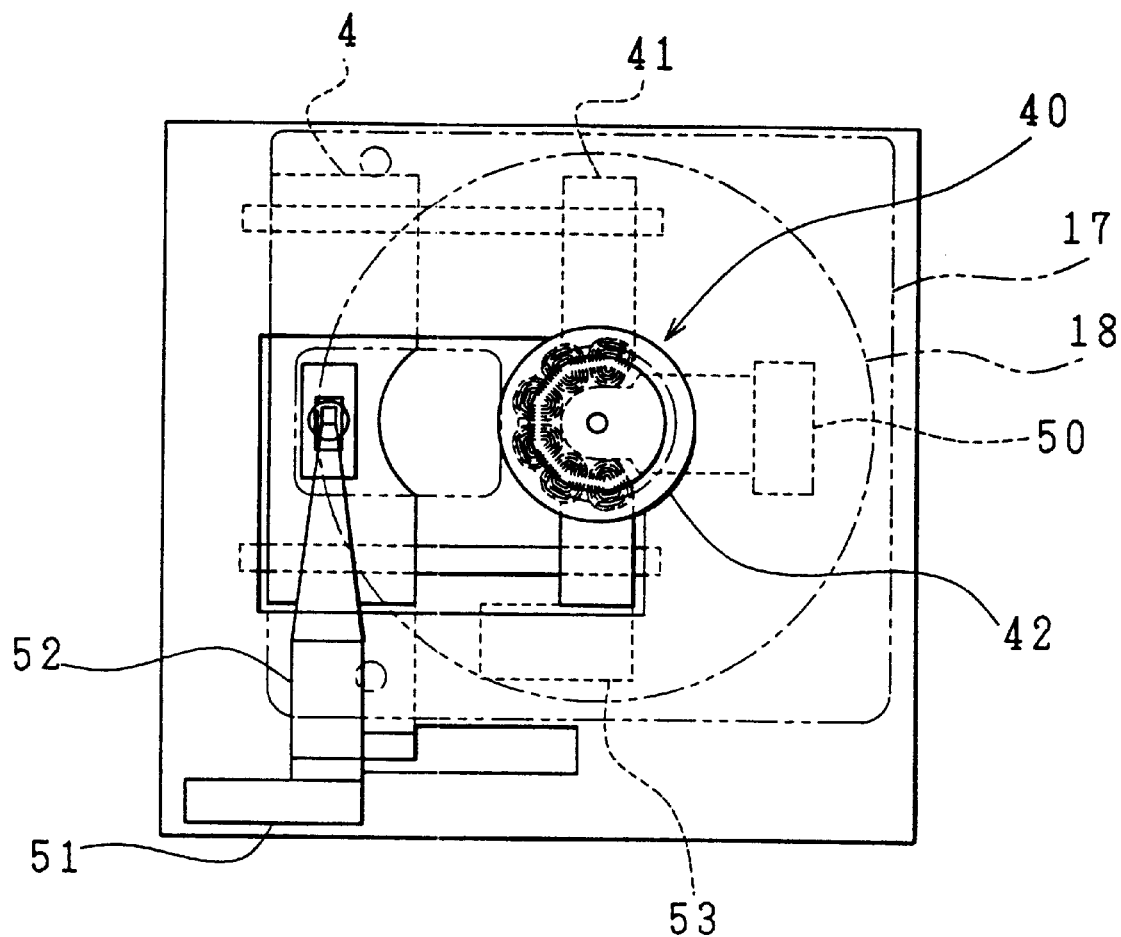
FIG. 59 is a plan view showing an arrangement of the optical disk device wherein a cartridge is being inserted.

The following will describe Sixteenth Embodiment of the present invention referring to FIG. 58 and FIG. 59.

FIG. 58 shows an arrangement before the cartridge is inserted into the optical disk device. In FIG. 58, the blank arrow indicates the insertion direction of the cartridge 17. The first motor unit 40 and the second motor unit 41 are separated from each other. The first motor unit 40 is positioned in a space corresponding to the center of the disk before up-lifting, and the second motor unit 41 is positioned between the light pickup 4 positioned on the outer side of the disk and the first motor unit 40. The first motor unit 40 and the second motor unit 41 are linked to a motor member lifting mechanism section 50 and a motor member sliding mechanism section (controlling means) 53, respectively.

The magnetic field applying means having the magnetic head section 6 for applying a modulated magnetic field to the disk 18 are separated from the light pickup 4, and are positioned in the retreat position outside the moving region of the cartridge 17 during insertion. Also, the magnetic field applying means 52 are linked to the magnetic field applying means sliding mechanism section (controlling means) 51.

The present embodiment adopts an arrangement wherein the magnetic field applying means 52 can be separated from and linked to the light pickup 4, and when the cartridge 17 encasing the disk is inserted into the optical disk device, in order to avoid the magnetic field applying means 52 from contacting the cartridge 17 during (1) the loading operation for moving the cartridge 17 to a predetermined position where recording and reproducing of information is carried out by the light pickup 4 and (2) the unloading operation for ejecting the cartridge 17 out of the optical disk device, the magnetic field applying means 52 are retreated to the retreat position outside the moving region of the cartridge 17, thereby realizing a thinner optical disk device.

FIG. 59 shows an arrangement after the cartridge 17 has inserted into the optical disk device. When the cartridge 17 is inserted into the optical disk device, the first motor unit 40 is lifted upward towards the cartridge by the motor member lifting mechanism section 50 to a predetermined position, and the second motor unit 41 linked to the motor member sliding mechanism section 53 is moved to the space created by the up-lifting of the first motor unit 40 by the motor member sliding mechanism section 53. As a result, the divided components, the first motor unit 40 and the second motor unit 41, are integrated as a single unit, thus having the same arrangement as the conventional integrated spindle motor.

The magnetic field applying means 52 are slidably moved, by the magnetic field applying means sliding mechanism section 51, from the retreat position towards the light pickup 4 (to the right in FIG. 59) so as to be integrally linked to the light pickup 4. The magnetic field applying means 52 and the light pickup 4 thus linked to each other are moved as a single integral unit, thus permitting an easy control of the relative positions of the magnetic field applying means 52 and the light pickup 4.

Incidentally, in the optical disk device having the described arrangement, in the process from insertion of the cartridge 17 to recording and reproducing of information by the light pickup 4, it is required to slidably move the second motor unit 41 and the magnetic field applying means 52. Therefore, in order to ensure a quick start of recording and reproducing, it is required to reduce the time required for the slide movement of the second motor unit 41 and the magnetic field applying means 52. Here, assuming that the time required for slide movement of the second motor unit 41 is $\Delta t1$, and the time required for slide movement of the magnetic field applying means 52 is $\Delta t2$, when the magnetic field applying means 52 are slidably moved after the slide movement of the second motor unit 41, the total time $\Delta t$ required for the slide movement is $\Delta t = \Delta t1 + \Delta t2$. Also, by carrying out the side movement of the second motor unit 41 and the magnetic field applying means 52 simultaneously, the total time $\Delta t$ can be reduced. That is to say, when the time of the slide movement $\Delta t1$ and $\Delta t2$ have a relation of $\Delta t1 > \Delta t2$, by carrying out the slide movement simultaneously, the total time $\Delta t$ required for the slide movement becomes $\Delta t = \Delta t1$ as the time is reduced for the amount of $\Delta t2$, thereby reducing the rising time of the optical disk device when inserting the cartridge 17.

Specifically, for example, in response to a signal that the cartridge 17 has been chucked on the turn table 42 and the up-lifting of the first motor unit 40 has been completed, the magnetic field applying means sliding mechanism section 51 and the sliding mechanism section 53 are energized, at the same time, to a slide movement motor provided for each of the magnetic field applying means sliding mechanism section 51 and the sliding mechanism section 53 so as to start driving, thereby reducing the rising time.

Seventeenth Embodiment

Figure 65:
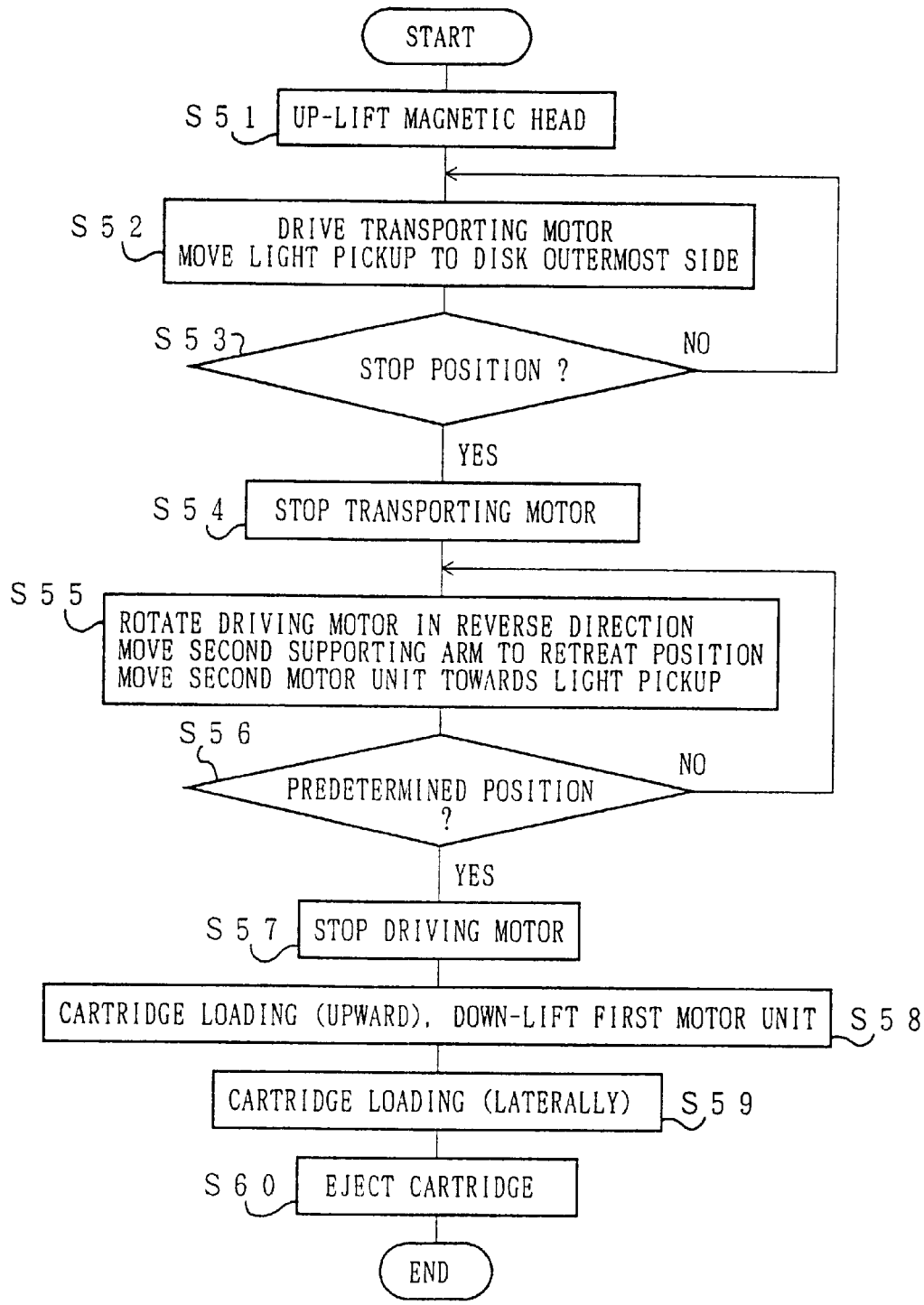
FIG. 65 is a flowchart showing the cartridge unloading operation.

The following will describe Seventeenth Embodiment of the present invention referring to FIG. 60(*a*) through FIG. 65.

FIG. 60(*a*) through FIG. 60(*e*) show an arrangement of a main component of the optical disk device in accordance with the present embodiment before inserting the cartridge 17. In FIG. 60(*b*), the blank arrow indicates the insertion direction of the cartridge 17. On the main chassis 1, the light pickup 4 and the cartridge position determining pin 5 are provided via the guiding members 3.

The spindle motor for rotatably driving a disk as a recording medium is divided into two units of the first motor unit 40 and the second motor unit 41. The first motor unit 40 is composed of a bearing support, a turn table, a rotation shaft, a rotor magnet, a bearing, and a disk chucking magnet (all not shown). The second motor unit 41 is composed of a stator coil and a coil support serving also as a back yoke (both not shown). Also, the first motor unit 40 is linked to the lifting mechanism section (not shown), and is provided on the main chassis 1. The second motor unit 41 can be slidably moved via the guiding members 3, and is provided with the rack 41*a* on the end portion.

On the main chassis 1, the driving motor 16 is fixed, and the rotation gear 16*b* is provided around the rotating section of the driving motor 16. The rotation gear 16*b* and the rack 41 are linked to each other via the linking gears 54 and 55.

On a position adjacent to the second motor section 41 of the spindle motor, (1) a magnetic head section 6 composed of a resin slider member having a core section with coils and (2) a suspension member 7 supporting the magnetic head section 6 are provided. The magnetic head section 6 and the suspension member 7 constitute magnetic field applying means.

The suspension member 7 is fixed to the second supporting arm 8, and the second supporting arm 8 is provided with two guiding openings 9. On the main chassis 1, a guiding pin supporting plate 10 is fixed, and the guiding pin supporting plate 10 is provided with two second magnetic head guiding pins 11. The guiding openings 9 are interlocked with the second magnetic head guiding pins 11, respectively. Thus, the second supporting arm 8 is movable along the second magnetic head guiding pins 11.

The first supporting arm 12 integrally extends from the light pickup 4, and two first magnetic head guiding pins 13 are fixed to the first supporting arm 12. The first magnetic head guiding pins 13 and the second magnetic head guiding pins 11 have the same diameter, and are coaxial to each other.

The driving pin 14 is fixed to the second supporting arm 8. On the main chassis 1, the driving gear 15 is fixed so as to be free to rotate, and a portion of the driving gear 15 is provided with a cut-out portion 15*a* to be interlocked with the driving pin 14. The driving gear 15 is also provided with a smaller diameter gear 15*c*. The smaller diameter gear 15*c* and the rotation gear 16*b* of the driving motor 16 are linked to each other by the linking gear 56. The driving motor 16, the driving gear 15 and the driving pin 14 constitute switching means.

The magnetic field applying means are linked to a magnetic field applying means lifting mechanism (not shown) which carries out a lifting operation wherein the magnetic head section 6 of the magnetic field applying means facing the disk, serving also as the magnetic field generating section and the slider member, is made in a vicinity of or contact with the disk surface, or separated from the disk surface.

Figure 64:
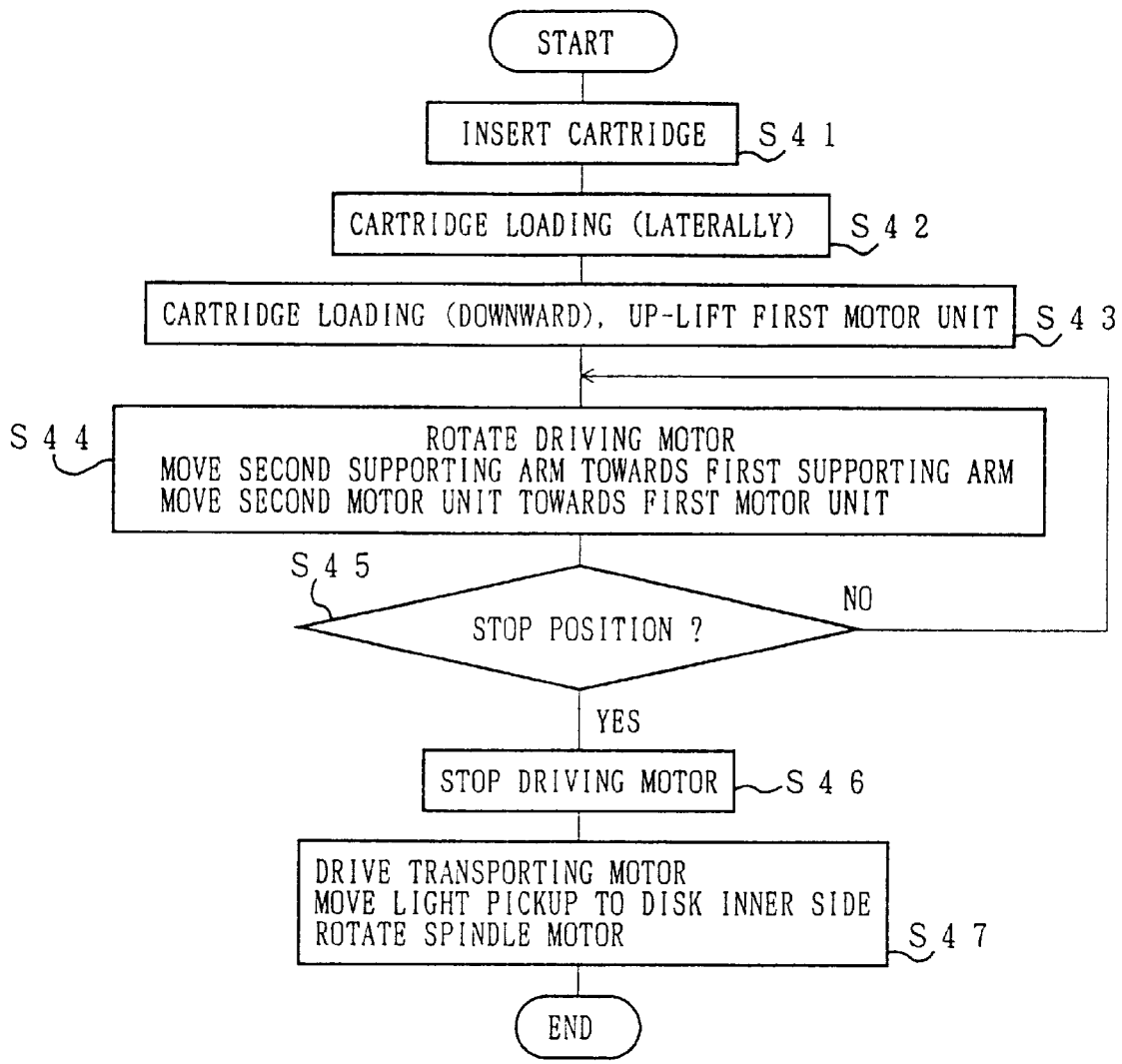
FIG. 64 is a flowchart showing the cartridge loading operation.

The following will describe, referring to the flowchart of FIG. 64, the operations of the constituent components of the optical disk device when the cartridge encasing a disk is inserted into the device.

As shown in FIG. 60(*a*) through FIG. 60(*e*), the second supporting arm 8 fixed to the magnetic head section 6 is positioned on the second magnetic head guiding pins 11. This is the retreat position outside the cartridge insertion region where the magnetic head section 6 is prevented from contacting the cartridge 17 when the cartridge 17 is inserted into the optical disk device. The light pickup 4 is controlled by the light pickup transporting mechanism (not shown) such that the light pickup 4 is positioned on the outermost side of the disk for recording and reproducing information on and from the outermost portion of the disk. In this light pickup position, the first magnetic head guiding pins 13 integrally provided with the light pickup 4 and the second magnetic head guiding pins 11 integrally provided with the main chassis 1 are coaxial to each other with the end portions in vicinities.

The second motor unit 41 is provided side by side with the first motor unit 40.

Figures 61A, 61B:
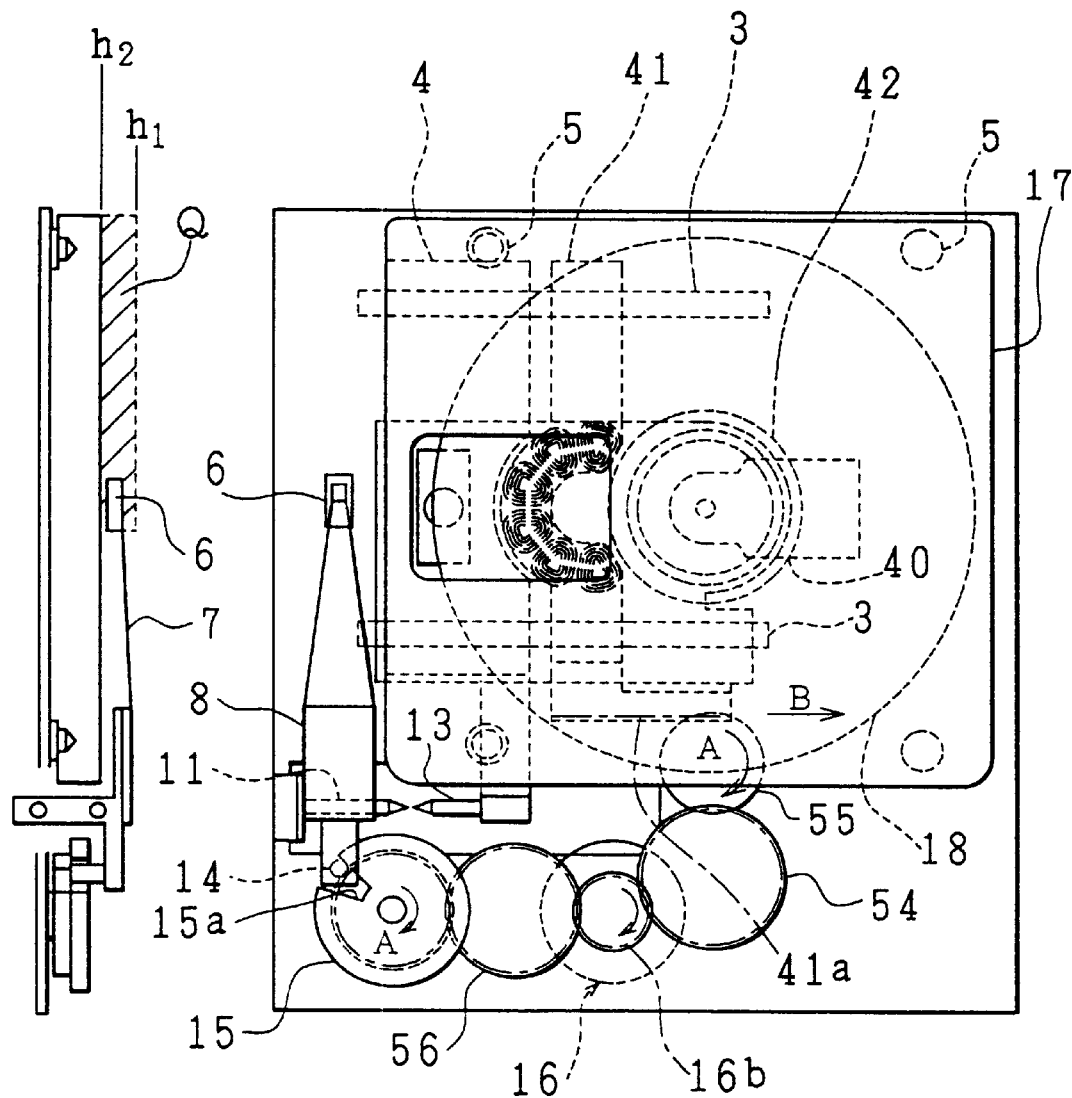
FIG. 61(a) through FIG. 61(c) are drawings showing an arrangement of the optical disk device wherein a cartridge is being inserted.
Figure 61C:
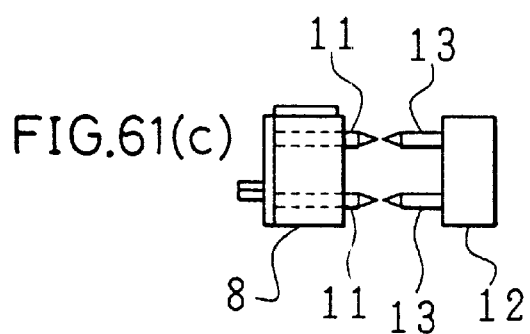

The cartridge 17 is inserted in S41. Here, the magnetic head section 6 is still in the retreat position, and the light pickup 4 is positioned on the outer side of the disk. FIG. 61(*a*) through FIG. 61(*c*) illustrate the loading operation wherein the cartridge 17 is inserted into the optical disk device. The cartridge 17 held in the cartridge holder (not shown) is moved by the loading mechanism (not shown) towards the inside of the optical disk device (downward direction in FIG. 61(*a*) through FIG. 61(*c*)), namely, the cartridge 17 is moved laterally in a direction parallel to the disk surface.

In the case where the thickness of the optical disk device is to be made thinner, since the upper surface of the cartridge 17 is on substantially the same level as the upper surface of the optical disk device, it is impossible to bring the magnetic head section 6 above the cartridge 17. Here, the light pickup 4 is moved to a position above the outermost side of the disk 18, and as shown in FIG. 61(*a*) through FIG. 61(*c*), in the loading operation, the second supporting arm 8 fixed to the magnetic head section 6 is retreated to the retreat position outside the moving region of the cartridge 17. Thus, in the cartridge loading operation, the magnetic head section 6 is prevented from contacting the cartridge 17.

Also, in the retreat position, the magnetic head section 6 is held by the magnetic head lifting mechanism (not shown) such that the upper surface of the magnetic head section 6 is substantially on the same level as the upper surface of the optical disk device, thereby preventing the thickness of the optical disk device from being increased by the projection of the magnetic head section 6.

The loading operation is carried out in S42. After transporting the chucking target section of the disk 18 above the chucking section of the first motor unit 40, the cartridge 17 is lifted downward towards the first motor unit 40. The main chassis 1 having the first motor unit 40 and the light pickup 4 is provided with, as described, the cartridge position determining pin 5, and the cartridge 17 is positioned in a predetermined position by the cartridge position determining pin 5.

In Step 34, the first motor unit 40 is moved upward by the lifting mechanism section (not shown) towards the cartridge 17 in accordance with the insertion of the cartridge 17. The disk 18 is provided with a center hub (not shown) which is made of a magnetic material, and the disk chucking magnet (not shown) is fixed to the turn table 42 in a vicinity of the chucking section of the first motor unit 40. By the magnetic absorption force exerted by the disk chucking magnet on the center hub, the disk 18 is held on the chucking surface of the first motor unit 40.

As a result of the downward movement of the cartridge 17 towards the first motor unit 40, a space Q is created above the cartridge 17 after moving downward, between the upper surface ($h_1$ in FIG. 61(*a*)) of the cartridge 17 when moving laterally and the upper surface ($h_2$ in FIG. 61(*a*)) of the cartridge 17 after downward movement.

In Step 44, the driving motor 16 is rotated so as to move (1) the second supporting arm 8 towards the first supporting arm 12 and (2) the second motor unit 41 towards the first motor unit 40. Namely, when a current is sent to the driving motor 16, the rotation gear 16*b* provided on the rotation section of the driving motor 16 is rotated in the direction of the arrow A in FIG. 61 (*b*), and the driving gear 15 is also rotated in the A direction via the linking gear 56. In response to this, the driving pin 14 interlocked with the cut-out portion 15*a* of the driving gear 15 is moved. In accordance with this movement of the driving pin 14, the second supporting arm 8 is moved along the second magnetic head guiding pins 11 towards the light pickup 4 from the retreat position. The lower surface of the magnetic head section 6 is positioned so as not to contact the upper surface of the cartridge 17 after moving downward. For this reason, the suspension member 7 and the magnetic head section 6 respectively fixed to the second supporting arm 8 are moved in the space Q created by the downward movement of the cartridge 17. As described, since the first magnetic head guiding pins 13 and the second magnetic head guiding pins 11 are coaxial to each other with the end portions in vicinities, the second supporting arm 8 is moved from a position on the second magnetic head guiding pins 11 to a position on the first magnetic head guiding pins 13.

On the other hand, when a current is sent to the driving motor 16, and the rotation gear 16*b* provided on the rotation section of the rotation gear 16 is rotated in the A direction in FIG. 61(*b*), the linking gear 55 is also rotated in the A direction via the linking gear 54 linked to the rotation gear 16*b*. In response to this, the rack 41*a* interlocked with the linking gear 55 in moved in the B direction in FIG. 61(*b*), i.e., in a direction from the second motor unit 41 to the first motor unit 40. In response to this movement of the rack 41, the second motor unit 41 is moved towards the first motor unit 40 via the guiding members 3. Here, as described, since the first motor unit 40 is moved upward towards the cartridge 17 by the lifting mechanism section (not shown) in accordance with the insertion of the cartridge 17, the second motor unit 41 is slidably moved to the space created by the upward movement of the first motor unit 40. In this manner, the divided components, the first motor unit 40 and the second motor unit 41, are integrated as a single unit, thus having the same arrangement as the conventional integrated spindle motor.

Figure 62A:
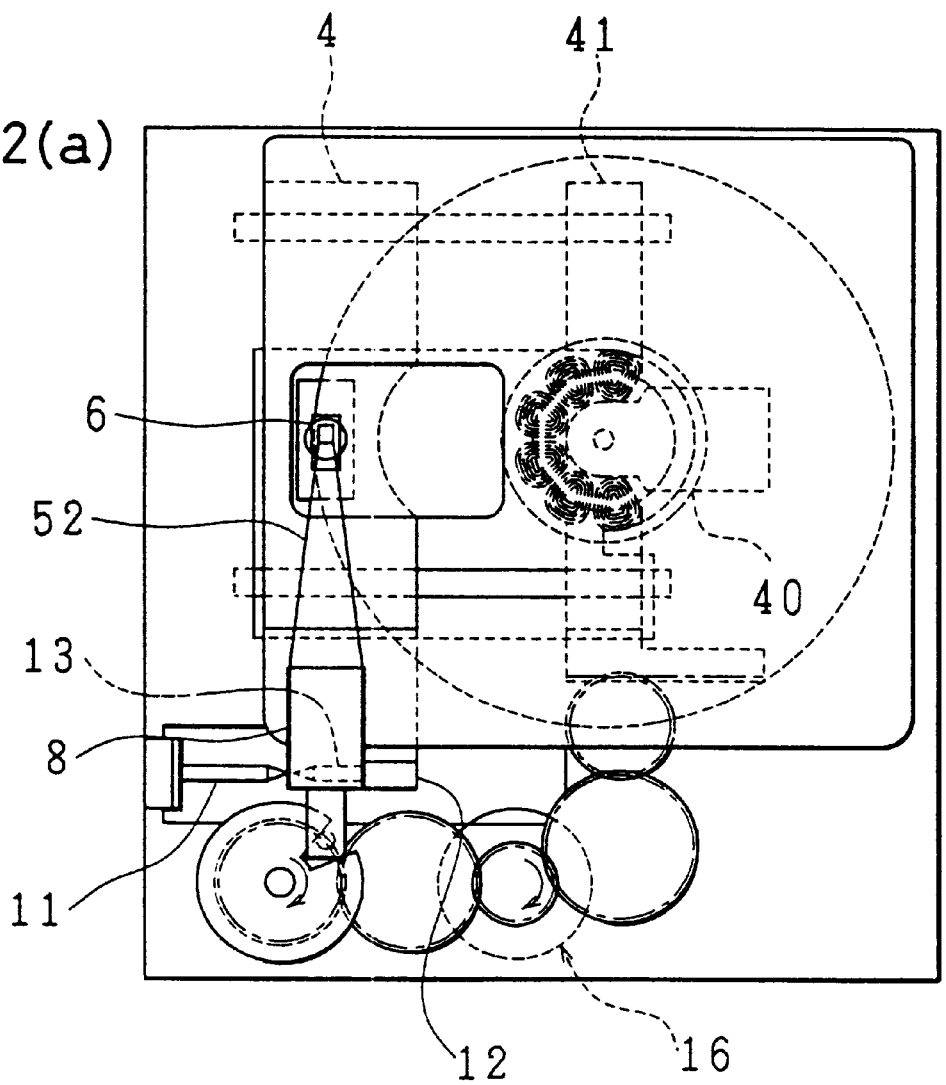
FIG. 62(a) and FIG. 62(b) are drawings showing an arrangement of the optical disk device wherein the magnetic head section and the light pickup are linked to each other, and the spindle motor is integrally provided.
Figure 62B:
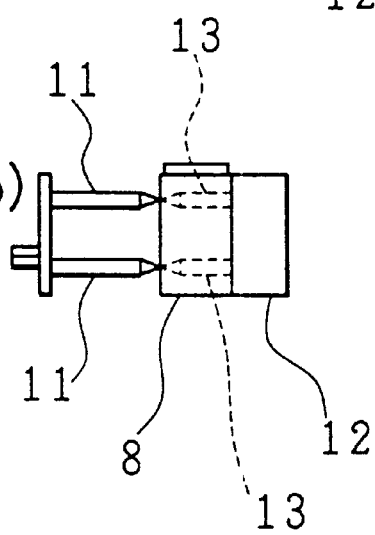

When the second supporting arm 8 comes to a stop position where the magnetic head section 6 and the light pickup 4 are linked to each other (S45), the driving motor 16 is stopped (S46). FIG. 62 (*a*) and FIG. 62 (*b*) show an arrangement wherein the magnetic head section 6 is linked to the light pickup 4, and the first motor unit 40 and the second motor unit 41 are integrally linked to each other. The second supporting arm 8 which has moved to a position on the first magnetic head guiding pins 13 is integrally linked to the first supporting arm 12. The moving direction of the second supporting arm 8 is always restricted by the first magnetic head guiding pins 11. Thus, the positional relationship of the second supporting arm 8 and the first supporting arm 12 when the linkage is made is always maintained constant, and the light spot is accurately positioned on the supplementary magnetic field applied region.

Figure 63A:
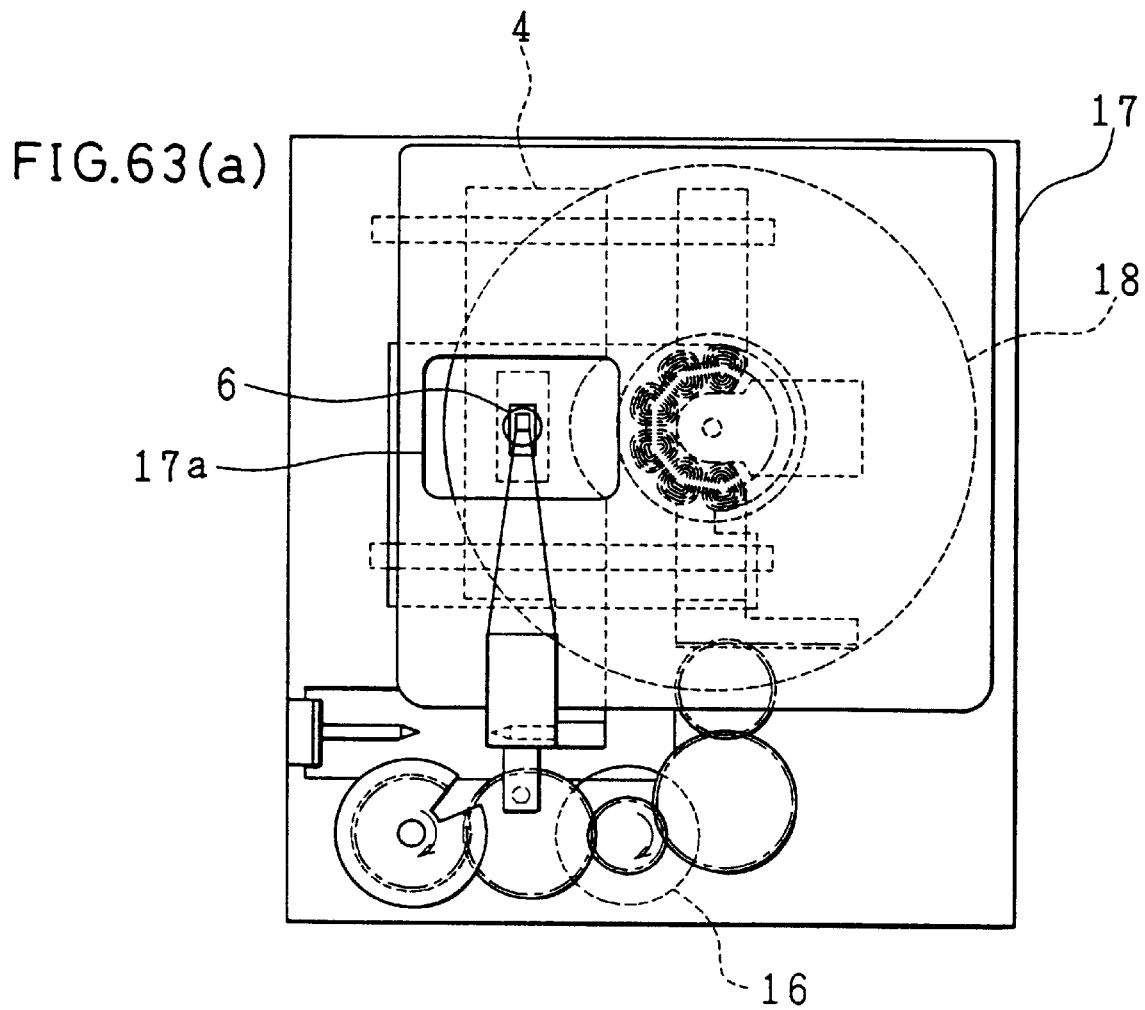
FIG. 63(a) and FIG. 63(b) are drawings showing an arrangement of the optical disk device wherein the magnetic head section and the light pickup are integrally subjected under control.
Figure 63B:
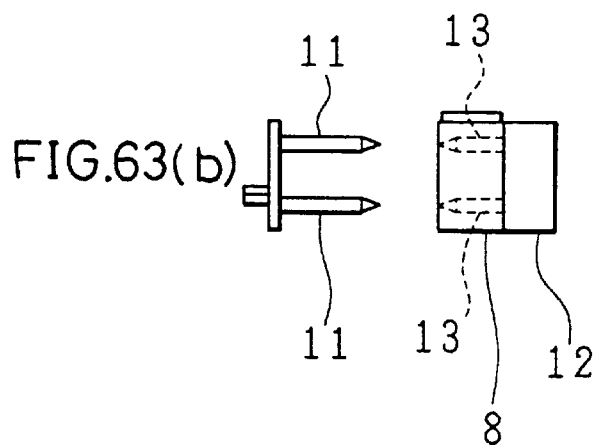

Then, the light pickup 4 is moved towards the inner side of the disk (S47). FIG. 63(*a*) and FIG. 63 (*b*) show an arrangement wherein the magnetic head section 6 is integrally subjected to the tracking control with the light pickup 4. The light pickup 4 integrally fixed to the magnetic head section 6 is moved by the light pickup transporting mechanism (not shown) towards the inner side of the disk for staring of recording and reproducing of information.

On the upper surface of the cartridge 17 encasing the recordable disk 18, a magnetic head insertion window 17*a* is provided. The magnetic head section 6 integrally linked to the light pickup 4 is positioned in the magnetic head insertion window 17*a*, and is made in a vicinity of or contact with the disk by the magnetic head lifting mechanism (not shown).

As described, since the magnetic head section 6 and the light pickup 4 are integrally linked to each other, even when the light pickup 4 under tracking control is moved between the inner side and outer side of the disk, the positional relationship between the supplementary magnetic field applied region and the light spot is not changed at all. Therefore, a positional control for maintaining the positional relationship is not required which is necessary in an arrangement wherein the magnetic head section 6 and the light pickup 4 are provided as completely separate units.

The unloading operation for ejecting the cartridge 17 out of the optical disk device is carried out by revering the described loading operation. The following describes the unloading operation referring to the flowchart of FIG. 65. In Step 51, the magnetic head section 6 is up-lifted to a position where the lower surface of the magnetic head section 6 does not contact the upper surface of the cartridge 17. The light pickup 4 is positioned on the outermost side of the disk by the light pickup transporting mechanism (S52 to S54).

Then, the driving motor 16 is rotated in the reverse direction so as to move the second supporting arm 8 linked to the first supporting arm 12 from a position on the first magnetic head guiding pins 13 to a position on the second magnetic head guiding pins 11, and the magnetic head section 6 is held in the predetermined retreat position on the side of the second magnetic head guiding pins 11. The second motor unit 41 is slidably moved towards the light pickup 4 (to the left in FIG. 63(*a*)) (S55 to S57).

Then, in Step 58, the loading motor is driven so as to up-lift the cartridge 17, and the first motor unit 40 is moved downward by the lifting mechanism section to a space created by the slide movement of the second motor unit 41 towards the light pickup 4. Thereafter, the cartridge 17 is laterally moved (S58), and is ejected out of the optical disk device (S60), thereby finishing the unloading operation.

In the described arrangement, the magnetic head section 6 and the second motor unit 41 are linked to each other by the linking gear with respect to a single driving motor 16. Thus, compared with an arrangement wherein a slide movement driving motor is separately provided for each of the magnetic head section 6 and the second motor unit 41, in the present embodiment, only a single motor is required for driving of the magnetic head section 6 and the second motor unit 41, thus realizing a thinner and smaller optical disk device, and reducing the manufacturing cost.

Further, because the magnetic head section 6 and the second motor unit 41 can be slidably moved simultaneously in accordance with the rotation of the driving motor 16, it is possible to reduce the rising time, from the insertion of the cartridge to the start of recording and reproducing of information by the light pickup 4.

Eighteenth Embodiment

The following will describe Eighteenth Embodiment of the present invention referring to FIG. 66 through FIG. 72. Note that, for convenience, members having the same functions as the members indicated in Figures of the previous embodiment are given the same reference numerals, and the explanations thereof are omitted.

The loading operation in which the cartridge 17 is laterally transported into the optical disk device and the disk 18 is down-lifted so as to be chucked with the spindle motor 2, and the unloading operation in which the cartridge 17 is ejected out of the optical disk device are carried out in the following manner.

FIG. 66 is a drawing showing a mechanism for holding the cartridge 17, viewed from the far side of the cartridge 17 when it is inserted. As shown in FIG. 66, on the both ends (right end and left end) of a plate-shaped cartridge holder 26 for holding the cartridge 17, bending portions 26a are provided, respectively, for holding of the cartridge 17. Each of the bending portions 26a is fixed to a holder pin 27, and the cartridge holder 26 and holder pins 27 form an integral unit.

On the periphery of the cartridge holder 26, a base plate 28 fixed in a U-shape is provided, and on the both ends of the base plate 28, bending portions 28a are provided. On each of the bending portions 28a, as shown in FIG. 67(*a*) and FIG. 67(*b*), a lift guiding slit 28b interlocked with the holder pin 27 in the vertical direction is provided. Also, between the bending portions 28a of the base plate 28 and the bending portions 26a of the cartridge holder 26, a movable plate 29 is provided so as to be interlocked with the holder pins 27.

The described arrangement generally has an arrangement shown in FIG. 67(*a*) and FIG. 67(*b*). FIG. 67(*a*) and FIG. 67(*b*) respectively show the mechanism of FIG. 66 as viewed from the right side, and the cartridge 17 is inserted from the right side. On the movable plate 29, a diagonal guiding slits 29a are provided, respectively, and each guiding slit 29a is interlocked with the holder pin 27.

As shown in FIG. 67(*a*), when inserting the cartridge 17 (not shown), the holder pin 27 is positioned at the upper portion of the guiding slit 29a. As described, since the cartridge holder 26 is integrally provided with the holder pins 27, the cartridge holder 26 (not shown) is also positioned at the upper portion of the optical disk device. Then, the cartridge 17 is inserted in the lateral direction into the cartridge holder 26 manually. When it is confirmed that the cartridge 17 is inserted to a predetermined position, a loading motor (not shown) is rotated, and the movable plate 29 is moved in the direction of the arrow C in FIG. 67(*a*) and FIG. 67(*b*), i.e., in the direction opposite to the loading direction.

Since the holder pins 27 are interlocked with the guiding slits 29a and the lift guiding slits 28b, when the movable plate 29 is moved, as shown in FIG. 67(*b*), the holder pins 27 are down-lifted perpendicularly along the lift guiding slits 28b. Accordingly, the cartridge holder 26 integrally provided with the holder pins 27 as well as the cartridge 17 in the cartridge holder 26 are also down-lifted perpendicularly, thereby finishing the loading operation.

In the arrangement of FIG. 67(*a*) and FIG. 67(*b*), the unloading operation for ejecting the cartridge 17 out of the optical disk device is carried out by rotating the loading motor (not shown) in the reverse direction, and the movable plate 29 of FIG. 67(*b*) is moved in the direction of the arrow D, i.e., in the direction opposite to the unloading direction. In response to this, the holder pins 27 are up-lifted perpendicularly along the lift guiding slits 28b. In order to allow the light pickup 4 to record and reproduce information on the disk 18, the cartridge 17 is provided with a window, and for protection, a shutter is provided, covering the window. By the spring force of the shutter opening-closing mechanism for opening and closing of the shutter, the cartridge 17 in the cartridge holder 26 is ejected out of the optical disk device in the lateral direction. Since the mechanism of this operation is well known, detailed explanations thereof are omitted here.

In the present embodiment, in addition to the described loading and unloading operations, a retreating operation and a retreating releasing operation of the magnetic head section 6 and the slide moving operation of the second motor member 41 are carried out by using the driving force of the loading motor which carries out the loading operation of the cartridge. The following describes how these operations are carried out. Note that, for simplicity, the cartridge holder 26 and the base plate 28 constituting the loading mechanism will be omitted in the explanations. Rather, explanations will be given in accordance with the operation of the movable plate 29.

Figure 69:
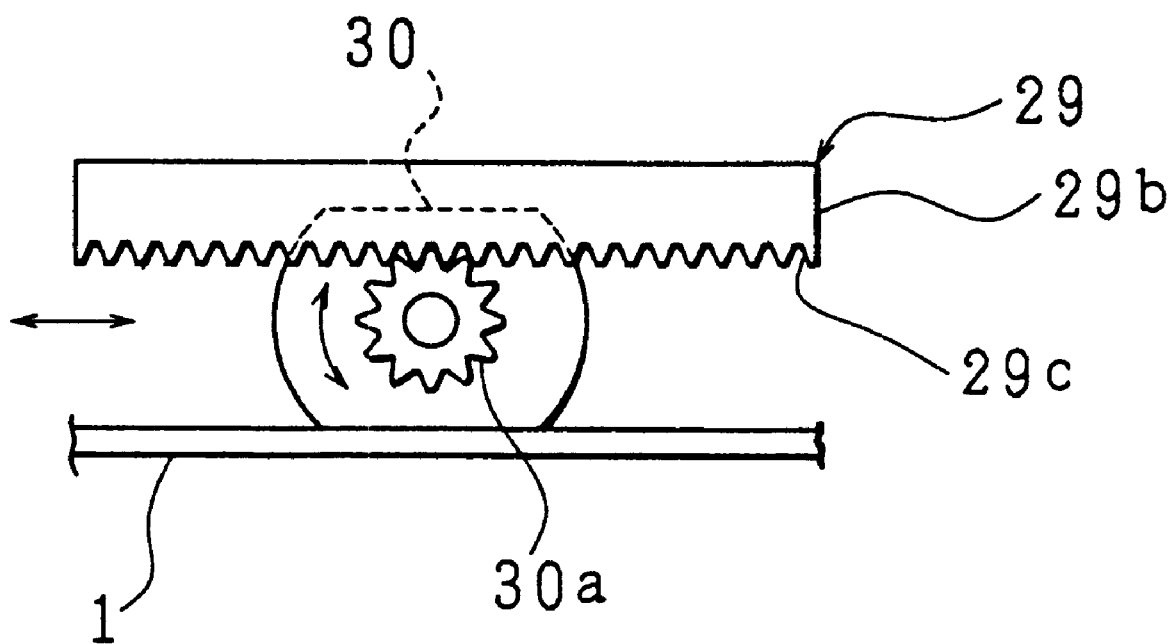
FIG. 69 is a plan view showing how the rack is interlocked with the rotation gear.
Figure 70:
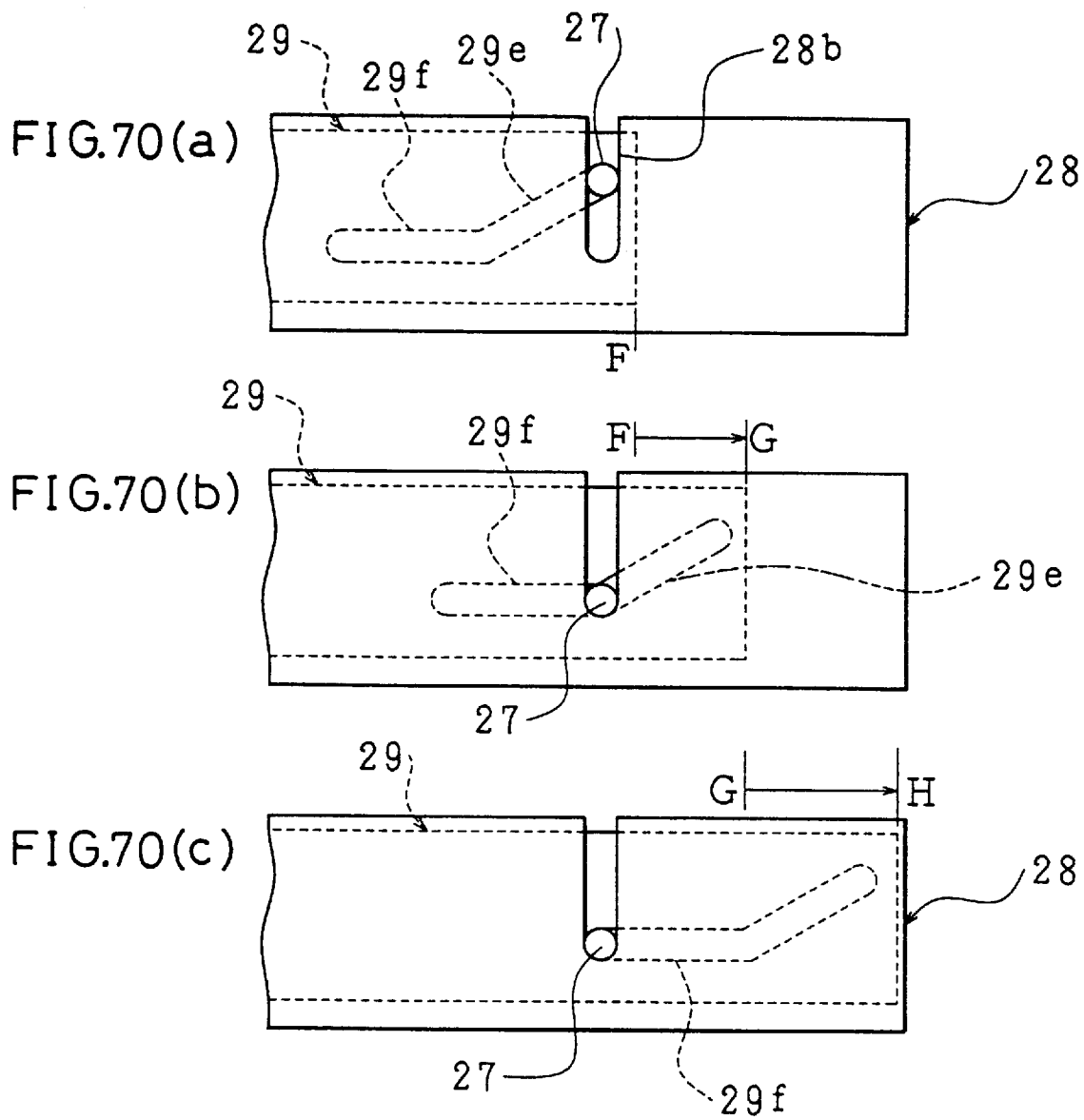
FIG. 70(a) through FIG. 70(c) are plan views illustrating the loading and unloading operations.

FIG. 68(*a*) through FIG. 68(*c*) show one arrangement of the optical disk device while the cartridge 17 is being inserted into the optical disk device. FIG. 68(*c*) is a bottom view of FIG. 68(*b*), and FIG. 69 is a view from the direction of the arrow in FIG. 68(*c*).

As shown in FIG. 68(*b*), a loading motor (loading means) 30 for moving the movable plate 29 is fixed on the main chassis 1, and a rotation section on an end of the loading motor 30 is provided with a rotation gear 30a. Also, as shown in FIG. 68(*c*), the movable plate 29 having a U-shape is provided with a bending portion 29b which is formed by bending a portion of the upper surface of the movable plate 29 inward (downward direction in FIG. 68(*c*) in a U-shape). The bending portion 29b is provided with a rack 29c, and the rack 29c and the rotation gear 30a are interlocked. Thus, by rotating the loading motor 30, the movable plate 29 is moved in the direction of the arrow E in FIG. 68(*b*), i.e., in a direction opposite to the loading direction.

Also, as shown in FIG. 68(*b*), on the upper surface of the movable plate 29, a guiding slit 29d is provided. The guiding slit 29d is composed of (1) a guiding slit 29g which is an opening parallel to the loading direction on the movable plate 29 on the near side of the cartridge 17, i.e., an opening parallel to a direction in which the movable plate 29 is moved and (2) a guiding slit 29h which is an opening diagonally extending from the guiding slit 29h.

Also, on the lower surface of the movable plate 29 (direction into the plane of the paper in FIG. 68(*b*)), a sliding plate 31 is provided. The sliding plate 31 is provided with two guiding slits 31a, at the both ends in a direction perpendicular to the moving direction of the movable plate 29, extending in a direction parallel to the direction perpendicular to the moving direction of the movable plate 29. Here, guide pins 1a fixed to the base plate 28 are interlocked with the guiding slits 31a, and the guide pins 1a are positioned in the end portions of the guiding slits 31a, respectively, in a direction of the arrow +J in FIG. 68(b). Thus, the sliding plate 31 is movable only in a direction of the arrow +J from the position shown in FIG. 68(b).

Also, the sliding plate 31 is provided with a slide guiding pin 31b on the central portion. The slide guiding pin 31b is interlocked with the guiding slit 29d of the movable plate 29, and is positioned at the end portion of the guiding slit 29d in a direction of the arrow E in FIG. 68(b), i.e., in the moving direction of the movable plate 29.

In a vicinity of the end portion of the sliding plate 31 in the direction of the arrow E, a rack 31c is provided. Here, a linking gear 32 and a driving gear 33 are fixed on the main chassis 1 so as to be free to rotate. A cut-out portion 33b of the driving gear 33 is interlocked with the driving pin 14 of the second supporting arm 8 fixed to the magnetic head section 6 so as to move the driving pin 14 by rotation. The loading motor 30, the sliding plate 31, the linking gear 32, the driving gear 33, and the driving pin 14 constitute switching means. The linking gear 32 is a two-step gear composed of a larger diameter linking gear 32a and a smaller diameter linking gear 32b, and the driving gear 33 is provided with a smaller diameter driving gear 33a with steps. The larger diameter linking gear 32a of the linking gear 32 and the smaller diameter driving gear 33a of the driving gear 33 are interlocked, and the rack 31c and the smaller diameter linking gear 32b are interlocked.

A portion of the movable plate 29 is provided with a bending portion 29i in such a manner that the bending portion 29i wraps around the right side of the main chassis 1 towards underneath thereof (in a direction into the plane of paper), and the bending portion 29i is provided with a guiding slit 29j. The guiding slit 29j is composed of (1) a guiding slit 29k which is an opening on the far side of the cartridge 17 of the movable plate 29, parallel to the loading direction (parallel to the moving direction of the movable plate 29) and (2) a guiding slit 29m which is an opening diagonally extending from the guiding slit 29k.

The first motor unit 40, the second motor unit 41, the light pickup 4, and the magnetic head section 6 are positioned in the same manner as those described referring to FIG. 60(a) through FIG. 60(e). An end portion of the second motor unit 41 is provided with the slide guiding pin 41b which is interlocked with the guiding slit 29j.

FIG. 70(a) through FIG. 70(c) respectively show a positional relationship of the movable plate 29, the base plate 28, the holder pin 27, and the cartridge 17 of the present embodiment. FIG. 70(a) through FIG. 70(c) are slightly different from FIG. 67(a) through FIG. 67(c). On the base plate 28, a lift guiding slit 28b is provided in the vertical direction. On the movable plate 29, there is provided a guiding slit having an inclined portion 29e and a level portion 29f extending from the inclined portion 29e. The holder pin 27 fixed to the cartridge holder 26 (not shown) is interlocked with the lift guiding slit 28b and the guiding slit having the inclined portion 29e and the level portion 29f.

As shown in FIG. 70(a), a moment after the insertion of the cartridge 17, the holder pin 27 is positioned at the upper portion of the inclined portion 29e of the guiding slit of the movable plate 29, and accordingly, the cartridge holder 26 is also positioned at the upper portion of the optical disk device. A position on the side of the guiding slit of the movable plate 29, parallel to the lift guiding slit 28b, where the guiding slit is provided is denoted as F. Here, as shown in FIG. 68(a) through FIG. 68(c), the light pickup 4 is positioned above the outermost side of the disk, and the magnetic head section 6 is positioned in the retreat position on the side of the second magnetic head guiding pins 11.

When the cartridge 17 is inserted into the cartridge holder 26, the loading motor 30 of FIG. 68(b) start being rotated, and the movable plate 29 is moved in the direction of the arrow E in FIG. 68(b).

As a result, as shown in FIG. 70(b), the holder pin 27 is lifted downward along the inclined portion 29e of the guiding slit of the movable plate 29 until the holder pin 27 reaches the portion where the inclined portion 29e and the level portion 29f meet. As a result, the cartridge 17 starts being down-lifted. Then, the first motor unit 40 is lifted upward by the lifting mechanism section (not shown) towards the cartridge 17, and the disk 18 is chucked onto the spindle motor 2, thereby completing the loading operation. Here, a position on the side of the movable plate 29 (previously F) is denoted as G.

Figure 71:
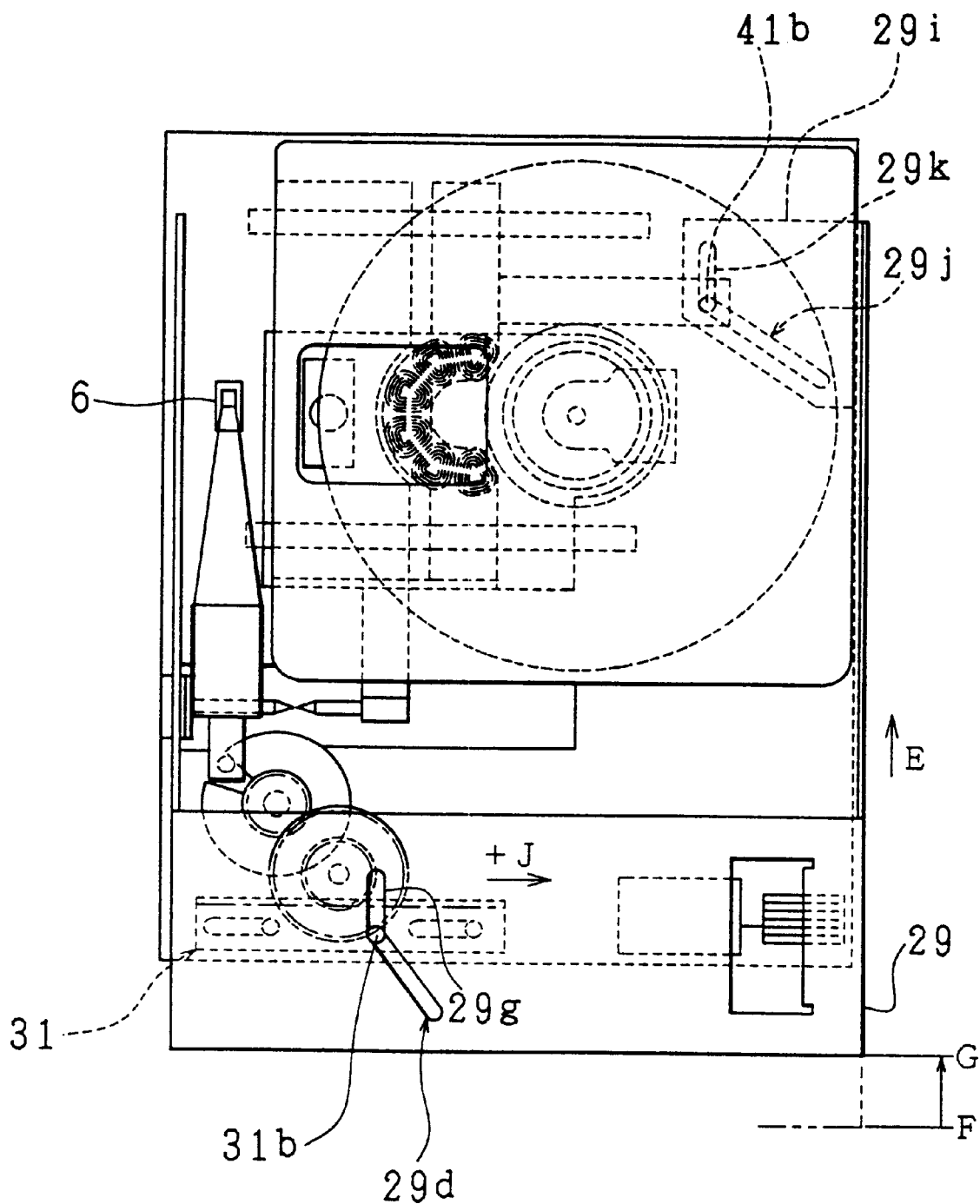
FIG. 71 is a plan view showing an arrangement of the optical disk device wherein a cartridge is being inserted.

As shown in FIG. 71, the slide guiding pin 31b fixed to the sliding plate 31 is interlocked with the sliding slit 29d on the upper surface of the movable plate 29; however, since the slide guiding pin 31b moves along the guiding slit 29g in a direction the same as the moving direction of the movable plate 29, even when the movable plate 29 is moved from F to G, the slide guiding pin 31b does not move in the +J direction, but rather the position thereof is fixed. Thus, the magnetic head section 6 linked to the slide guiding pin 31b via the driving gear 33, etc. is held in the predetermined retreat position.

In the same manner, the slide guiding pin 41b fixed to the end portion of the second motor unit 41 is interlocked with the guiding slit 29j of the bending portion 29i of the movable plate 29; however, since the slide guiding pin 41 moves along the guiding slit 29k provided in the same direction as the moving direction of the movable plate 29, even when the movable plate 29 is moved from F to G, the slide guiding pin 41b is not moved in the +J direction so that the second motor unit 41 is fixed to the same position.

Then, the loading motor 30 is further rotated so as to move the movable plate 29 in the E direction.

Here, as shown in FIG. 70(c), since the holder pin 27 is interlocked with the level portion 29f of the guiding slit of the movable plate 29, the position of the holder pin 27, namely, the position of the cartridge 17 which has been loaded is not changed. The movable plate 29 is moved to the tip portion (right side in FIG. 70(c)) of the base plate 28. Here, a position on the side of the movable plate (previously G) is denoted as H.

Figure 72:
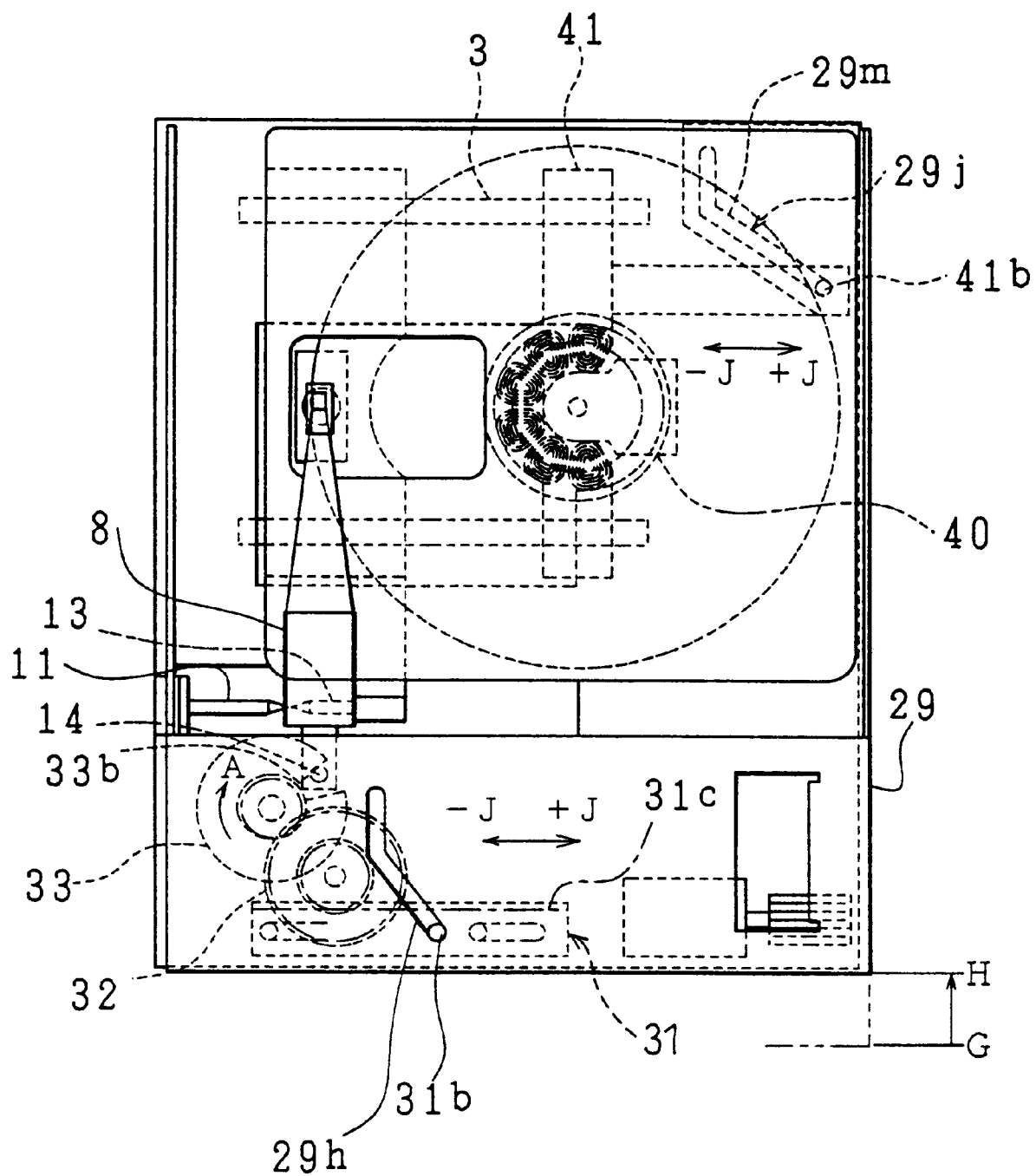
FIG. 72 is a plan view showing an arrangement of the optical disk device wherein the magnetic head section and the light pickup are linked to each other, and the spindle motor is integrally provided.

As shown in FIG. 72, since the slide guiding pin 31b fixed to the sliding plate 31, interlocked with the guiding slit 29d on the movable plate 29 moves along a guiding slit 29h inclined with respect to the moving direction of the movable plate 29, when the movable plate 29 is moved from G to H, the slide guiding pin 31b is moved in the +J direction, and the sliding plate 31 is also moved in the +J direction. Then, the linking gear 32 interlocked with the rack 31c provided on the sliding plate 31 is rotated, and the driving gear 33 starts being rotated in the direction of the arrow A in FIG. 72. In response to this, the driving pin 14 interlocked with the cut-out portion 33b of the driving gear 33 is moved, and in response to this movement of the driving pin 14, the second supporting arm 8 is moved form the retreat position towards the light pickup 4 along the second magnetic head guiding pins 11 and the first magnetic head guiding pins 13, thereby linking the first supporting arm 12 and the second supporting arm 8.

Since the slide guiding pin 41b interlocked with the guiding slit 29j of the bending portion 29i of the movable plate 29 moves along the guiding slit 29m which is inclined with respect to the moving direction of the movable plate 29, when the movable plate 29 is moved from G to H, the slide guiding pin 41b moves in the +J direction. In accordance with this, the second motor unit 41 is slidably moved to a predetermined position below the first motor unit 40.

The unloading operation for ejecting the cartridge 17 out of the optical disk device is carried out by carrying out the described operation in the reversed order. Namely, the magnetic head section 6 is lifted upward by the magnetic head section lifting mechanism (not shown) to a position where the lower surface of the magnetic head section 6 does not contact the upper surface of the cartridge 17, and the light pick up 4 is moved to a position above the outermost side of the disk. When the loading motor 30 is rotated in the reverse direction so as to move the movable plate 29 from H to G, the sliding plate 31 is moved in the –J direction. Then, the second supporting arm 8 linked to the first supporting arm 12 is moved from a position on the first magnetic head guiding pins 13 to a position on the second magnetic head guiding pins 11 via the linking gear 32 and the driving gear 33, and the magnetic head section 6 is held in the predetermined retreat position on the side of the second magnetic head guiding pins 11.

Also, in accordance with the slide movement of the slide guiding pin 41b in the –J direction, the second motor unit 41 integrally provided with the slide guiding pin 41b is also moved in the –J direction, and the first motor unit 40 is moved downward by the lifting mechanism section to a space created by the movement of the second motor unit 41.

Thereafter, the movable plate 29 is moved from G to F (see FIG. 71). In response to this, the holder pin 27 is up-lifted, and accordingly the cartridge 17 is also up-lifted. Then, the cartridge 17 is ejected out of the optical disk device in the lateral direction, thereby completing the unloading operation.

As described, by carrying out the retreating operation and the retreating releasing operation of the magnetic field applying means and the slide movement operation for the second motor unit 41 by the loading motor 30 which carries out the loading and unloading operations for drawing and ejecting the cartridge 17 into and out of the optical disk device, it is not required to additionally provide a magnetic head section retreating motor for the magnetic head section 6 and the slide movement driving motor for the second motor unit 41, thus realizing a thinner and smaller magneto-optical display device with a low manufacturing cost.

Further, since the magnetic head section 6 and the second motor unit 41 can be slidably moved simultaneously in accordance with the rotation of the loading motor, it is possible to reduce the rising time, from the insertion of the cartridge to the start of recording and reproducing of information by the light pickup 4.

Nineteenth Embodiment

Figure 73:
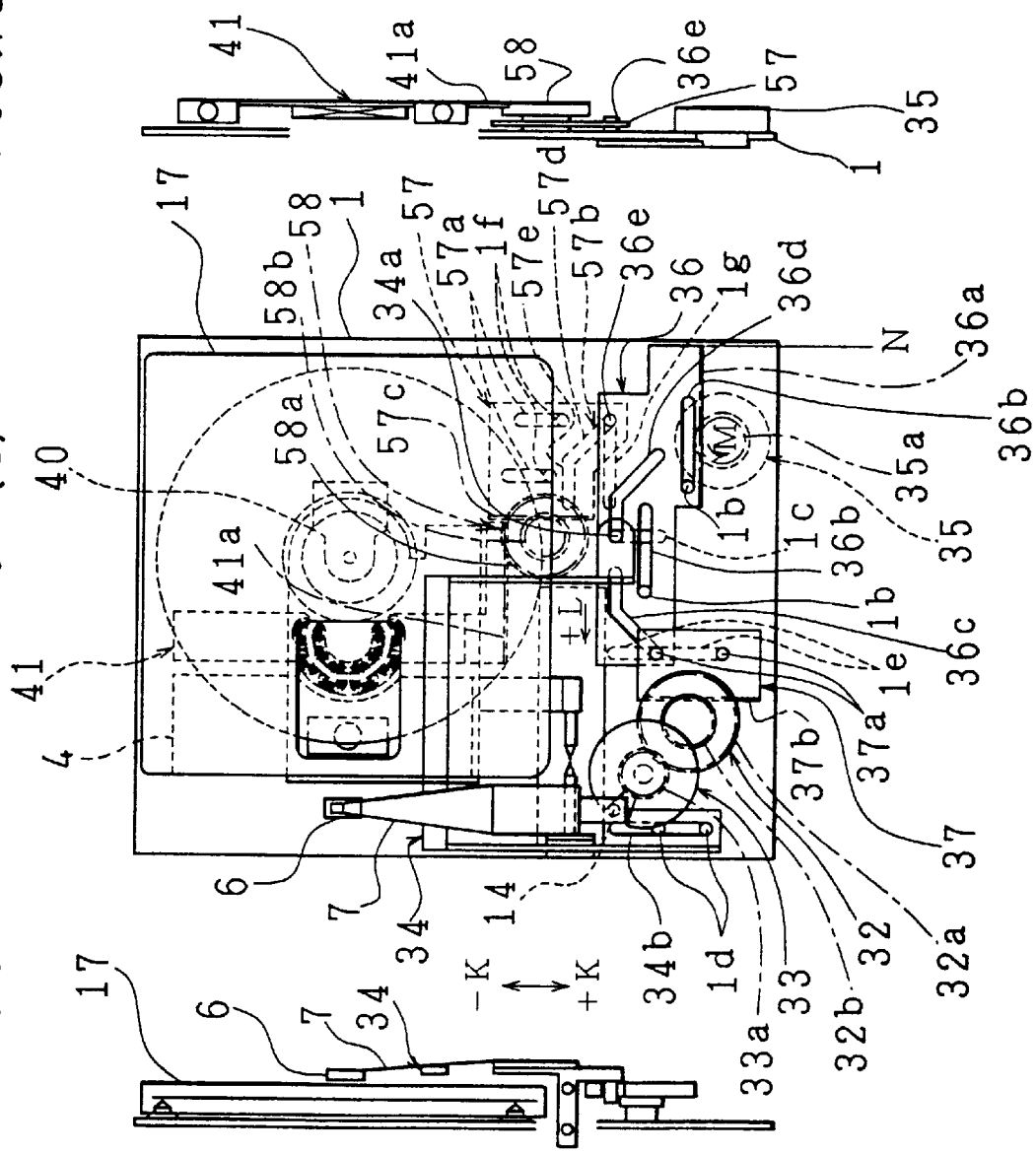
FIG. 73(a) through FIG. 73(c) are drawings showing an arrangement of an optical disk device in accordance with Nineteenth Embodiment of the present invention wherein a cartridge is being inserted.

The following will describe Nineteenth Embodiment of the present invention referring to FIG. 73(*a*) through FIG. 77(*b*). Note that, for convenience, members having the same functions as the members indicated in Figures of the previous embodiment are given the same reference numerals, and the explanations thereof are omitted.

Even when a recordable optical disk is used, it is rare that the recording operation is always carried out, but generally, the reading operation for reading of information is carried out most of the time. During recording of information, the surface of the magnetic head section 6 facing the disk, namely, the magnetic field generating section and a slider member are in vicinities of or made contact with the disk surface. When the recording of information is finished, and in the case where the disk facing surface of the magnetic head section 6 facing the disk are not moved from the vicinity of the disk surface, there is a danger that the magnetic head section 6 and the disk 18 are collided, resulting in the damage, and in the case where the magnetic head section 6 is made contact with the disk 18 for a period of time, a load is put on the spindle motor 2 rotating the disk 18 so that the power consumption of the spindle motor 2 is increased. For this reason, it is a common practice to adopt a system in which the magnetic head section 6 is made in a vicinity of or made contact with the disk surface only during recording of information, and upon finishing of recording, the magnetic head section 6 is retreated above the disk surface. For the driving source of the lifting mechanism for carrying out the lifting operation in which the magnetic head section 6 is lifted in the vertical direction, a lifting motor is generally adopted.

FIG. 73(*a*) through FIG. 73(*c*) show an arrangement wherein, in the cartridge loading operation, a lifting motor (separating-contacting means) (described later) 35 is used for (1) an operation of separating the magnetic field applying means from the light pickup 4 so as to move the magnetic field applying means to the retreat position outside the moving region of the cartridge 17, (2) an operation of linking the magnetic field applying means to the light pickup 4 from the retreat position, and (3) a slide movement operation for the second motor unit 41. Here, the cartridge 17 is placed in a predetermined position in the optical disk device by a loading mechanism (not shown).

Under the suspension member 7 of the magnetic head section 6 placed in the retreat position, a lifting arm (separating-contacting means) 34 is provided. The lifting arm 34 is provided over the moving range of the magnetic head section 6 from the inner side of the disk to the retreat position. Also, the lifting arm 34 contacts the suspension member 7 of the magnetic head section 6 from below, and is slidable along the longitudinal direction of the suspension member 7. When the lifting arm 34 is positioned in a vicinity of the midway portion of the suspension member 7 so that the magnetic head section 6 is not in contact with the cartridge 17, as shown in FIG. 73(*a*) through FIG. 73(*c*), the lifting arm 34 is slidable only in the direction of +K in FIG. 73(*a*) through FIG. 73(*c*), namely, as will be described later, the lifting arm 34 is slidable only in a direction from the magnetic head section 6 towards the "root" of the suspension member 7. The height of the lower surface of the magnetic head section 6 is set so as to avoid contacting the upper surface of the cartridge 17 when the device is in the arrangement of FIG. 73(a) through FIG. 73(c).

On the main chassis 1, the lifting motor 35 is fixed, and also a first sliding plate 36 parallel to the disk surface is provided. The first sliding plate 36 is provided with four guiding slits 36b, 36c, and 36d. The guiding slits 36b are linearly provided in a direction perpendicular to the sliding direction of the lifting arm 34, and two guiding pins 1b fixed to the main chassis 1 are respectively interlocked with the guiding slits 36b. This allows the first sliding plate 36 to be moved in the direction of +L, namely, the first sliding plate 36 is able to move in a predetermined direction parallel to the guiding slits 36b. Note that, an end portion of the first sliding plate 36, on the side opposite to the +L direction when the magnetic head section 6 is in the retreat position and is higher than the upper surface of the cartridge 17 is denoted as N. The guiding slit 36c is composed of a level portion parallel to the guiding slits 36b and an inclined portion which is positioned on the end in the +L direction of the guiding slit 36b. The guiding slit 36d is composed of a level portion parallel to the guiding slits 36b and an inclined portion which is positioned on the end in a direction opposite to the +L direction of the guiding slit 36b.

Figure 74:
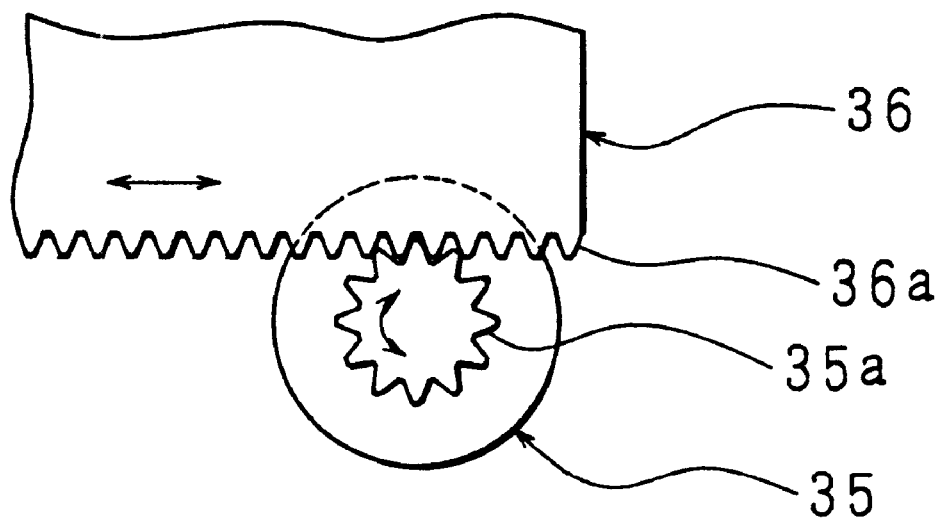
FIG. 74 is a plan view showing how the rack is interlocked with the rotation gear.

As shown in FIG. 74, on the end of the lower side of the first sliding plate 36, a rack 36a is provided, and the rack 36a is interlocked with a rotation gear 35a of the lifting motor 35. FIG. 74 shows an enlarged portion of the lifting motor 35 of FIG. 73(b).

As shown in FIG. 73(a) through FIG. 73(c), on the main chassis 1 under the first sliding plate 36, a guiding slit 1c is provided in the sliding direction (+K and −K directions) of the lifting arm 34. On one end portion (right side in FIG. 73(b)) of the lifting arm 34, a driving pin 34a is fixed, and the driving pin 34 is interlocked with both the guiding slit 36d of the first guiding slit 36 and the guiding slit 1c of the main chassis 1. On the other end portion (left side in FIG. 73(b)) of the lifting arm 34, a guiding slit 34b is provided in the sliding direction of the lifting arm 34, and two guiding pins 1d fixed to the main chassis 1 are interlocked with the guiding slit 34b. Thus, the movement of the lifting arm 34 is restricted only in the +K and −K directions. As shown in FIG. 73(b), one of the two guiding pins 1d, which is on the side of the end in the +K direction, is positioned on an end portion in the +K direction of the guiding slit 34b. For this reason, the lifting arm 34 is movable only in the +K direction in this arrangement.

On the other hand, on the upper side of the first sliding plate 36, a second sliding plate 37 is provided, on the second sliding plate 37, two guiding pins 37a are fixed. The main chassis 1 is provided with two guiding slits 1e in the −K and +K directions, facing the guiding pins 37a. One of the guiding pins 37a (lower pin in FIG. 73 (b)) is interlocked with only one of the guiding slits 1e of the main chassis 1. The other one of the guiding pins 37a (upper pin in FIG. 73(b)) is interlocked with both the guiding slit 36c of the first sliding plate 36 and the other guiding slit 1e of the main chassis 1. As shown in FIG. 73(b), the guiding pins 37a are positioned on the end portions in the +K direction of the guiding slits 1e, respectively. For this reason, the second sliding plate 37 is movable only in the −K direction in this arrangement.

On a side of the end portion (left side in FIG. 73(b)) of the second sliding plate 37, a rack 37b is provided. On the main chassis 1, a linking gear 32 and a driving gear 33 are fixed so as to be free to rotate. The linking gear 32 is a two-step gear composed of a larger diameter linking gear 32a and a smaller diameter linking gear 32b. The driving gear 33 is provided with a smaller diameter driving gear 33a with steps. The smaller diameter driving gear 33a is interlocked with the larger diameter linking gear 32a, and the smaller diameter linking gear 32b is interlocked with the rack 37b of the second sliding plate. The driving gear 33 is interlocked with the driving pin 14 of the second supporting arm 8 fixed to the magnetic head section 6. The lifting motor 35, the first sliding plate 36, the second sliding plate 37, the linking gear 32, the driving gear 33, and the driving pin 14 constitute the switching means.

On the lower surface of the main chassis 1, a third sliding plate 57 is provided. The third guiding plate 57 is provided with three guiding slits 57a and 57b. The guiding slits 57a are linearly provided perpendicular to the slide moving direction of the first sliding plate 36, and are interlocked with the guiding pins 1f fixed to the main chassis 1, respectively. This allows the third guiding plate 57 to be moved in a −K direction, i.e., a predetermined direction perpendicular to the guiding slits 36b. The guiding slit 57b is composed of (1) a level portion 57e parallel to the guiding slits 36b and (2) an inclined portion 57d on the end side of the +K direction.

On the first sliding plate 36, a driving pin 36e is fixed. The driving pin 36e is interlocked with the guiding slit 1g of the main chassis 1 and the guiding slit 57b of the third sliding plate 57.

On the lower surface of the main chassis 1, the linking gear 58 is provided so as to be free to rotate. The linking gear 58 is provided with a two-step gear composed of a larger diameter gear 58a and a smaller diameter gear 58b. The smaller diameter 5Bb is interlocked with the rack 57c of the third sliding plate 57.

The first motor unit 40, the second motor unit 41, the light pickup 4, and the magnetic head section 6 are positioned in the same manner as those described referring to FIG. 60(a) through FIG. 60(e). On an end portion of the second motor unit 41 is provided with the rack 41a which is interlocked with the larger diameter gear 58a of the linking gear 58.

The following describes the lifting and moving operations of the magnetic head section 6 and the slide movement operation for the second motor unit 41.

When the lifting motor 35 is rotated in the direction of the arrow M (counterclockwise), an end portion of the first sliding plate 36 interlocked with the lifting motor 35 is slid in the +L direction.

Figure 75:
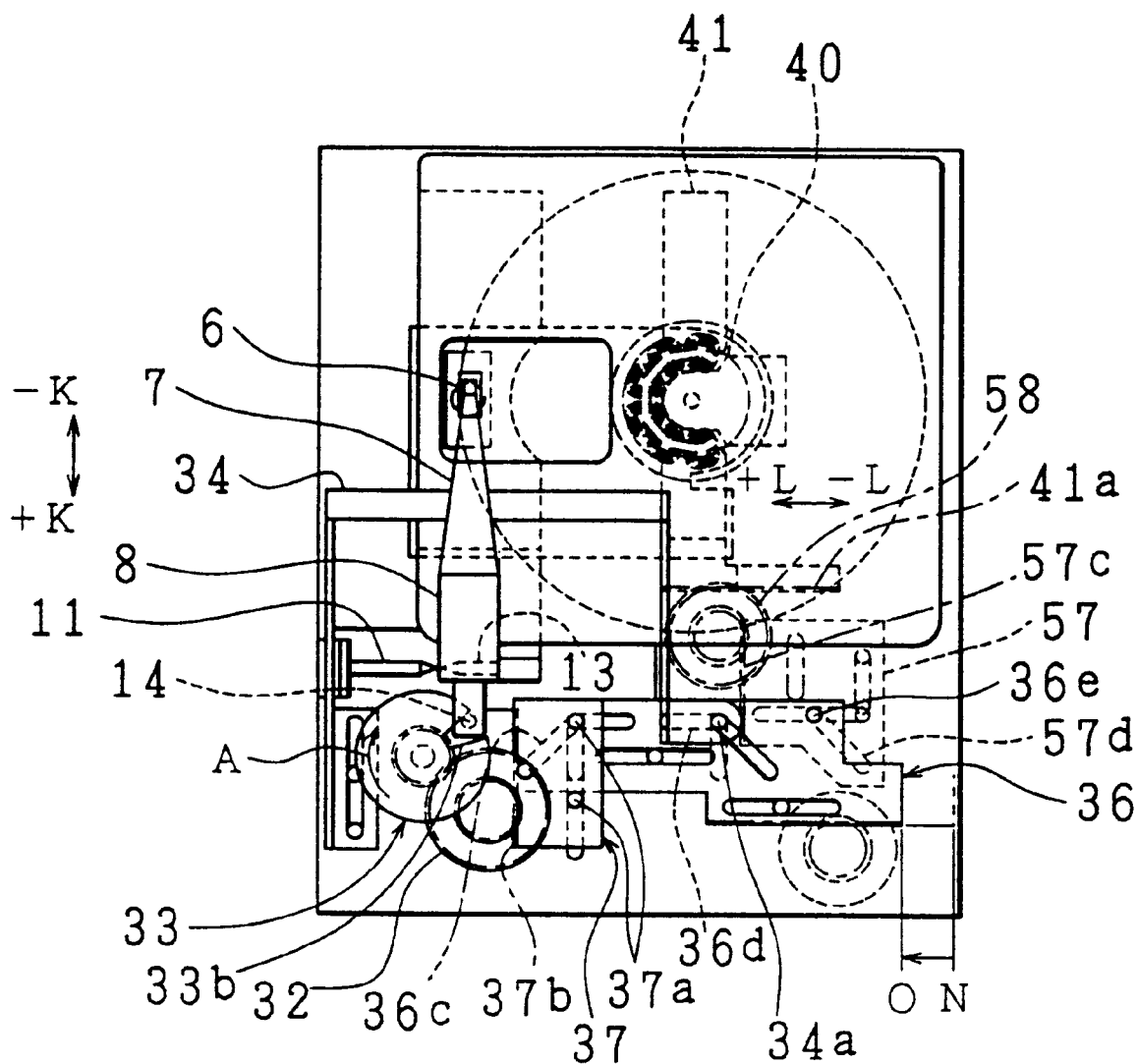
FIG. 75 is a plan view showing an arrangement of the optical disk device wherein the magnetic head section and the light pickup are linked to each other, and the spindle motor is integrally provided.

In response to this, as shown in FIG. 75, the first sliding plate 36 is moved to a position such that the driving pin 34a fixed to the lifting arm 34 reaches the bending portion of the guiding slit 36d of the first sliding plate 36. Here, since the guiding slit 36d of the first sliding plate 36 interlocked with the driving pin 34a fixed to the lifting arm 34 is in the same direction as the sliding direction, the driving pin 34a of the lifting arm 34 is not moved in the +K direction, and so the position thereof is not changed. Thus, the magnetic head section 6 as lifted with the suspension member 7 by the lifting arm 34 is held in the same position. Note that, a side of the first sliding plate 36 opposite to the +L direction when the retreating of the magnetic head section 6 is released and when the magnetic head section 6 is higher than the upper surface of the cartridge 17 is denoted as O.

In the transition between the arrangement of FIG. 73(a) through FIG. 73(c) and the arrangement of FIG. 75, the guiding pin 37a fixed to the second sliding plate 37, interlocked with the guiding slit 36c of the first sliding plate 36 is moved in the −K direction along the inclined portion because the guiding pin 37a is interlocked with the inclined portion of the guiding slit 36c. In response to this, the second guiding slit 37 is moved in the −K direction, and the linking gear 32 interlocked with the rack 37b provided on the end portion of the second sliding plate 37 is rotated which in turn causes the driving gear 33 to rotate in the A direction. Then, the driving pin 14 interlocked with the cut-out portion 33b of the driving gear 33 is moved in accordance with the rotation of the driving gear 33, and in response to this movement of the guiding pin 14, the second supporting arm 8 is moved towards the light pickup along the first and second magnetic head guiding pins 13 and 11, thus linking the first supporting arm 12 and the second supporting arm 8. Here, because the magnetic head section 6 is lifted by the lifting arm 34 to a position which does not allow contact with the upper surface of the cartridge 17, the magnetic head section 6 is prevented from contacting the cartridge 17 when moved from the retreat position.

In accordance with the movement in the +L direction of the driving pin 36e of the first sliding plate 36 interlocked with the inclined portion 57d of the guiding slit 57b provided on the third sliding plate 57, the inclined portion 57d is pushed by the driving pin 36e so as to be moved in the +K direction, and the third sliding plate 57 is moved in the +K direction along the inclined portion 57d. In accordance with the movement of the third sliding plate 57, the linking gear 58 interlocked with the rack 57c is rotated clockwise in FIG. 73(b), and the rack 41a of the second motor unit 41 interlocked with the linking gear 58 is moved in the −L direction.

In accordance with the movement of the rack 41a, the second motor unit 41 is slidably moved towards the first motor unit 40 (to the right in FIG. 73(b)) along a guiding member (not shown). Note that, here, the first motor unit 40, in accordance with the insertion of the cartridge 17, has already moved upward towards the cartridge 17 by the lifting mechanism section (not shown), and the second motor unit 40 is slidably moved to a space created by the upward movement of the first motor unit 40. In this manner, the divided components, the first motor unit 40 and the second motor unit 41, are integrated as a single unit, thus having the same arrangement as the conventional integrated spindle motor.

Figure 76:
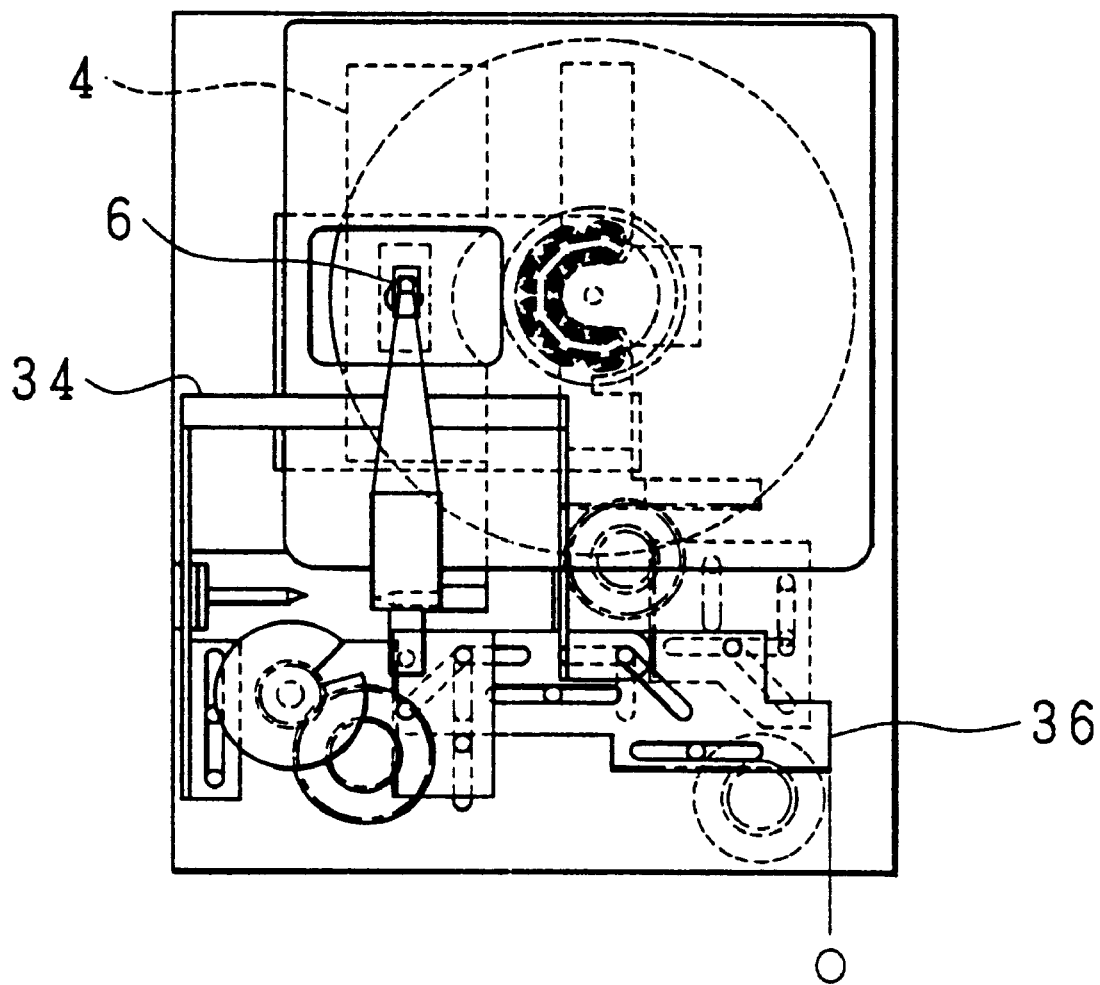
FIG. 76 is a plan view showing an arrangement of the optical disk device wherein the magnetic head section is lifted upward.

FIG. 76 shows an arrangement wherein the magnetic head section 6 is integrally linked to the light pickup 4, and is positioned on the inner side of the disk. Here, the first sliding plate 36 is positioned at O as in FIG. 75, and the magnetic head section 6 is up-lifted by the lifting arm 34. When reproducing of information by the light pickup 4 is carried out in this arrangement, it is possible to reduce (1) the danger of the magnetic head section 6 colliding the disk 18 and (2) the load on the spindle motor 2 induced by a prolonged contact.

When recording and erasing information, it is required to down-lift the magnetic head section 6 towards the disk.

Figure 77A:
FIG. 77(a) and FIG. 77(b) are drawings showing an arrangement of the optical disk device wherein the magnetic head section is lifted-down towards a medium.
Figure 77B:
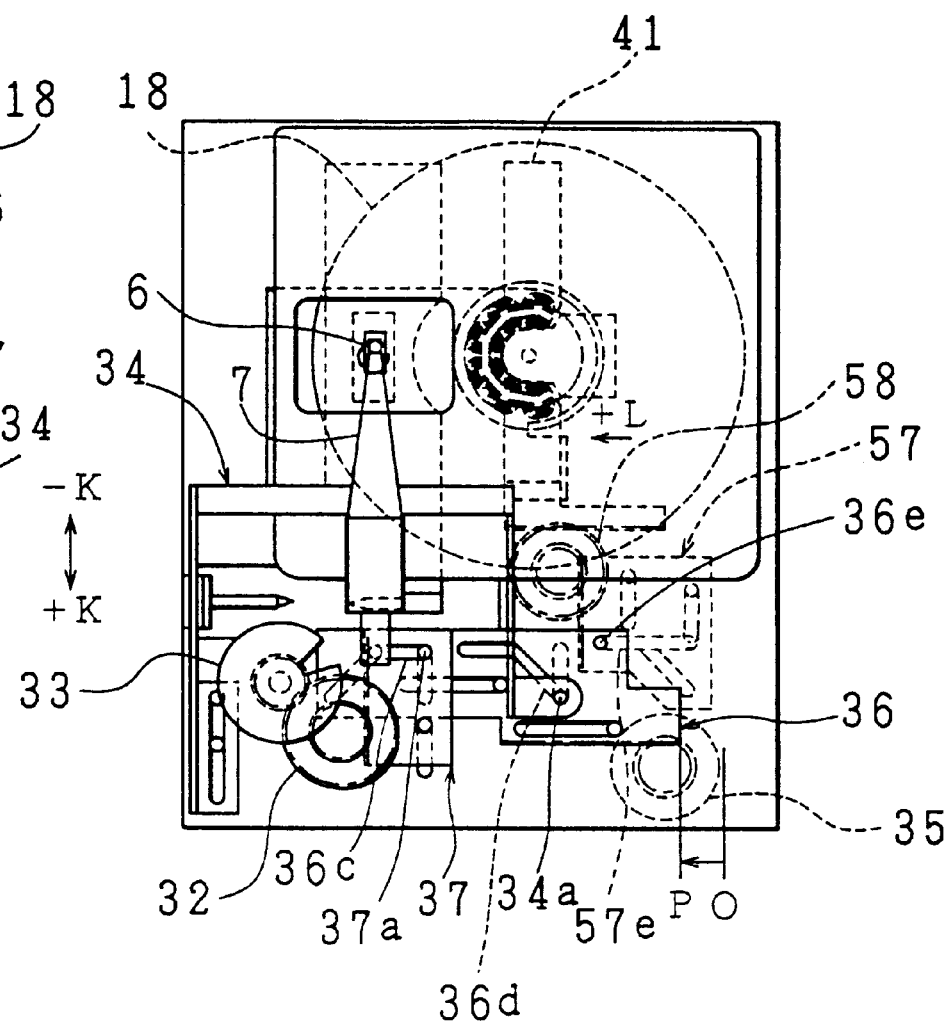
Figure 78:
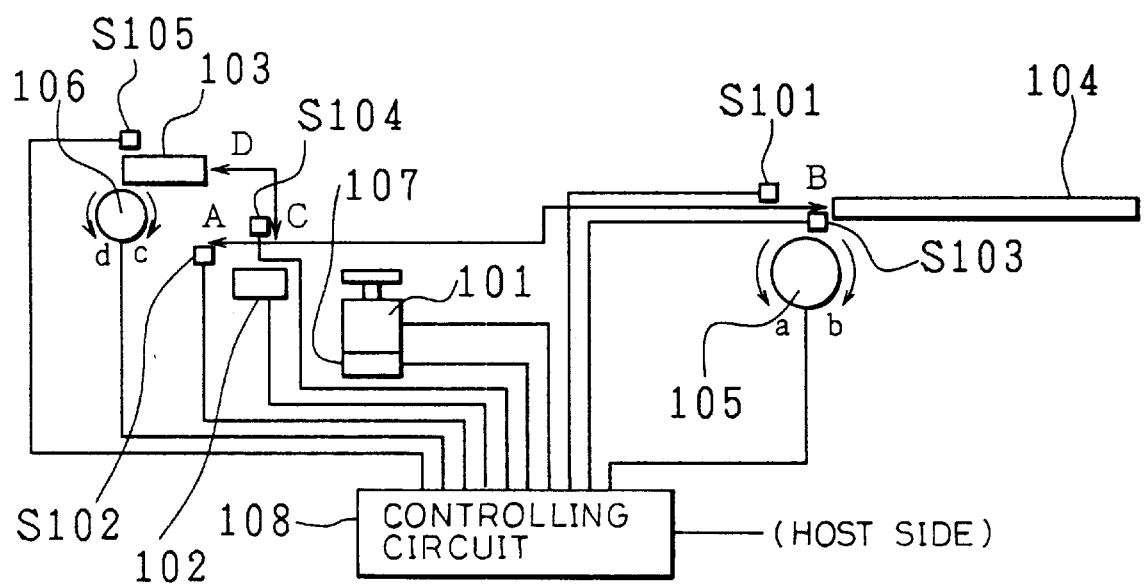
FIG. 78 is a block diagram showing a main component of a conventional optical disk device.

As shown in FIG. 77(a) and FIG. 77(b), when the lifting motor 35 is rotated so as to move further the first sliding plate 36, the driving pin 34a fixed to the lifting arm 34 is moved in the +K direction along the inclined portion of the guiding slit 36d of the first sliding plate 36. As a result, in response to the slide movement of the lifting arm 34 in the +K direction, the up-lifting of the suspension member 7 of the magnetic head section 6 is released, and the magnetic head section 6 of the suspension member 7 is sprung down towards the surface of the disk 18 by the spring force. Note that, a side of the first sliding plate 36 opposite to the +L direction when the retreating of the magnetic head section 6 is released and when the magnetic head section 6 is moved downward towards the surface of the disk 18 is denoted as P.

Because the guiding pin 37a fixed to the second sliding plate 37 is interlocked with a latter portion of the guiding slit 36c provided in the same direction as the moving direction of the first sliding plate 36, the guiding pin 37a is not moved in the +K direction, but is rather fixed in the same position. Thus, the linking gear 32 and the driving gear 33 are not rotated.

In the same manner, the driving pin 36e provided on the first sliding plate 36 is further moved in the +L direction; however, since the level portion 57e of the guiding slit 57b of the third sliding plate 57 interlocked with the driving pin 36e is provided in the same direction as the moving direction of the driving pin 36e, the third sliding plate 57 is not moved in the +K direction, but is fixed to the same position. Accordingly, the linking gear 58 is not rotated, and the slide movement of the second motor unit 41 does not take place.

The unloading operation for ejecting the cartridge 17 out of the optical disk device is carried out by carrying out the described operation in the reversed order. Namely, the lifting motor 35 is rotated in the reverse direction and the end portion of the first sliding plate 36 is moved from P to O so as to up-lift the magnetic head section 6 to a position where the lower surface of the magnetic head section 6 does not contact the upper portion of the cartridge 17. The light pickup 4 is moved to a position above the outermost side of the disk by the light pickup transporting mechanism. Then, the lifting motor 35 is further rotated in the reverse direction, and the end portion of the first sliding plate 36 is moved from O to N. This makes the second sliding plate 37 to slide in the +K direction, and the second supporting arm 8 linked to the first supporting arm 12 to move from a position on the first magnetic head guiding pins 13 to a position on the second magnetic head guiding pins 11 via the linking gear 32 and the driving gear 33, thus holding the magnetic head section 6 in the predetermined retreat position on the side of the second magnetic head guiding pins 11.

Also, the lifting motor 35 is rotated in the reverse direction, and the end portion of the first sliding plate 36 is moved from P to O. This slidably moves the third sliding plate 57 in the −K direction, and the second motor unit 41 is slidably moved towards the light pickup 4 (to the left in FIG. 73(b)) via the linking gear 58. The first motor unit 40 is then moved downward by the lifting mechanism section to a space created by the slide movement of the second motor unit 41, and the cartridge 17 is up-lifted by the loading mechanism, and is moved laterally so as to be ejected out of the optical disk device.

As described, by carrying out the retreating operation and the retreating releasing operation of the magnetic field applying means and the slide movement operation for the second motor unit 41 by the lifting motor 35 which is a driving source of the lifting mechanism of the magnetic field applying means, it is not required to additionally provide a magnetic head section retreating motor for the magnetic head section 6 and the slide movement driving motor for the second motor unit 41, thus realizing a thinner and smaller magneto-optical display device with a low manufacturing cost.

Further, since the magnetic head section 6 and the second motor unit 41 can be slidably moved simultaneously in accordance with the rotation of the lifting motor 35, it is possible to reduce the rising time, from the insertion of the cartridge to the start of recording and reproducing of information by the light pickup 4.

As described, a first optical disk device of the present invention is characterized by including a first unit composed of a turn table for mounting an optical disk and a rotor magnet fixed to the turn table, a second unit having a first stator coil, provided side by side with the first unit in a lateral direction, a first moving mechanism for moving the first unit upward when loading the optical disk so as to mount the optical disk on the turn table, and a second moving mechanism for moving the second unit in the lateral direction so that the second unit is adjacent to the first unit thereunder which has been moved upward, the second unit moved to a predetermined position for allowing the rotor magnet and the turn table to be rotatably driven in accordance with the magnetic field from the first stator coil.

With this arrangement, when loading the optical disk, the first unit is moved upward, and the second unit is moved laterally so as to be adjacent to the first unit thereunder. Then, the rotor magnet and the turn table are rotatably driven in accordance with the magnetic field from the first stator coil. As a result, the divided components of the spindle motor, the first unit and the second unit, are integrated as a single unit, allowing the same arrangement as the conventional integrated spindle motor, thereby realizing a thinner optical disk device A second optical disk device of the present invention, having the arrangement of the first optical disk device, is characterized in that there is provided a bearing support below the rotor magnet, for supporting the rotation shaft bearing of the turn table, and that at least a portion facing the first stator coil of the bearing support is made of a non-magnetic material.

With this arrangement, at least a portion of the bearing support facing the first stator coil is made of a non-magnetic material so that a magnetic flux transmits through the bearing support. As a result, a stable magnetic circuit is formed by the rotor magnet and the first stator coil, thereby, in addition to the effect of the first optical disk device, reducing the adverse effect on the magnetic circuit characteristic, due to the presence of the bearing support in the magnetic gap.

A third optical disk device of the present invention, having the arrangement of the first optical disk device, is characterized in that the second unit includes a cut-out portion for preventing, when moved in the lateral direction, interference with the bearing support, provided under the rotor magnet, for supporting the bearing of the turn table.

With this arrangement, since the second unit is provided with the cut-out portion, interference with the bearing support is prevented when moved in the lateral direction. Thus, it is not required that the upper surface of the first stator coil be lower than the lower surface of the bearing support of the first motor unit, and therefore it is possible to provide a large margin for the first stator coil by the amount of the thickness of the bearing support, thereby allowing with ease, in addition to the effect of the first optical disk device, the thickness of the device to be reduced and a sufficient number of winding wires around the first stator coil.

A fourth optical disk device of the present invention, having the arrangement of the third optical disk device, is characterized in that the bearing support is provided with the second stator coil on a portion facing the rotor magnet.

With this arrangement, the second stator coil is provided on a portion of the bearing support, facing the rotor magnet. As a result, the stator coil is provided over the entire region for generation of the motor rotation driving force, thereby, in addition to the effect of the third optical disk device, increasing the motor rotation driving force.

A fifth optical disk device of the present invention, having the arrangement of the fourth optical disk device, is characterized in that the second unit and the bearing support respectively include connection portions electrically connected to the first stator coil and the second stator coil, respectively, the both connection portions contacting each other when the second unit is moved to the predetermined position in the lateral direction.

With this arrangement, the connection portions are energized when the second unit is moved laterally to the predetermined position, and accordingly the first stator coil and the second stator coil are energized. Therefore, it is not required to provide lead wires for energizing the first stator coil and the second stator coil, thereby preventing, in addition to the effect of the fourth optical disk device, the danger of wire breakage caused by repeated movement of lead wires, permitting a safe operation of the device.

A sixth optical disk device of the present invention, having the arrangements of the first through fifth optical disk devices, is characterized in that the bearing support for supporting the bearing of the turn table is provided, on a portion facing the rotor magnet, with a hall element for detecting a position of the rotor magnet.

With this arrangement, the hall element for detecting a position of the rotor magnet is provided on a portion of the bearing support, facing the rotor magnet. Thus, contrary to the case where the hall element is provided on the central portion of each coil of the first stator coil, even when the first stator coil is made small, the position of the hall element is assured, thereby, in addition to the effects of the first through fifth optical disk devices, allowing the position of the rotor magnet to be suitably detected.

A seventh optical disk device of the present invention, having the arrangement of the third optical disk device, is characterized in that the bearing support or the second unit is provided with a moment cancelling section for cancelling a rotation moment with respect to the rotation shaft, induced by a magnetic absorption force generated between the second unit and the rotor magnet.

With this arrangement, since the moment cancelling section is provided, even when a rotation moment is generated with respect to the rotation shaft by the presence of the cut-out portion on the second unit, such a rotation moment can be suppressed, thereby, in addition to the effect of the third optical disk device, preventing the operation characteristic of the spindle motor from being lowered.

An eighth optical disk device of the present invention, having the arrangement of the seventh optical disk device, is characterized in that the moment cancelling section is a magnetic portion made of a magnetic material, provided at least partially on the bearing support.

With this arrangement, since the moment cancelling section is a magnetic portion made of a magnetic material, provided at least partially on the bearing support, it is possible, for example, to form the bearing support with a non-magnetic material excluding the magnetic portion so as to allow the magnetic flux to transmit through the non-magnetic portion. Thus, it is possible to obtain the moment cancelling effect as well as the effect of the stable magnetic circuit formed by the rotor magnet and the first stator coil, thereby, in addition to the effect of the seventh optical disk device, reducing the adverse effect on the magnetic circuit characteristic caused by the presence of the bearing support in the magnetic gap, and preventing the operation characteristic of the spindle motor from being lowered.

A ninth optical disk device of the present invention, having the arrangement of the seventh optical disk device, is characterized in that at least a portion of the bearing support, facing the rotor magnet, is made of a non-magnetic material, and the moment cancelling section is a support for the first stator coil, extending to the cut-out portion.

With this arrangement, since the moment cancelling section is a support for the stator coil, extending to the cut-out portion, and the bearing support is made of a non-magnetic material, the magnetic flux is allowed to transmit through the bearing support. Thus, it is possible to obtain the moment cancelling effect as well as the effect of the stable magnetic circuit formed by the rotor magnet and the first stator coil, thereby, in addition to the effect of the seventh optical disk device, reducing the adverse effect on the magnetic circuit characteristic caused by the presence of the bearing support in the magnetic gap, and preventing the operation characteristic of the spindle motor from being lowered.

A tenth optical disk device of the present invention is characterized by including a light pickup for projecting a light beam onto a disk encased in the cartridge placed in a recording/reproducing position through movement within a moving region of the device so as to detect reflected light off the disk, magnetic field applying means for applying a magnetic field to the disk when recording and erasing information, loading means for carrying out (1) a loading operation for placing the cartridge on the recording/reproducing position and (2) an unloading operation for ejecting the cartridge out of the optical disk device from the recording and reproducing position, and switching means for moving, during loading and unloading operations, the magnetic field applying means to a predetermined retreat position outside a moving region of the cartridge in the optical disk device, wherein the magnetic field applying means are separatable from and linkable to the light pickup, the switching means (i) separating, during loading and unloading operations of the cartridge, the magnetic field applying means from the light pickup so as to move the magnetic field applying means to the predetermined retreat position and (ii) linking, during a recording operation on the disk in the cartridge, the magnetic field applying means to the light pickup.

With this arrangement, during loading and unloading operations of the cartridge, the switching means move the magnetic field applying means to the retreat position outside the moving region of the cartridge. The direction of the retreat is not in the thickness of the cartridge, but is in a direction parallel to the disk surface. Therefore, it is not required to move the magnetic field applying means above the space required for the movement of the cartilage during loading and unloading operations. In other words, it is not required to move the magnetic field applying means in the thickness direction of the cartridge. Thus, even when the magnetic field applying means are moved for retreating, the moving range is within the thickness which is required regardless of whether the magnetic field applying means are moved or moved, thereby realizing a thinner optical disk device.

Also, as described, during loading and unloading operations of the cartridge, while the magnetic field applying means are moved separately from the light pickup to the retreat position outside the moving region of the cartridge, the light pickup is not moved. Thus, when the loading of the cartridge is finished, the light pickup is not moved to the disk side from the retreat position. This prevents the light pickup from colliding the cartridge so that it is possible to adopt an arrangement wherein the light pickup is placed in the window provided on the cartridge when driving the disk, thereby realizing a thinner optical disk device.

Also, during recording of information on the disk encased in the cartridge, the switching means link the magnetic field applying means to the light pickup, and the magnetic field applying means linked to the light pickup are moved on the disk in accordance with the light pickup. Thus, the positioning control of the magnetic head section on the light pickup is not interfered.

An eleventh optical disk device of the present invention, having the arrangement of the tenth embodiment, is characterized in that the switching means link the magnetic field applying means to the light pickup by a magnetic absorption force of a magnet.

With this arrangement, since the magnetic field applying means are linked to the light pickup by the magnetic absorption force of the magnet, it is possible to securely link the magnetic field applying means to the light pickup with a significantly simple structure, thereby, in addition to the effect of the tenth optical disk device, simplifying the structure of the optical disk device.

A twelfth optical disk device of the present invention, having the arrangement of the tenth optical disk device, is characterized by including detecting means for detecting whether a disk which has been loaded is a read-only disk or a recordable disk, wherein the switching means (I) hold, in a case where the detecting means detects that the disk is a read-only disk, the magnetic field applying means in the retreat position and (II) link, in a case where the detecting means detects that the disk is a recordable disk, the magnetic field applying means to the light pickup.

With this arrangement, the detecting means detects whether the disk which has been loaded is a read-only disk or a recordable disk, and when a read-only disk is detected, the switching means continue to hold the magnetic field applying means to the retreat position. As a result, only the light pickup is moved in the radial direction of the disk, and reproducing operation is carried out. On the other hand, when a recordable disk is detected, the switching means link the magnetic field applying means to the light pickup. As a result, the light pickup and the magnetic field applying means are integrally moved in the radial direction of the disk, and recording operation is carried out.

Thus, in the case of the read-only disk, since the light pickup, which is a member to be subjected to tracking control, is moved while not being linked to the magnetic field applying means, the weight of a member to be subjected to tracking control can be significantly reduced, thereby, in addition to the effect of the tenth optical disk device, greatly reducing the power consumption of the transporting motor carrying out the tracking control of the light pickup.

A thirteenth optical disk device of the present invention, having the arrangement of the tenth embodiment, is characterized in that the operation by the switching means for separating the magnetic field applying means from the light pickup for moving the magnetic field applying means to the retreat position is carried out by the loading means.

With this arrangement, the magnetic field applying means are separated from the light pickup by the loading means such as the loading motor so as to be moved to the retreat position. Also, the magnetic field applying means are moved from the retreat position by the loading means so as to be linked to the light pickup.

Thus, the retreating and retreating releasing operations can be carried out without additionally providing a specialized driving means such as a motor.

As a result, in addition to the effect of the tenth optical disk device, it is possible to provide the retreating mechanism of the magnetic field applying means inexpensively.

A fourteenth optical disk device of the present invention, having the arrangement of the tenth optical disk device, is characterized by including separating-contacting means for changing a distance between a disk facing surface of the magnetic field applying means and a surface of the disk, wherein the operation by the switching means for separating the magnetic field applying means from the light pickup for moving the magnetic field applying means to the retreat position is carried out by the separating-contacting means.

With this arrangement, the magnetic field applying means are separated from the light pickup by the separating-contacting means such as the lifting motor so as to be moved to the retreat position. Also, the magnetic field applying means are moved from the retreat position by the separating-contacting means so as to be linked to the light pickup.

Thus, the retreating and retreating releasing operations of the magnetic field applying means can be carried out without additionally providing a specialized driving means such as a motor.

As a result, in addition to the effect of the tenth optical disk device, it is possible to provide the retreating mechanism of the magnetic field applying means inexpensively.

A fifteenth optical disk device of the present invention is characterized by including a light pickup for projecting a light beam onto a disk encased in the cartridge placed in a recording/reproducing position through movement within a moving region of the device so as to detect reflected light off the disk, a light pickup guiding member for guiding the light pickup in the radial direction of the disk, magnetic field applying means for applying a magnetic field to the disk when recording and erasing information, a motor for rotating the disk, and loading means for (1) loading the cartridge to the recording/reproducing position and (2) unloading the cartridge out of the optical disk device from the recording and reproducing position, wherein the motor includes (a) a first motor unit which moves towards the loaded disk and (b) a second motor unit which moves between a first space adjacent to the first motor unit before moving towards the disk and a second space which is created by the movement of the first motor unit towards the disk, and the movement of the second motor unit is guided by the light pickup guiding member.

With this arrangement, when a disk is loaded, the first motor unit is moved towards the disk, and the second motor unit is moved to a space created by the movement of the first motor unit so as to be linked to the first motor unit, and the disk is rotated. The moving direction can be made in a direction parallel to the disk surface. When unloading the disk, the second motor unit is moved to the first space and the first motor unit is moved to the second space. In this manner, the motor is provided as separate units so as to be confined in a thin space, thereby realizing a thinner optical disk device.

Also, as described, since the movement of the second motor unit is guided by the member provided for guiding of the light pickup, it is not required to provide a guiding mechanism specifically for the second motor unit, thus making the device smaller, and preventing the manufacturing cost from increasing.

Further, in general, the relative positions of the first motor unit and the light pickup are accurately determined, and as described, by guiding the movement of the second motor unit by the member provided for guiding the light pickup, the relative positions of the second motor unit and the light pickup can also be accurately determined. As a result, it is also possible to accurately determine the relative positions of the first and second motor units, thereby permitting stable recording and reproducing.

A sixteenth optical disk device of the present invention, having the arrangement of the fifteenth optical disk device, is characterized by including (a) switching means for (i) moving, during loading and unloading operations, the magnetic field applying means to a predetermined retreat position outside a moving region of the cartridge in the optical disk device and (ii) linking, during recording operation on the disk in the cartridge, the magnetic field applying means to the light pickup, wherein the magnetic field applying means are separatable from and linkable to the light pickup, and (b) controlling means for controlling the second unit and the switching means so as to simultaneously start the moving of the second motor unit to the second space and the linking of the magnetic field applying means to the light pickup by the switching means.

With this arrangement, since (A) the moving of the second motor unit to the second space and (B) the linking of the magnetic field applying means to the light pickup by the switching means are started at the same time, the total time for finishing the operations of (A) and (B) is the longer of the time required for (A) and (B), rather than the combination of the time for (A) and (B) which would have been the case if the operations of (A) and (B) were carried out separately. Thus, it is possible to reduce the preparation time for the recording operation on the loaded disk, thereby, in addition to the effect of the fifteenth optical disk device, allowing a quick start for the recording operation.

A seventeenth optical disk device of the present invention, having the arrangement of the fifteenth optical disk device, is characterized by including switching means for (i) moving, during loading and unloading operations, the magnetic field applying means to a predetermined retreat position outside a moving region of the cartridge in the optical disk device and (ii) linking, during recording operation on the disk in the cartridge, the magnetic field applying means to the light pickup, wherein the magnetic field applying means are separatable from and linkable to the light pickup, wherein (A) the moving of the second motor unit to the second space and (B) the linking of the magnetic field applying means to the light pickup by the switching means are carried out by a single driving source.

With this arrangement, since the second motor unit and the magnetic field applying means are moved by a single driving source, it is not required to separately provide the driving source, thus preventing the manufacturing cost from being increased.

Also, since a single driving source is used, (A) the second motor unit and (B) the magnetic field applying means are moved simultaneously. Thus, the total time for finishing the moving of (A) and (B) is the longer of the time required for (A) and (B) , rather than the combination of the time for (A) and (B) which would have been the case if the moving of (A) and (B) were carried out separately. Thus, it is possible to reduce the preparation time for the recording operation on the loaded disk, thereby, in addition to the effect of the fifteenth optical disk device, allowing a quick start for the recording operation.

An eighteenth optical disk device, having the arrangement of the seventeenth optical disk device, is characterized in that (A) the moving of the second motor unit to the second space and (B) the moving of the magnetic field applying means by the switching means are carried out by the loading means.

With this arrangement, the magnetic field applying means are separated from the light pickup by the loading means such as the loading motor so as to be moved to the retreat position. Also, the magnetic field applying means are moved from the retreat position by the loading means so as to be linked to the light pickup. The second motor unit is also moved between the first space and the second space by the loading means. Thus, the retreating and retreating releasing operations of the magnetic field applying means and the moving of the second motor unit can be carried out without additionally providing a specialized driving means such as a motor, thereby, in addition to the effect of the seventeenth optical disk device, providing the moving mechanism of the second motor unit and the retreating mechanism of the magnetic field applying means inexpensively.

A nineteenth optical disk device of the present invention, having the arrangement of the seventeenth optical disk device, is characterized by including separating-contacting means for changing a distance between a disk facing surface of the magnetic field applying means and a surface of the disk, wherein the moving of the second motor unit and the moving of the magnetic field applying means by the switching means are carried out by the separating-contacting means.

With this arrangement, the magnetic field applying means are separated from the light pickup by the separating-contacting means such as the lifting motor so as to be moved to the retreat position. Also, the magnetic field applying means are moved from the retreat position by the separating-contacting means so as to be linked to the light pickup. The second motor unit is also moved between the first space and the second space by the separating-contacting means. Thus, the moving of the second motor unit and the retreating and retreating releasing operations of the magnetic field applying means can be carried out without additionally providing a specialized driving means such as a motor, thereby, in addition to the effect of the seventeenth optical disk device, providing the moving mechanism of the second motor unit and the retreating mechanism of the magnetic field applying means inexpensively.

Note that in the present invention, reference to "lateral direction" and "vertical direction" is made with respect to the case where the optical disk is positioned above the first unit, and therefore the "lateral direction" and "vertical direction" do not necessarily indicate such directions in a general sense.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disk device, comprising:
  a first motor unit including a turn table for mounting an optical disk and a rotor magnet fixed to the turn table;
  a second motor unit having a first stator coil for applying a magnetic field for rotatably driving the rotor magnet, said second motor unit provided side by side with said first motor unit in a lateral direction;
  a first moving mechanism for moving said first motor unit upward when loading the optical disk so as to mount the optical disk on the turn table; and
  a second moving mechanism for moving said second motor unit in the lateral direction so that said second motor unit is adjacent to said first motor unit thereunder which has been moved upward, said second motor unit moved to a predetermined position for allowing the rotor magnet and the turn table to be rotatably driven in accordance with the magnetic field from the first stator coil.

2. The optical disk device as set forth in claim 1, wherein said first moving mechanism and said second moving mechanism are driven by a single driving source.

3. The optical disk device as set forth in claim 1, further comprising a bearing support, provided below the rotor magnet, for supporting a bearing of a rotation shaft of the turn table.

4. The optical disk device as set forth in claim 3, wherein at least a portion of said bearing support, facing the first stator coil, is made of a non-magnetic material.

5. The optical disk device as set forth in claim 3, wherein said second motor unit includes a cut-out portion for preventing interference with said bearing support when said second motor unit is moved in the lateral direction.

6. The optical disk device as set forth in claim 5, wherein said bearing support is provided with a second stator coil on a portion facing the rotor magnet.

7. The optical disk device as set forth in claim 6, wherein the second stator coil is made of a metal foil.

8. The optical disk device as set forth in claim 6, wherein said second motor unit and said bearing support respectively include a first connection portion electrically connected to the first stator coil and a second connection portion electrically connected to the second stator coil, the first connection portion and the second connection portion contacting each other when said second motor unit is moved in the lateral direction to the predetermined position.

9. The optical disk device as set forth in claim 5, further comprising a moment cancelling section for cancelling a rotation moment with respect to the rotation shaft, induced by a magnetic absorption force generated between said second motor unit and the rotor magnet.

10. The optical disk device as set forth in claim 9, wherein said moment cancelling section is provided on said bearing support.

11. The optical disk device as set forth in claim 10, wherein said moment cancelling section is a magnetic portion made of a magnetic material, provided at least partially on said bearing support.

12. The optical disk device as set forth in claim 11, wherein said bearing support is entirely made of a magnetic material.

13. The optical disk device as set forth in claim 11, wherein said bearing support is made of a non-magnetic material except the magnetic portion.

14. The optical disk device as set forth in claim 13, wherein the magnetic portion is integrally provided with said bearing support.

15. The optical disk device as set forth in claim 13, wherein the magnetic portion is attached to said bearing support.

16. The optical disk device as set forth in claim 9, wherein said moment cancelling section is provided on said second motor unit.

17. The optical disk device as set forth in claim 16, wherein at least a portion of said bearing support, facing the rotor magnet, is made of a non-magnetic material, and
  said moment cancelling section is a support, made of a magnetic material, for the first stator coil, extending to the cut-out portion.

18. The optical disk device as set forth in claim 3, wherein said bearing support is provided, on a portion facing the rotor magnet, with a hall element for detecting a position of the rotor magnet.

19. The optical disk device as set forth in claim 18, wherein the hall element is provided, in a case where the first stator coil is provided in a ring, on a position corresponding to a center of each coil of the first stator coil.

20. The optical disk device as set forth in claim 18, wherein the hall element is incorporated in said bearing support so as to be within the thickness thereof.

21. The optical disk device as set forth in claim 1, further comprising:

a light pickup for projecting a light beam onto an optical disk placed in a recording/reproducing position through movement within a moving region of the optical disk device so as to detect reflected light off the optical disk; and a light pickup guiding member for guiding (1) said light pickup in a radial direction of the optical disk and (2) the lateral movement of said second motor unit.

22. The optical disk device as set forth in claim 1, further comprising:

a light pickup for projecting a light beam onto an optical disk placed in a recording/reproducing position through movement within a moving region of the optical disk device so as to detect reflected light off the optical disk; and magnetic field applying means, separatable from and linkable to said light pickup, for applying a magnetic field to the optical disk when recording information; and switching means for (1) separating, during loading and unloading operations of the optical disk, said magnetic field applying means from said light pickup so as to move said magnetic field applying means to a predetermined retreat position outside a moving region of the optical disk in the optical disk device and (2) linking, during a recording operation on the optical disk, said magnetic field applying means to said light pickup.

23. The optical disk device as set forth in claim 22, further comprising controlling means for controlling said second motor unit and said switching means so that (a) the lateral movement of said second motor unit and (b) linking of said magnetic field applying means to said light pickup by said switching means are started at a same time.

24. The optical disk device as set forth in claim 22, wherein (i) the lateral movement of said second motor unit and (ii) the movement of said magnetic field applying means by said switching means are carried out by a single driving source.

25. The optical disk device as set forth in claim 24, further comprising loading means for carrying out (A) a loading operation for placing the optical disk on the recording/reproducing position and (B) an unloading operation for ejecting the optical disk out of the optical disk device from the recording and reproducing position, wherein (i) the lateral movement of said second motor unit and (ii) the movement of said magnetic field applying means by said switching means are carried out by said loading means.

26. The optical disk device as set forth in claim 24, further comprising separating-contacting means for changing a distance between an optical disk facing surface of said magnetic field applying means and a surface of the optical disk, wherein (i) the lateral movement of said second motor unit and (ii) the movement of said magnetic field applying means by said switching means are carried out by said separating-contacting means.

27. An optical disk device, comprising:

a light pickup for projecting a light beam onto an optical disk placed in a recording/reproducing position through movement within a moving region of the optical disk device so as to detect reflected light off the optical disk; and magnetic field applying means, separatable from and linkable to said light pickup, for applying a magnetic field to the optical disk when recording information; and switching means for (1) separating, during loading and unloading operations of the optical disk, said magnetic field applying means from said light pickup so as to move said magnetic field applying means to a predetermined retreat position outside a moving region of the optical disk in the optical disk device and (2) linking, during a recording operation on the optical disk, said magnetic field applying means to said light pickup.

28. The optical disk device as set forth in claim 27, wherein said switching means link said magnetic field applying means to said light pickup by a magnetic absorption force of a magnet.

29. The optical disk device as set forth in claim 27, further comprising detecting means for detecting whether an optical disk which has been loaded is a read-only disk or a recordable disk, wherein said switching means (I) hold, in a case where said detecting means detects that the optical disk is a read-only disk, said magnetic field applying means in the retreat position and (II) link, in a case where said detecting means detects that the optical disk is a recordable disk, said magnetic field applying means to said light pickup.

30. The optical disk device as set forth in claim 27, further comprising loading means for carrying out (A) a loading operation for placing the optical disk on the recording/reproducing position and (B) an unloading operation for ejecting the optical disk out of the optical disk device from the recording and reproducing position, wherein the operation by said switching means for separating said magnetic field applying means from said light pickup for moving said magnetic field applying means to the retreat position is carried out by said loading means.

31. The optical disk device as set forth in claim 27, further comprising separating-contacting means for changing a distance between an optical disk facing surface of said magnetic field applying means and a surface of the optical disk, wherein the operation by said switching means for separating said magnetic field applying means from said light pickup for moving said magnetic field applying means to the retreat position is carried out by said separating-contacting means.

\* \* \* \* \*